(12) United States Patent  (10) Patent No.: US 7,770,324 B2
Hogan  (45) Date of Patent: Aug. 10, 2010

(54) MULTI-FACETED IRRIGATING POLE PLANTERS THAT CAN BE EASILY RAISED AND LOCKED FOR USE AND LOWERED FOR SERVICE

(76) Inventor: James Hogan, 3401 Debussy Rd., Jacksonville, FL (US) 32277

( * ) Notice: Subject to any disclaimer, the term of this patent is extended or adjusted under 35 U.S.C. 154(b) by 0 days.

(21) Appl. No.: 11/868,534

(22) Filed: Oct. 8, 2007

(65) Prior Publication Data

US 2008/0115414 A1 May 22, 2008

Related U.S. Application Data

(60) Provisional application No. 60/867,108, filed on Nov. 22, 2006.

(51) Int. Cl.
*A01G 9/02* (2006.01)
(52) U.S. Cl. .................. 47/66.6; 47/39; 47/79
(58) Field of Classification Search .......... 47/83, 47/65, 65.5, 66.6, 66.7, 39, 82, 79, 47, 18; D11/143; 248/161, 404, 422, 124.2, 76; 211/196, 205, 107, 133.4, 190, 207, 208, 211/209
See application file for complete search history.

(56) References Cited

U.S. PATENT DOCUMENTS

| | | | | |
|---|---|---|---|---|
| 147,849 A * | 2/1874 | Leslie | ................ | 47/39 |
| 183,163 A * | 10/1876 | Hegarty | ................ | 239/23 |
| 779,924 A * | 1/1905 | Gommel | ................ | 47/41.01 |
| 1,499,473 A * | 7/1924 | Price | ................ | 47/67 |
| 2,003,986 A * | 6/1935 | Witthuhn | ................ | 47/39 |
| 3,382,988 A * | 5/1968 | O'Reilly | ................ | 414/11 |
| 4,600,348 A * | 7/1986 | Pettit | ................ | 414/11 |
| 5,440,836 A * | 8/1995 | Lee | ................ | 47/60 |
| 5,598,662 A * | 2/1997 | Droste | ................ | 47/39 |
| 5,794,563 A * | 8/1998 | Klepac | ................ | 119/57.91 |
| 6,557,297 B2 * | 5/2003 | Receveur | ................ | 47/39 |
| 6,626,773 B1 * | 9/2003 | Fair | ................ | 473/483 |
| 7,043,877 B1 * | 5/2006 | Jensen | ................ | 47/83 |
| 7,155,860 B1 * | 1/2007 | Ferguson, III | ................ | 47/66.6 |
| 2002/0189163 A1 * | 12/2002 | Cooper | ................ | 47/39 |
| 2003/0161622 A1 * | 8/2003 | Zantos | ................ | 396/419 |
| 2003/0196376 A1 * | 10/2003 | Taylor | ................ | 47/66.6 |
| 2005/0091916 A1 * | 5/2005 | Faris | ................ | 47/39 |

* cited by examiner

*Primary Examiner*—Rob Swiatek
*Assistant Examiner*—Danielle Clerkley
(74) *Attorney, Agent, or Firm*—Mark Young, P.A.

(57) ABSTRACT

A planter system includes an adjustable height and angular orientation planter and an optionally adjustable irrigation system for controllably supplying water to the planter and/or surrounding terrain. The planter is configured to controllably travel up and down a vertical support, such as a section of a planter pole or other suitable vertical support structure, from a highest to a lowest position using a pulley and winch, block and tackle, rotating shaft, continuous pulley driven belt, continuous sprocket driven chain, lead screw, ball screw, a ballast, hydraulics, pneumatics, spring or other lifting subsystem. The irrigation system may be configured to supply water to the planter and or to the surrounding terrain. The planter is carried along the pole, allowing it to be controllably rotated at any height along the travel.

47 Claims, 34 Drawing Sheets

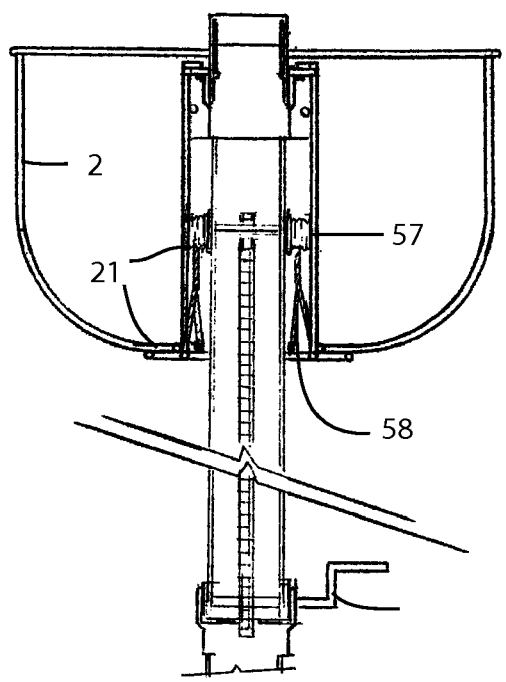
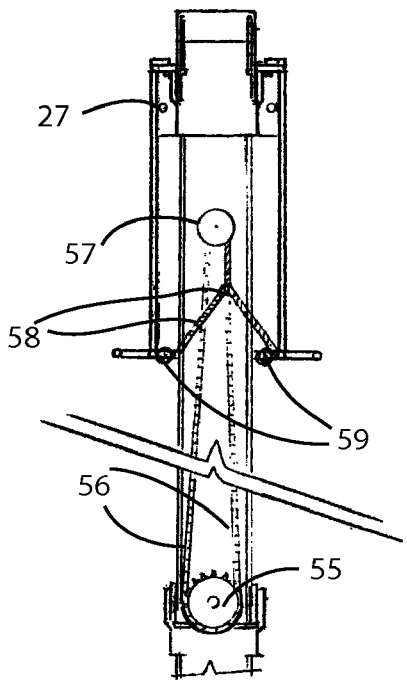
FIGURE 19
FIGURE 20
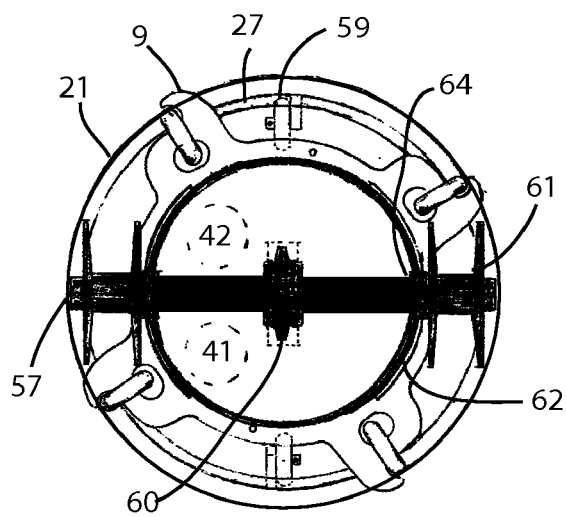
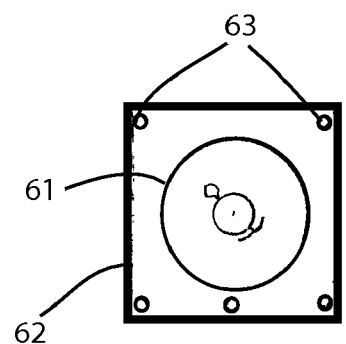
FIGURE 21
FIGURE 22

FIGURE 25

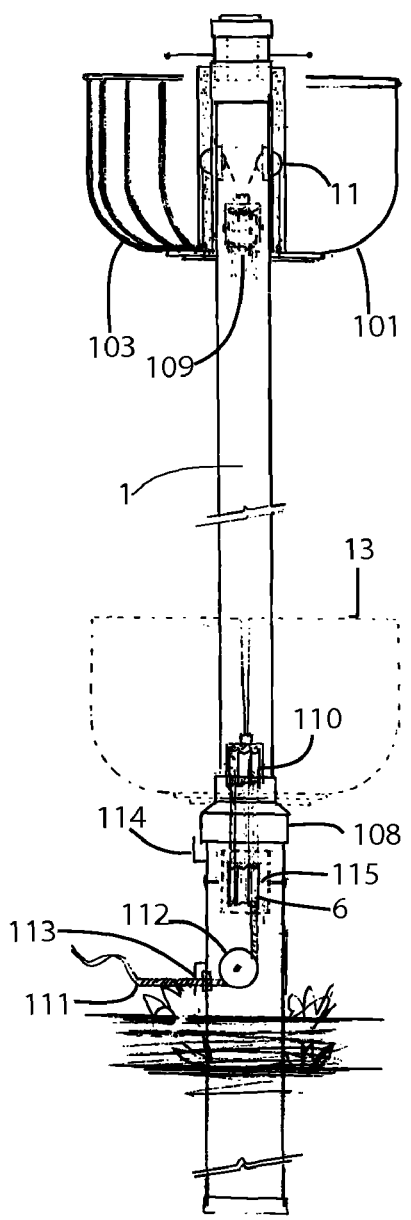
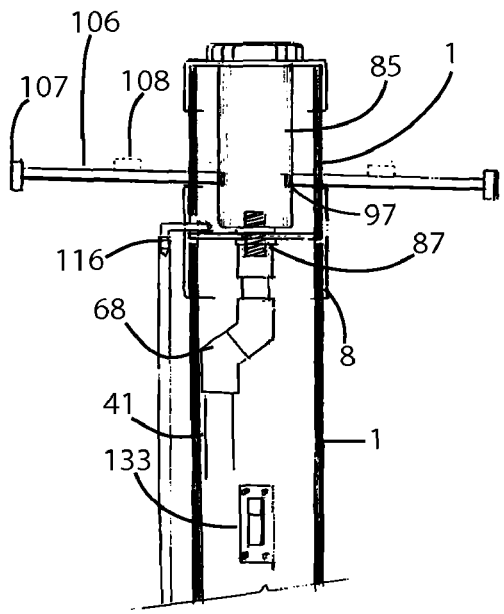
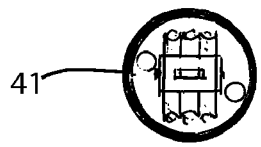
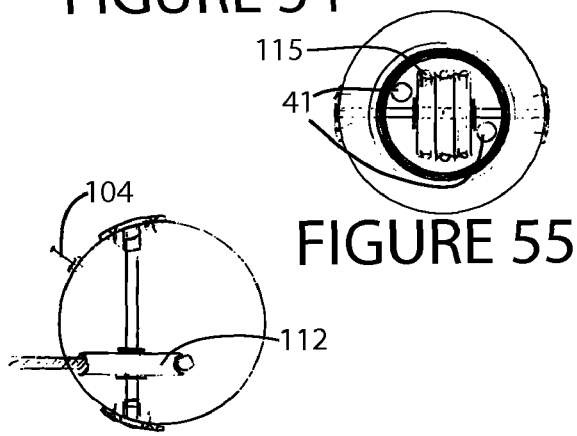
FIGURE 52
FIGURE 53
FIGURE 54
FIGURE 55
FIGURE 56

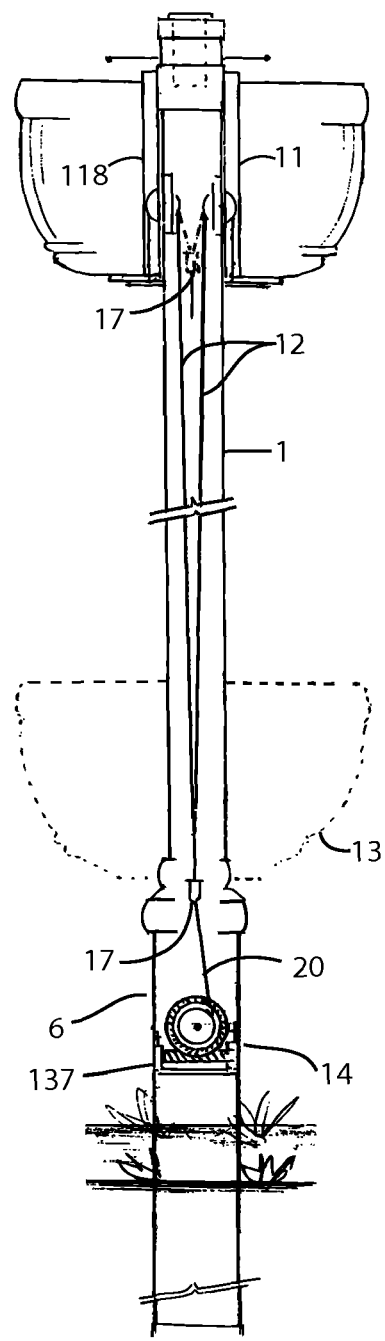
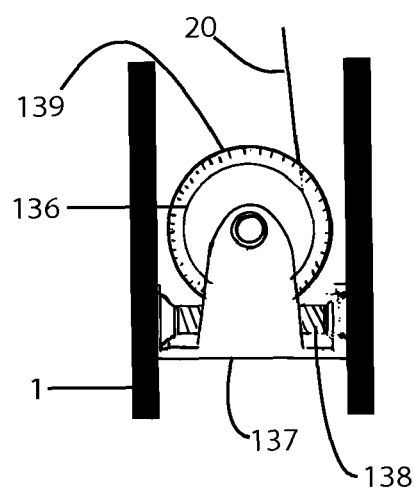
FIGURE 63
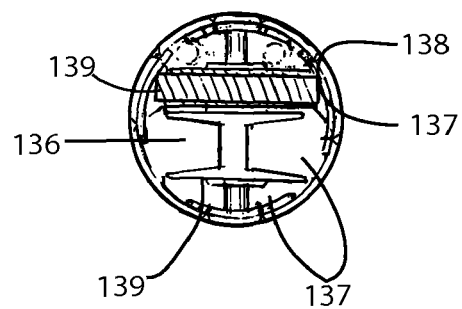
FIGURE 64
FIGURE 62

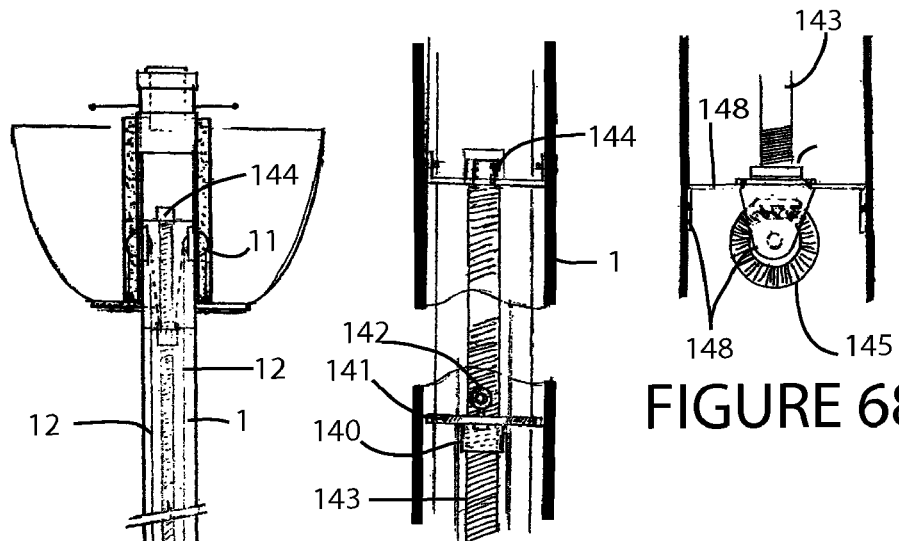
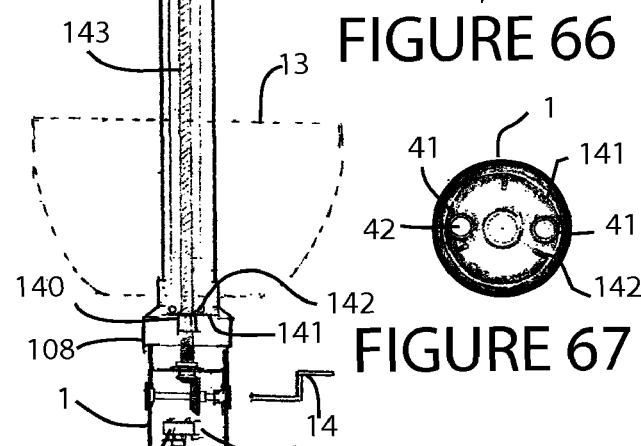
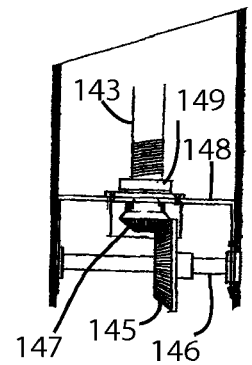
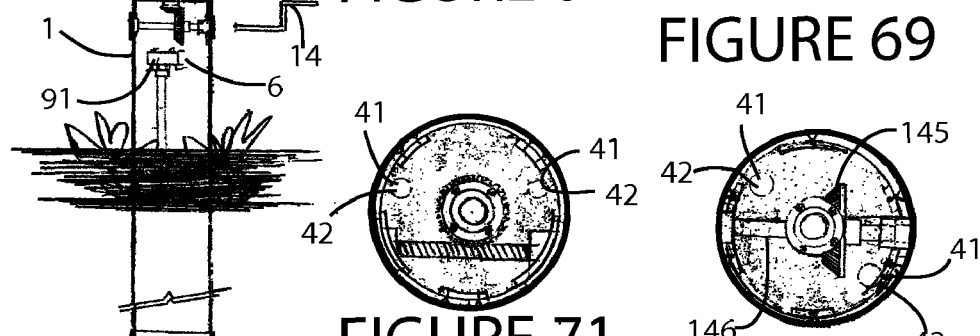
FIGURE 68
FIGURE 66
FIGURE 67
FIGURE 69
FIGURE 65
FIGURE 71
FIGURE 70

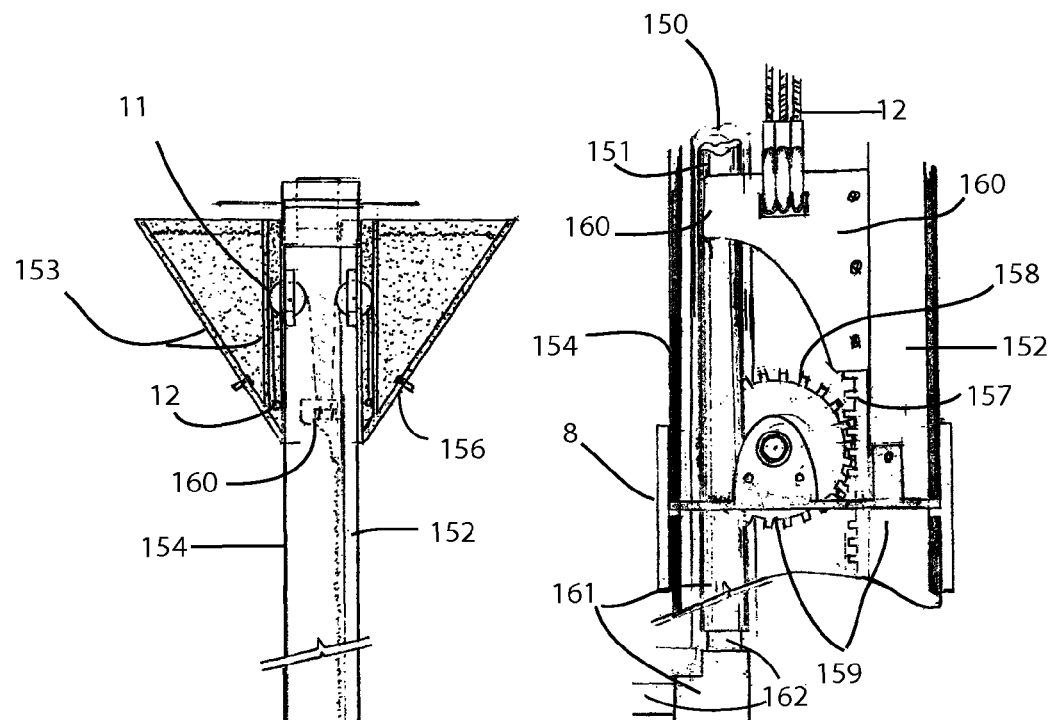
FIGURE 73
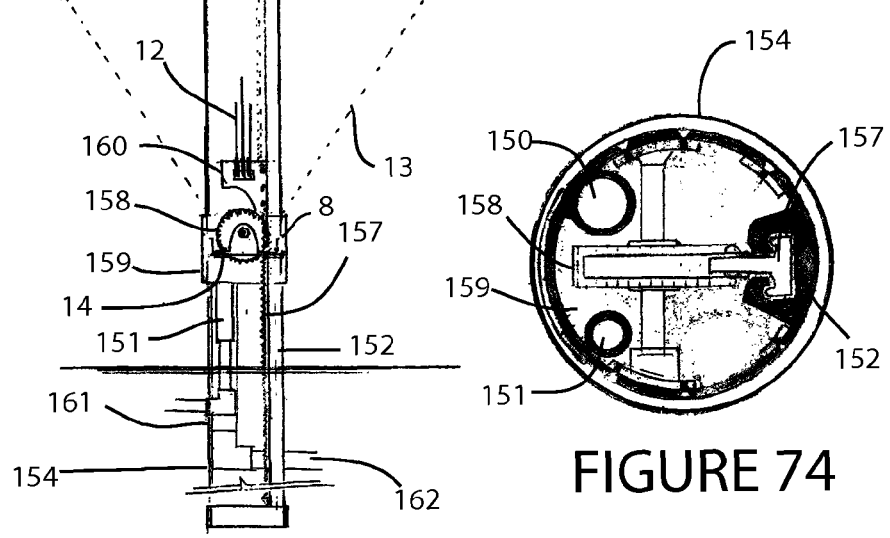
FIGURE 74
FIGURE 72

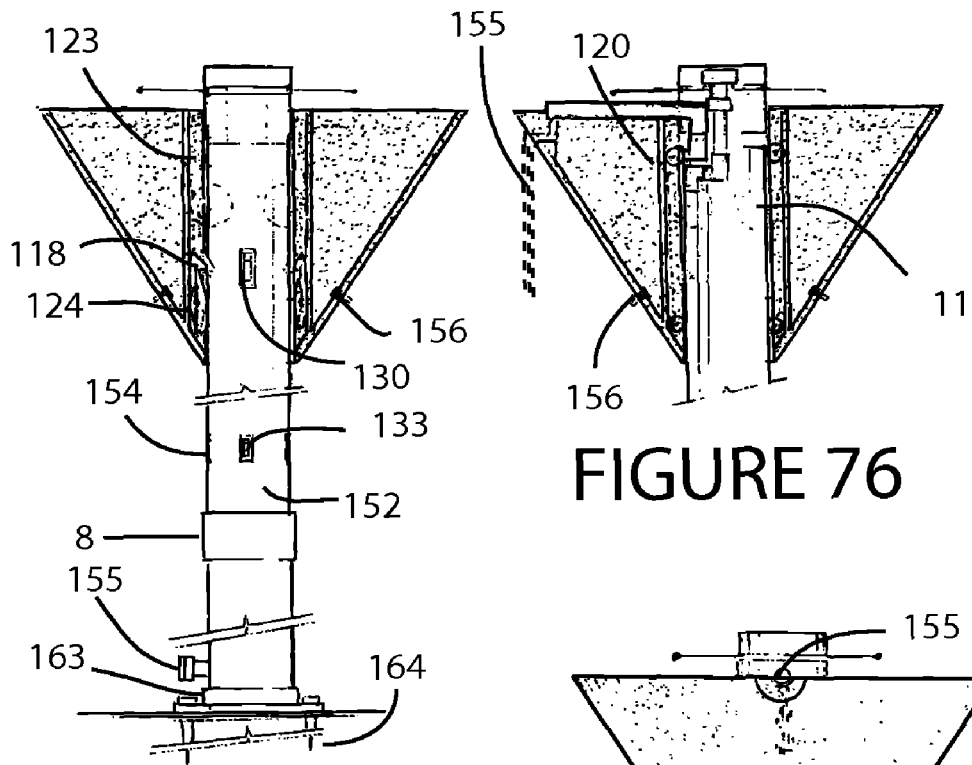
FIGURE 75
FIGURE 76
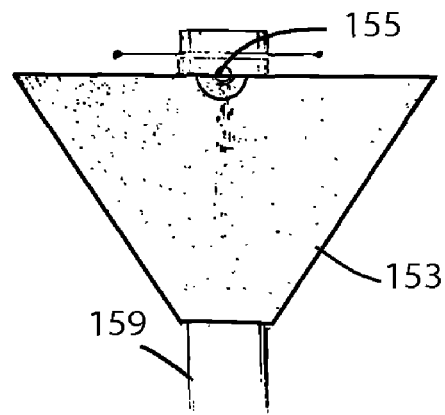
FIGURE 77
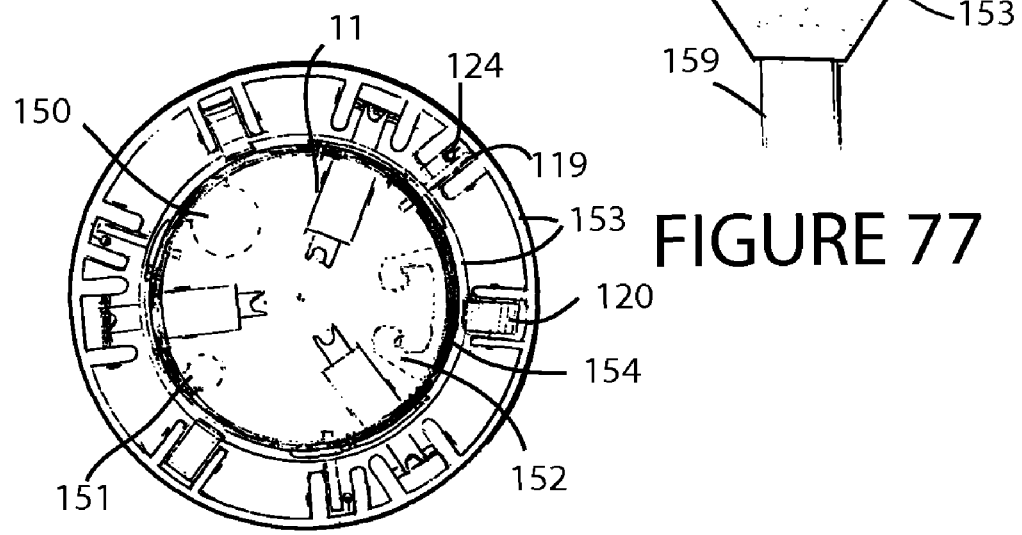
FIGURE 78

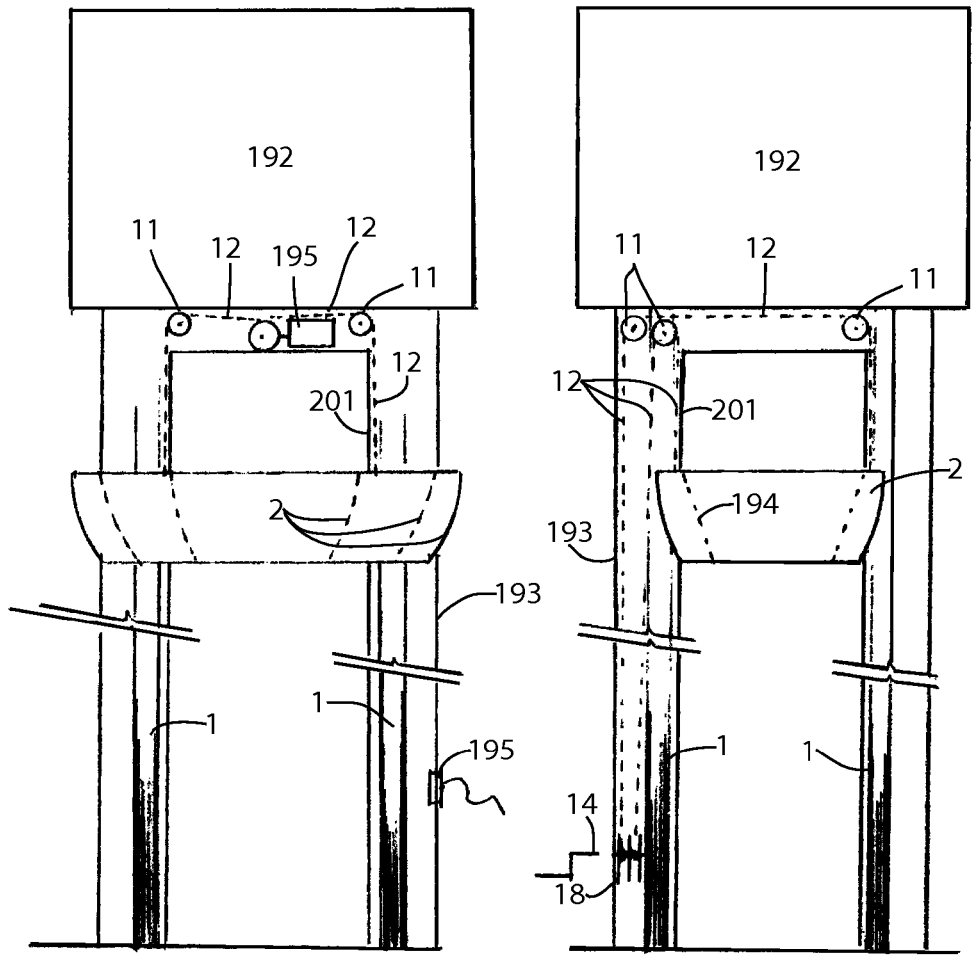
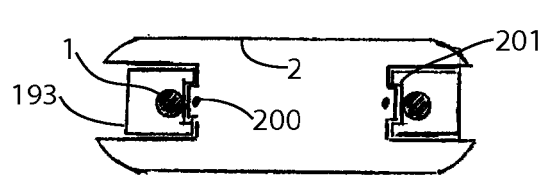
FIGURE 86 FIGURE 87
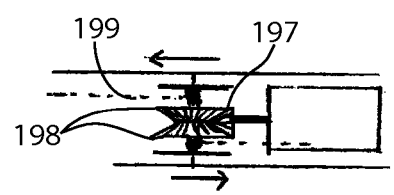
FIGURE 88 FIGURE 89

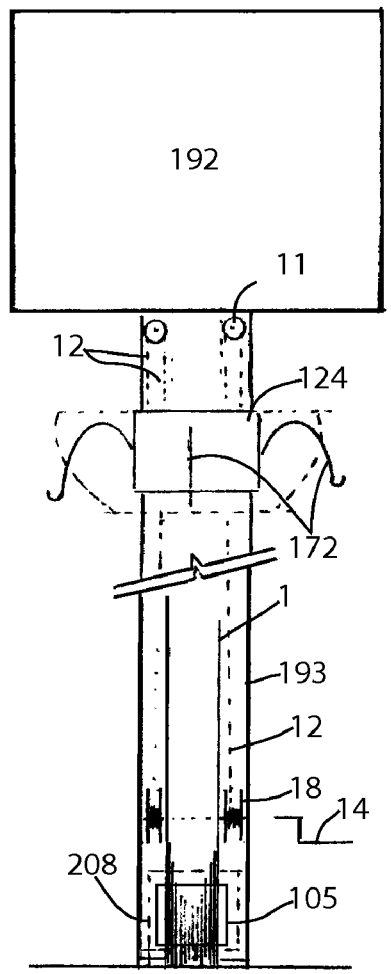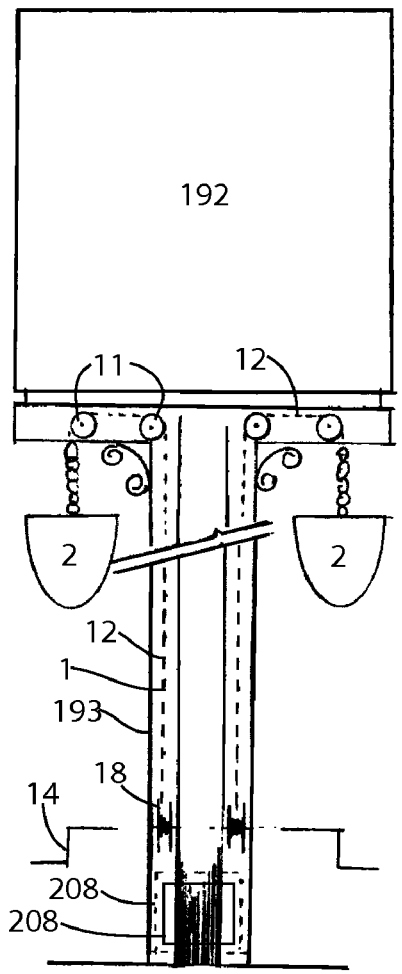
FIGURE 100  FIGURE 101
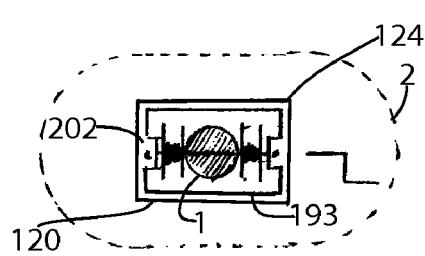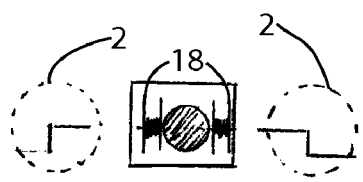
FIGURE 102  FIGURE 103

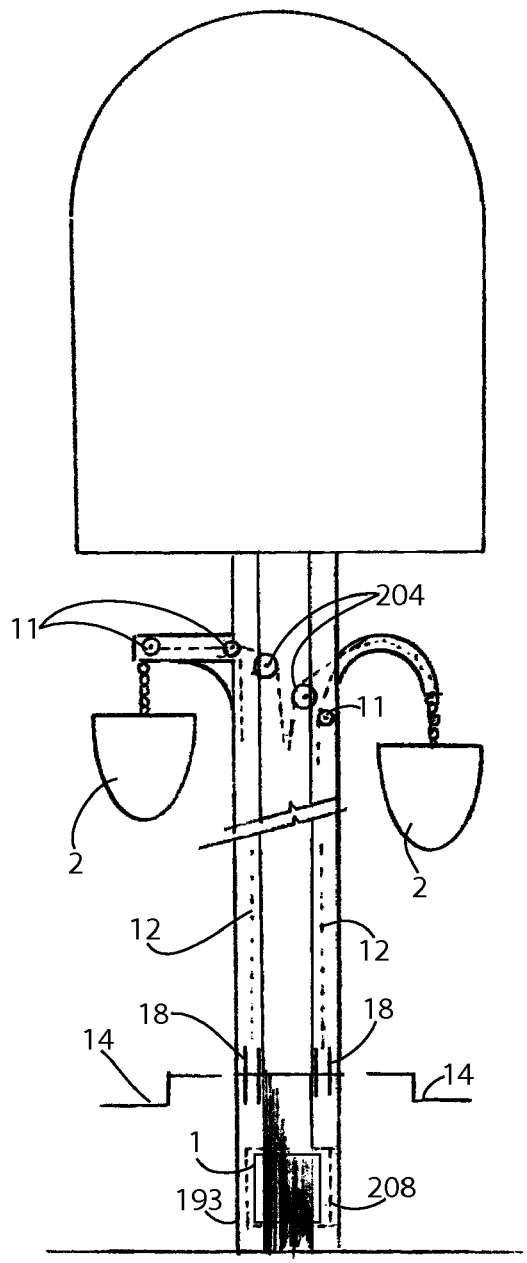
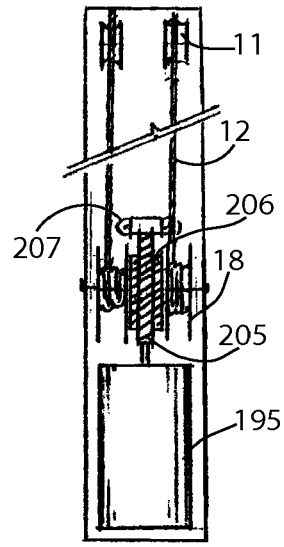
FIGURE 105
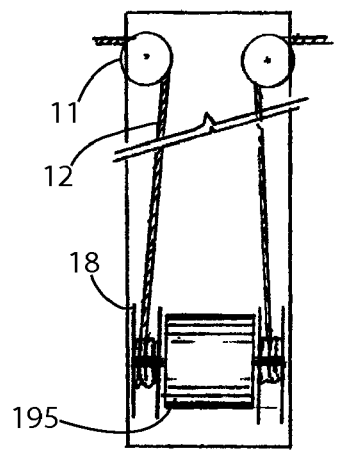
FIGURE 106
FIGURE 104

MULTI-FACETED IRRIGATING POLE PLANTERS THAT CAN BE EASILY RAISED AND LOCKED FOR USE AND LOWERED FOR SERVICE

RELATED APPLICATION

This application claims the benefit of priority of U.S. provisional application 60/867,108, filed Nov. 22, 2006, the entire contents of which are incorporated herein by this reference.

FIELD OF THE INVENTION

This invention generally relates to planters, and more particularly, to a planter system with an adjustable height and angular orientation planter, an optional waterfall and/or an adjustable irrigation system for controllably supplying water to the planter and/or surrounding terrain.

BACKGROUND

Conventional planters consist of stationary planting vessels that are configured for placement low to the ground or suspended at a height. While such planters create an aesthetically pleasing appearance, they suffer several shortcomings.

One shortcoming is inflexibility. Typical planters cannot be easily adjusted, i.e., raised and/or lowered and rotated repeatedly, through a continuum of positions. Instead, they remain fixed at a certain elevation and angular orientation. Thus, watering an elevated planter and caring for the plant requires use of a ladder or other tools or removal of the planter and reinstallation after the task is completed. Evenly distributing sunlight entails removal and repositioning the planter. Prior art planters that are adjustable, require complex manual disassembly, removal of components, and reinstallation of the components at discrete installation points. Conventional suspended planters are typically difficult to reach and have limited angular adjustability, in 90 or 180-degree increments. Such tasks are time consuming, extremely laborious, inconvenient and fraught with risk. A safer, more versatile, easily adjustable planter system is needed.

Another shortcoming of conventional planters, particularly raised and suspended planters, is limited size and location. Planter size and location are limited to reduce installation and serviceability problems. Concomitantly, planter size and location are limited to accommodate available structural supports and mounting hardware. Thus, conventional planters are relegated to serving as minor decorative devices, rather than major ornamental and landscaping features unlimited in size and location.

Yet another shortcoming of conventional planters, particularly ground planters, is the inability to showcase a colorful array of flowers above existing flora. While ground planters may be quite large and well suited to accommodate tall plants, they are not suitable for elevating small flowering plants.

Yet another shortcoming is lack of adjustable irrigation that can be configured to water a plant as well as surrounding terrain. Most conventional planters lack any irrigation system whatsoever. Known prior art planters that include irrigation systems are not adjustable and not configurable to water surrounding terrain, rendering them of marginal utility for many plants and landscaping use. A more versatile planter irrigation system is needed.

Conventional suspended planters are usually restricted in size, height, and weight to avoid serviceability problems. Additionally, they are most often residentially restricted to suspension from existing structures relegating them to an incidental decoration, rather than a major landscaping feature that can be of any size, location and independent of a structural support system as a pole planter.

Conventional planters suspended on small poles installed by simple foot pressure are vulnerable to falling even with the small planters featured. This shortcoming also relegates such planters to a subsidiary decorative device versus a major landscaping feature that can be a focal point.

Conventional ground planters are usually decorative at lower levels, which are easily within reach. They also can be of a large size and feature taller bushes, plants and trees starting in the first tiers of landscaping. However, they rarely are changed and cannot feature a large colorful array of different flowers at higher levels deeper into landscaping tiers.

Conventional suspended planters on ornamental street light poles present unique maintenance challenges. Such planters must be serviced by bucket trucks, which requires an expensive vehicle, consumes considerable labor and creates traffic and safety issues.

Additionally, conventional suspended planters on ornamental street light poles must be serviced by bucket trucks during the early pre-traffic mornings, which is expensive and dangerous. Concomitantly, conventional non-ornamental poles used in streets and parking lots do not lend themselves well to wire basket aesthetics.

Conventional irrigation systems lack an aesthetically acceptable permanent high-rise sprinkler that is not immediately removed after each use. Sprinkling from a high point offers greater coverage advantage over fences, hedges, bushes and even small trees. This often reduces additional sprinkler heads needed on an irrigation line, which can also lead to a reduction in irrigation lines and valves. Ground level systems often pass over, or tear into the more delicate flowers and ornamental plants versus irrigating by "raining" down from above. There may even be some water savings in properly designed landscape and irrigation systems using the postpole planter systems.

Conventional planters do not offer the additional flexibility of including waterfall features to be used in or around ponds, exterior or interior pools, or other landscaping choices on such fixed pole systems.

Architects require innovative decorative planters for exteriors, or interiors of buildings, such as lobbies of hotels, motels, condominiums and airports, etc., as well as exteriors around pools and patio areas. Conventional planters on a pillar are of marginal utility at best. A ceiling may be too high, unavailable or not architecturally suitable for suspending a conventional planter.

Many enterprises identify their business and advertise their goods and services using signage, which is indispensable to long-term viability and success. For some enterprises, a good portion of their business is derived from motorists spotting roadside signage or tall signs visible above treetops. Billboards are often drivers' primary way of finding out where food and fuel are available when driving on unfamiliar highways.

Unfortunately, many citizens, groups and government planners vigorously oppose proliferation and even maintaining billboards and large and elevated signage. Sign opponents complain that billboards cause too much clearing of trees, intrude on the surrounding landscape, and constitute a form of visual pollution. Some contend that signage in general contributes negatively to the mental climate of a culture by promoting products as providing feelings of completeness, wellness and popularity to motivate purchase. This opposition has led to strict sign and building codes.

Signage proponents counter that signs are indispensable for many businesses. They maintain that the presence of signs in rural areas is of value in reducing a driver boredom, which many believe is a positive contribution to highway safety. Proponents also observe that surveys of drivers and road users have shown that the lighting provided by billboards provide security and visibility to many motorists. Proponents maintain that larger signage, which is visible to motorists over greater distances, improves safety by allowing greater time to make necessary lane changes in ever increasing traffic flows.

The Small Business Administration (SBA) recognizes that many businesses, including the SBA's small business clients, depend upon advertising and identification. To protect their own loan portfolios while helping their clients' succeed, the SBA has trained field offices to join the fight against overly restrictive sign and building codes.

To temper the opposition, businesses need ways to beautify commercial structures, such as buildings and signage, including billboards. Adorning the commercial structures with foliage is one way to accomplish this objective. Opponents are less offended when commercial structures are beautified. Introducing more horticulture to their commercial environment improves the aesthetics, draws attention and helps blend commercial structures into the surrounding landscape. Adorned signage would appear smaller, allowing for larger signage.

While conventional horticulture at ground level through professional landscaping helps, more is needed to beautify commercial structures. Conventional planter containers and their accessory products are not adequately associated with the sign. Means for raising and lowering plants and means for irrigating plants to facilitate maintenance are not provided with existing commercial structures. The tension between opponents and the signage industry has stifled innovation where it is needed most.

Accordingly, a need exists for a planter system with an adjustable height and angular orientation planter, an optional waterfall, and/or an adjustable irrigation system for controllably supplying water to the planter and/or surrounding terrain. The invention is directed to overcoming one or more of the problems and solving one or more of the needs as set forth above.

SUMMARY OF THE INVENTION

In one aspect of the invention, a pole planter system with an adjustable height and angular orientation planter with optional waterfall and/or an adjustable irrigation system for controllably supplying water to the planter and/or surrounding terrain is provided. A variety of carriage systems including or holding a planter container surrounds the pole and is raised or lowered by a winch cable system or other lifting device concealed inside the pole. An interlocking hanger at the top allows the carriage housing holding the planter container to be hooked into place with a slight turn of both and then lowered into a fitting bracket. Alternative catch-hold-release mechanisms are used on various carriages. Reversing the process lowers the carriage housing with the planter container. The winch system can be replaced with other alternative lifting devices but not limited to such as a ballast, chain or belt drive, extension or compression springs or combinations of gears as worm, bevel, miter, rack and pinion systems etc. Pneumatic or hydraulic aided systems can also be used. A deck pulley system is designed to fit a rounded pole, as used in the main example in the embodiment, to conceal the cables. This system also allows the carriage with or including planter container to be evenly and smoothly raised or lowered. The carriage system around the pole creates a new function, design and style for planters. The planter containers, carriages, and/or combined units have a hole in the center to fit around the pole. The shape can be compared to an upside down or angel food cake baking pan or a bunt cake pan. This allows for a variety of planter container designs, colors and materials to be used. For example, planters can be wire baskets with coco liners or pots using plastic, fiberglass, composition or even clay material as porcelain. The variety offers initial design choices and the ability to change styles periodically or even rotate between designs. The same can be modified for any shaped pole including square. Alternative carriage designs substitute as the inside back for the planter containers providing a conventional alternative to the Bundt design, while others combine the planter container and carriage into one piece.

Users may exchange planter containers periodically with mature seasonal plantings. This requires lifting a heavy planter with mature plants over the pole. To provide this flexibility to others some planter containers will equally divide into removable small sections and/or pots that can be pre-planted and inserted after the plants mature or when plants need replacement or commercial exchange for seasonal promotions are required. This will also provide the advanced gardener the opportunity to use different plants requiring varying soil compositions in the same planter.

Optional accessories in addition to a variety of planter containers are multiple pole covers and flash collars for bases or bases with matching architectural lines and materials to the surrounding area as bricks, stone or marble. The structural pole without covers have multiple basic colors as bronze, dark gray, black and green. Field painting can change the colors. However, those desiring something more can mix planter containers, poles, pole covers and bases to their own tastes.

A series of "pole planters" according to principles of the invention can be strategically placed around a yard or garden just like the common ground level irrigation systems distributing water with the same sprinkler heads thus providing the same coverage. If placed at the backside edge above the other plants they can be spaced over 25-50 feet apart or even more depending on the water pressure and sprinkler head. Both landscaping, flowerbeds and plants can be watered at the same time. This can eliminate other irrigation lines such as one used for the lawn or yard and another used to spray into the outside beds or planting areas. Alternatively, they can be used in conjunction with standard underground systems while being featured in special areas.

As used herein, the term "pole" denotes any columnar structure, including, but not limited to, pipes, posts, as lampposts, light poles, sign posts, fence posts, pedestals, and similar elongate structures, regardless of their shapes and sizes.

Thus, an exemplary pole planter system according to principles of the invention includes an adjustable height planter, a vertical concentric support pole having a top end and a bottom end, and means for controllably adjusting the height of the planter relative to the support pole along a continuum of positions, from a lowest position to a highest position. At least one pulley may normally define the highest position and guides the tether. In one embodiment, the means for controllably adjusting the height includes a winch operably coupled to the tether is adapted to retract and extend the tether. The winch includes a control means, such as a handle or crank, accessible outside the support pole. In another embodiment, the means for controllably adjusting the height includes a rotatable shaft operably coupled to the tether, the rotatable shaft is adapted to retract and extend the tether. The rotatable shaft includes a control means, such as a crank and gear train, with the crank accessible outside the support pole. In yet another embodiment, the means for controllably adjusting the height includes a continuous pulley driven belt operably coupled to the tether, the continuous pulley driven belt is adapted to retract and extend the tether. The pulley driven belt includes a control means accessible outside the support pole. In yet another embodiment, the means for controllably adjusting the height includes a continuous sprocket driven chain operably coupled to the tether, the continuous sprocket driven chain is adapted to retract and extend the tether. The continuous sprocket driven chain includes a control means such as a crank coupled to a gear train accessible from outside the support pole. In yet another embodiment, the means for controllably adjusting the height includes a block and tackle lifting means operably coupled to the tether, the block and tackle lifting means is adapted to retract and extend the tether. The block and tackle lifting means includes a control means such as a crank coupled to a gear train accessible from outside the support pole. In yet another embodiment, the means for controllably adjusting the height includes a ballast operably coupled to the tether, the ballast is adapted to retract and extend the tether. In yet another embodiment, the means for controllably adjusting the height includes a rack and pinion with the rack operably coupled to the tether, adapted to retract and extend the tether when activated from a pinion gear driven by external crank outside the support pole. In yet other embodiments, the means for controllably adjusting the height includes extension springs operably coupled to the tether, adapted to retract or extend the tether from outside the support pole. In yet another embodiment, the means for adjusting the height includes a compression spring aided by hydraulics without use of a pulley defining the highest position or tether whereby the spring pushes a telescoping pole to the top with the planter container carriage fixed to the last section of structural pole which is retracted by pulling the carriage and planter container down by manual weight outside the supporting pole structure. In yet another embodiment, the means for adjusting the height includes a portable winch or motor attached outside the pole moveable to multiple locations operably attached to the tether and adapted to retract or extend it. In yet other embodiments, the means for adjusting the height includes hydraulic or pneumatic valves, cylinders, motors or aided systems operably adapted or combined with other embodiments to retract and extend the tether when activated from outside the support pole.

Another exemplary pole planter system according to principles of the invention may include an adjustable height planter, a vertical concentric support pole having a top end and a bottom end, and means for controllably adjusting the height of the planter relative to the support pole along a continuum of positions, from a lowest position to a highest position, as well as an irrigation means configured to supply water to the planter and/or to the surrounding terrain. The irrigation means may include a pop-up, stationary or rotary sprinkler head individually at the top end of the support pole, and plumbing means for supplying water to the sprinkler head and or combined with micro irrigation systems as necessary at the top end or bottom area of the support pole. The plumbing means is contained within the support pole and includes a fluid coupling configured for connection to an external water supply.

Another exemplary pole planter system according to principles of the invention may include a vertical concentric support pole having a top end and a bottom end, means for controllably adjusting the height of the planter support relative to the support pole along a continuum of positions, from a lowest position to a highest position, and a planter rotatably supported by the planter support, which allows rotation of the planter. At least one pulley normally defines the highest position and guides the tether. In one embodiment, the means for controllably adjusting the height includes a winch operably coupled to the tether is adapted to retract and extend the tether. The winch includes a control means, such as a handle or crank, accessible outside the support pole. In another embodiment, the means for controllably adjusting the height includes a rotatable shaft operably coupled to the tether, the rotatable shaft is adapted to retract and extend the tether. The rotatable shaft includes a control means, such as a crank and gear train, with the crank accessible outside the support pole. In yet another embodiment, the means for controllably adjusting the height includes a continuous pulley driven belt operably coupled to the tether, the continuous pulley driven belt is adapted to retract and extend the tether. The pulley driven belt includes a control means accessible outside the support pole. In yet another embodiment, the means for controllably adjusting the height includes a continuous sprocket driven chain operably coupled to the tether, the continuous sprocket driven chain is adapted to retract and extend the tether. The continuous sprocket driven chain includes a control means such as a crank coupled to a gear train accessible from outside the support pole. In yet another embodiment, the means for controllably adjusting the height includes a block and tackle lifting means operably coupled to the tether, the block and tackle lifting means is adapted to retract and extend the tether. The block and tackle lifting means includes a control means such as a crank coupled to a gear train accessible from outside the support pole. In yet another embodiment, the means for controllably adjusting the height includes a ballast operably coupled to the tether, the ballast is adapted to retract and extend the tether. In yet another embodiment, the means for controllably adjusting the height includes a rack and pinion with the rack operably coupled to the tether, adapted to retract and extend the tether when activated from a pinion gear driven by external crank outside the support pole. In yet other embodiments, the means for controllably adjusting the height includes extension springs operably coupled to the tether, adapted to retract or extend the tether from outside the support pole. In yet another embodiment, the means for adjusting the height includes a compression spring aided by hydraulics without use of a pulley defining the highest position or tether whereby the spring pushes a telescoping pole to the top with the planter container carriage fixed to the last section of structural pole which is retracted by pulling the carriage and planter container down by manual weight outside the supporting pole structure. In yet another embodiment, the means for adjusting the height includes a portable winch or motor attached outside the pole moveable to multiple locations operably attached to the tether and adapted to retract or extend it. In yet other embodiments, the means for adjusting the height includes hydraulic or pneumatic valves, cylinders, motors or aided systems operably adapted or combined with other embodiments to retract and extend the tether when activated from outside the support pole.

The means for controllably adjusting the height of the planter relative to the support pole comprising a subsystem from the group consisting of a tether and pulley, a winch, a windlass, a block and tackle, a compression spring, an extension spring, a rack and pinion, a hydraulic cylinder, a pneumatic cylinder, a lead screw assembly, and a ballast.

In another embodiment, a planter system according to principles of the invention includes an adjustable height planter adapted to slidingly engage a vertical support having a top end and a bottom end, and means for controllably adjusting the height of the planter relative to the vertical support along a continuum of positions, from a lowest position to a highest position. The means for controllably adjusting the height of the planter relative to the vertical support may comprise a tether and pulley, a winch, a windlass, a block and tackle, a compression spring, an extension spring, a rack and pinion, a hydraulic cylinder, a pneumatic cylinder, a lead screw assembly, and/or a ballast. Irrigation means may be provided to supply water to surrounding terrain and/or to the planter. The planter system may include a raceway (i.e., a conduit, channel or receptacle) containing components of said means for controllably adjusting the height of the planter relative to the vertical support. The raceway is adapted for attachment to a vertical support such as a pole (e.g., light pole, sign pole or decorative pole), a billboard support structure or a wall. The planter system may also include a planting receptacle and a plurality of and planting pots in said planting receptacle.

BRIEF DESCRIPTION OF THE DRAWINGS

The foregoing and other aspects, objects, features and advantages of the invention will become better understood with reference to the following description, appended claims, and accompanying drawings, where:

FIG. 19 provides a side cutaway view of an exemplary pole planter with a sprocket and chain actuator according to principles of the invention; and FIG. 20 provides a side cutaway view of an exemplary pole planter with a sprocket and chain actuator without a planter basket according to principles of the invention; and FIG. 21 provides a top view of an exemplary sprocket and chain actuator assembly for an exemplary pole planter according to principles of the invention; and FIG. 22 provides a top view of an exemplary mounting plate for a sprocket and chain actuator assembly for an exemplary pole planter according to principles of the invention; FIG. 25 provides a side view of sprinkler assembly for an exemplary pole planter for irrigating the planter container according to principles of the invention with the planter in a fully elevated configuration; FIG. 52 provides a side view cutaway of an exemplary alternative carriage, planter container, and Block and Tackle raising and lowering system for an exemplary pole planter according to the principles of the invention; and.

FIG. 53 provides a side view cutaway of an exemplary alternative sprinkler system for irrigating the planter container and surrounding area by an exemplary pole planter according to the principles of the invention; and FIG. 54 provides a pole top view cutaway of an exemplary moving pulley in the alternative Block and Tackle system for an exemplary pole planter according to the principles of the invention, and FIG. 55 provides a pole top view cutaway of an exemplary stationary pulley in the alternative Block and Tackle system for an exemplary pole planter according to the principles of the invention; and FIG. 56 provides a top view cutaway of an exemplary hand pull pulley in the alternative Block and Tackle system for an exemplary pole planter according to the principles of the invention; FIG. 62 provides a side view cutaway of an exemplary alternative Worm Gear raising and lowering system for an exemplary pole planter according to the principles of the invention; and.

FIG. 63 provides an enlarged side view cutaway of an exemplary Worm Gear for an exemplary pole planter according to the principles of the invention; and FIG. 64 provides an enlarged top view cutaway of an exemplary Worm Gear for an exemplary pole planter according to the principles of the invention; and FIG. 65 provides a side view cutaway of an exemplary alternative Lead or Ball Screw rotary shaft raising and lowering system for an exemplary pole planter according to the principles of the invention; and FIG. 66 provides an enlarged side view cutaway of an exemplary alternative Lead or Ball Screw rotary shaft raising and lowering system hardware for an exemplary pole planter according to the principles of the invention; and FIG. 67 provides a top view cutaway of an exemplary alternative Lead or Ball Screw rotary shaft raising and lowering system hardware for an exemplary pole planter according to the principles of the invention; and FIG. 68 provides a front view cutaway of an exemplary alternative Lead or Ball Screw rotary shaft raising and lowering system bevel gear hardware for an exemplary pole planter according to the principles of the invention; and FIG. 69 provides a side view cutaway of an exemplary alternative Lead or Ball Screw rotary shaft raising and lowering system bevel hardware for an exemplary pole planter according to the principles of the invention; and FIG. 70 provides a top view cutaway of an exemplary alternative Lead or Ball Screw rotary shaft raising and lowering system bevel gear hardware for an exemplary pole planter according to the principles of the invention; and FIG. 71 provides a top view cutaway of an exemplary alternative Lead or Ball Screw rotary shaft raising and lowering system worm gear alternative hardware for an exemplary pole planter according to the principles of the invention; and FIG. 72 provides a side view cutaway of an exemplary alternative combined one piece carriage-planter container, pole, and Rack and Pinion raising and lowering system for an exemplary pole planter according to the principles of the invention; and FIG. 73 provides an enlarged side view cutaway of an exemplary alternative Rack and Pinion hardware for a raising and lowering system for an exemplary pole planter according to the principles of the invention; and FIG. 74 provides an enlarged top view cutaway of an exemplary alternative Rack and Pinion hardware for a raising and lowering system for an exemplary pole planter according to the principles of the invention; and FIG. 75 provides a side view cutaway and profile of an alternative exemplary combined one piece planter container-carriage with catch-hook-release system with hardware for the Rack and Pinion raising and lowering system and an optional mobile system for smaller units of an exemplary pole planter according to the principles of the invention; and FIG. 76 provides another side view cutaway of an alternative exemplary combined one piece planter container carriage with irrigation and waterfalls of an exemplary pole planter according to the principles of the invention; and FIG. 77 provides a profile side view of an alternative exemplary combined one piece planter container-carriage with irrigation and waterfalls of an exemplary pole planter according to the principles of the invention; and FIG. 78 provides a top view of an alternative exemplary combined one piece planter container-carriage with irrigation and waterfalls of an exemplary pole planter according to the principles of the invention; FIG. 86 provides a side view cutaway of an exemplary raising and lowering system for planter containers on sign pole structures according to principles of the invention; and FIG. 87 provides a side view cutaway of an exemplary raising and lowering system for planter containers on sign pole structures according to principles of the invention; and.

FIG. 88 provides a top view cutaway of an exemplary raising and lowering system for planter containers on sign pole structures according to principles of the invention; and FIG. 89 provides a top view cutaway of an exemplary electric motor driven raising and lowering system for planter containers on sign pole structures according to principles of the invention; FIG. 100 provides a side view cutaway of an exemplary raising and lowering system for planter containers around sign pole structures according to principles of the invention; and FIG. 101 provides a side view cutaway of an exemplary raising and lowering system for planter containers suspended from sign pole structures according to principles of the invention; and FIG. 102 provides a top view cutaway of an exemplary raising and lowering system for planter containers around sign pole structures according to principles of the invention; and FIG. 103 provides a top view cutaway of an exemplary raising and lowering system for planter containers suspended from sign pole structures according to principles of the invention; and FIG. 104 provides a side view cutaway of an exemplary raising and lowering system for planter containers suspended from arms affixed to sign pole structures according to principles of the invention; and FIG. 105 provides a top view cutaway of an exemplary self contained vertical raceway channel unit with worm gears used as a raising and lowering system for planter containers on sign pole structures according to principles of the invention; and FIG. 106 provides a top view cutaway of an exemplary self contained vertical raceway channel unit with direct drive used as a raising and lowering system for planter containers on sign pole structures according to principles of the invention.

Figures 1, 2:
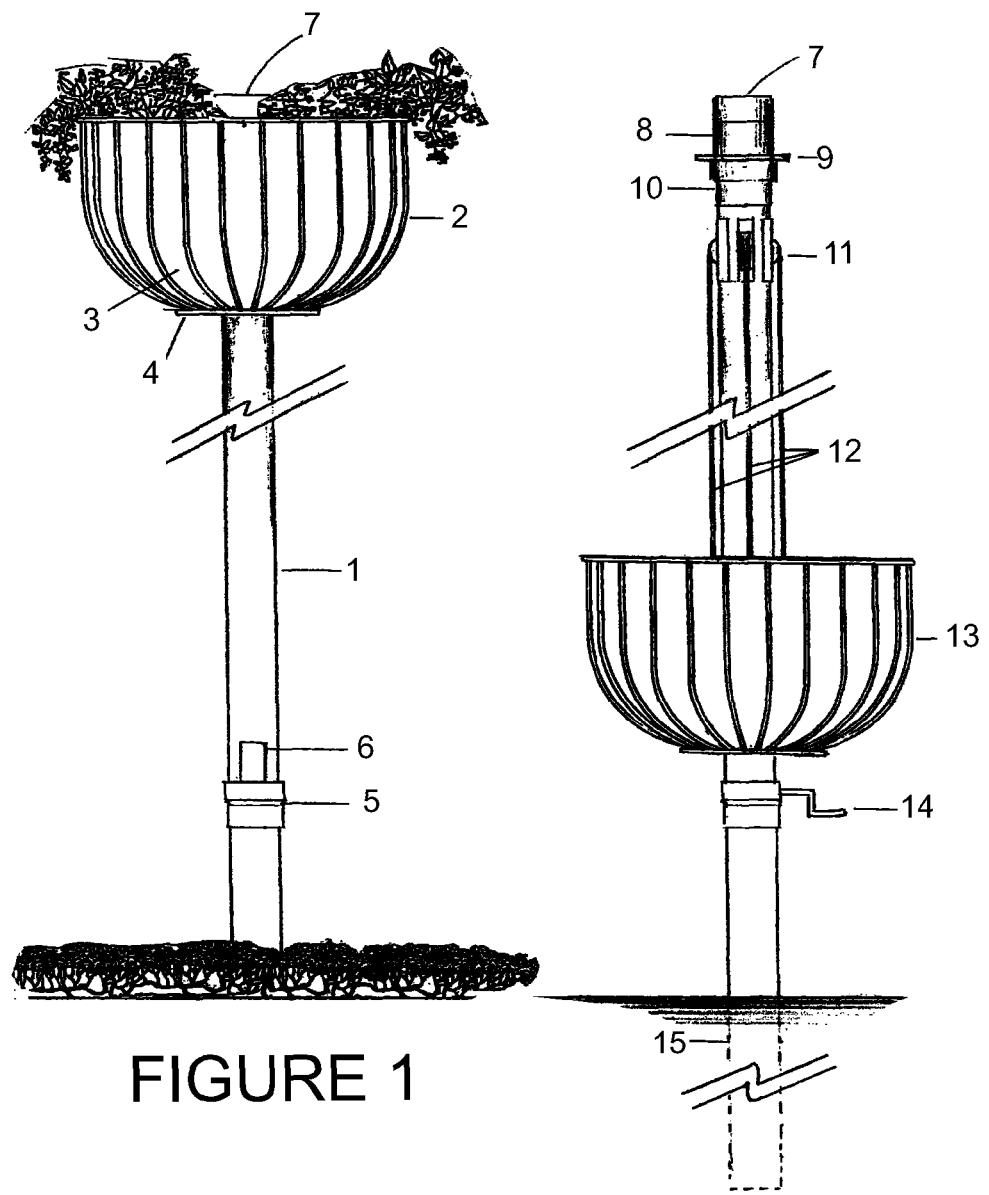
FIG. 1 provides a profile view of an exemplary pole planter according to principles of the invention with the planter in a fully elevated configuration.
FIG. 2 provides a profile view of an exemplary pole planter according to principles of the invention with the planter in a lowered configuration.

Those skilled in the art will appreciate that the figures are not intended to be drawn to any particular scale; nor are the figures intended to illustrate every embodiment of the invention. The invention is not limited to the exemplary embodiments or aesthetic features depicted in the figures or the shapes, relative sizes, ornamental aspects or proportions shown in the figures.

DETAILED DESCRIPTION

With reference to the Figures and description provided below, an exemplary pole planter system according to principles of the invention includes an adjustable height planter, a vertical support having a top end and a bottom end, and means for controllably adjusting the height of the planter relative to the support along a continuum of positions, from a lowest position to a highest position. In one embodiment, the means for controllably adjusting the height includes at least one pulley, which may define the highest position, and a tether guided by the pulley. In another embodiment, the means for controllably adjusting the height includes a winch (or windlass) operably coupled to the tether is adapted to retract and extend the tether. The winch includes a control means, such as a handle or crank or electrical or electromechanical controller, accessible outside the support. In yet another embodiment, the means for controllably adjusting the height includes a rotatable shaft operably coupled to the tether, the rotatable shaft is adapted to retract and extend the tether. The rotatable shaft includes a control means, such as a crank and gear train, with the crank accessible outside the support pole. In yet another embodiment, the means for controllably adjusting the height includes a continuous pulley driven belt operably coupled to the tether. The continuous pulley driven belt is adapted to retract and extend the tether. The pulley driven belt includes a control means accessible outside the support pole. In yet another embodiment, the means for controllably adjusting the height includes a continuous sprocket driven chain operably coupled to the tether. The continuous sprocket driven chain is adapted to retract and extend the tether. The continuous sprocket driven chain includes a control means such as a crank coupled to a gear train accessible from outside the support pole. In yet another embodiment, the means for controllably adjusting the height includes a block and tackle lifting means operably coupled to the tether. The block and tackle lifting means is adapted to retract and extend the tether. The block and tackle lifting means includes a control means such as a crank coupled to a gear train accessible from outside the support pole. In yet another embodiment, the means for controllably adjusting the height includes a ballast operably coupled to the tether. The ballast is adapted to retract and extend the tether. In yet another embodiment, the means for controllably adjusting the height includes a rack and pinion with the rack operably coupled to the tether and adapted to retract and extend the tether when activated from a pinion gear driven by external crank outside the support pole. In yet other embodiments, the means for controllably adjusting the height includes extension springs operably coupled to the tether and adapted to retract or extend the tether from outside the support pole. In yet another embodiment, the means for adjusting the height includes a compression spring, which may be aided by hydraulics, whereby the spring pushes a telescoping pole to the top with the planter container carriage fixed to the last section of structural pole which is retracted by pulling the carriage and planter container down by manual weight outside the supporting pole structure. In yet another embodiment, the means for adjusting the height includes a portable winch or motor attached outside the pole moveable to multiple locations operably attached to the tether and adapted to retract or extend it. In yet other embodiments, the means for adjusting the height includes hydraulic or pneumatic valves, cylinders, motors or aided systems operably adapted or combined with other embodiments to retract and extend the tether when activated from outside the support pole. A pole planter system according to principles of the invention may be provided as a complete system including a pole, planter, irrigation subsystem, and height adjustment subsystem. Alternatively, a pole planter system according to principles of the invention may be provided as a kit or an assembly to retrofit existing support structures, such as signs, light poles, and walls.

Another exemplary pole planter system according to principles of the invention may include an adjustable height planter, a vertical concentric support pole having a top end and a bottom end, and means for controllably adjusting the height of the planter relative to the support pole along a continuum of positions, from a lowest position to a highest position, as well as an irrigation means configured to supply water to the planter and/or to the surrounding terrain. The irrigation means may include a pop-up, stationary or rotary sprinkler head at the top end of the support pole, and plumbing means for supplying water to the sprinkler head. The plumbing means is contained within the support pole and includes a fluid coupling configured for connection to an external water supply.

Another exemplary pole planter system according to principles of the invention may include a vertical concentric support pole having a top end and a bottom end, means for controllably adjusting the height of the planter support relative to the support pole along a continuum of positions, from a lowest position to a highest position, and a planter rotatably supported by the planter support, which allows rotation of the planter. At least one pulley normally defines the highest position and guides the tether. In one embodiment, the means for controllably adjusting the height includes a winch operably coupled to the tether is adapted to retract and extend the tether. The winch includes a control means, such as a handle or crank, accessible outside the support pole. In another embodiment, the means for controllably adjusting the height includes a rotatable shaft operably coupled to the tether, the rotatable shaft is adapted to retract and extend the tether. The rotatable shaft includes a control means, such as a crank and gear train, with the crank accessible outside the support pole. In yet another embodiment, the means for controllably adjusting the height includes a continuous pulley driven belt operably coupled to the tether, the continuous pulley driven belt is adapted to retract and extend the tether. The pulley driven belt includes a control means accessible outside the support pole. In yet another embodiment, the means for controllably adjusting the height includes a continuous sprocket driven chain operably coupled to the tether, the continuous sprocket driven chain is adapted to retract and extend the tether. The continuous sprocket driven chain includes a control means such as a crank coupled to a gear train accessible from outside the support pole. In yet another embodiment, the means for controllably adjusting the height includes a block and tackle lifting means operably coupled to the tether, the block and tackle lifting means is adapted to retract and extend the tether. The block and tackle lifting means includes a control means such as a crank coupled to a gear train accessible from outside the support pole. In yet another embodiment, the means for controllably adjusting the height includes a ballast operably coupled to the tether, the ballast is adapted to retract and extend the tether. In yet another embodiment, the means for controllably adjusting the height includes a rack and pinion with the rack operably coupled to the tether, adapted to retract and extend the tether when activated from a pinion gear driven by external crank outside the support pole. In yet other embodiments, the means for controllably adjusting the height includes extension springs operably coupled to the tether, adapted to retract or extend the tether from outside the support pole. In yet another embodiment, the means for adjusting the height includes a compression spring aided by hydraulics without use of a pulley defining the highest position or tether whereby the spring pushes a telescoping pole to the top with the planter container carriage fixed to the last section of structural pole which is retracted by pulling the carriage and planter container down by manual weight outside the supporting pole structure. In yet another embodiment, the means for adjusting the height includes a portable winch or motor attached outside the pole moveable to multiple locations operably attached to the tether and adapted to retract or extend it. In yet other embodiments, the means for adjusting the height includes hydraulic or pneumatic valves, cylinders, motors or aided systems operably adapted or combined with other embodiments to retract and extend the tether when activated from outside the support pole.

Thus, in one embodiment, the planter is configured to controllably travel up and down a section of the planter pole from a highest to a lowest position. In another embodiment, the planter includes an irrigation system. In yet another embodiment, the planter is configured to rest on a movable support, allowing the planter to be controllably rotated at any height along the travel.

Now, referring now to FIG. 1, an exemplary pole planter according to principles of the invention is conceptually illustrated. While the sizes and heights may be varied and the apparatus may be composed of a variety of materials and parts, in an exemplary embodiment 4" diameter PVC sewer pipe (SDR 35) and fittings (PVC solvent weld sewer fittings for SDR 35) are utilized for the post. This size PVC pipe is suitable for providing stable support of a planter up to about 6 ft. above grade, depending upon the planter container size and the PVC water pipe sizes and the manufacturing methods used. Larger pipe diameters and/or stronger materials may be used to achieve greater stability and structural integrity per some of the embodiments. The post planter can be modified to accommodate a variety of pole shapes, and is not limited to round, square or combinations of multiple poles.

In the exemplary embodiment depicted in FIG. 1, pole 1, a 4" diameter SDR 35 sewer pipe, serves as a structural upright. A wire basket 2 with a central aperture serves as planter container. An exemplary planter 2 is 28" in diameter by 17" high and made of 3/16" steel wire dipped in vinyl. A coco liner 3 may be placed inside the wire basket. A support ring 4 surrounds the aperture of the basket and provides a ledge or shelf for a carriage system 21, as described below. Various couplings 5, a partial stop coupling 8, a carriage housing hanging bracket 9 and an adapter hub 10 (as shown in FIG. 2) are also provided to adjoin sections, define a sprinkler mounting, and define an upper limit of travel for the planter 2. An access hole with a cover plate 6 is provided to facilitate access to internal components, such as a winch. A pipe cap 7 seals the top of the pole 1.

Referring now to FIG. 2, a profile view of an exemplary pole planter according to principles of the invention with the planter 2 in a lowered configuration 13 is provided. A winch or turning crank handle 14 is inserted through an access hole into a winch, which is revealed by removing the cover plate 6. Further details on using the winch are provided below. The planter basket 2 may readily be rotated for maximum/even sun exposure while the basket is in the lowered position 13. At position 13, in this example, a box, pot, bucket, stool or similar support can be placed under the planter basket 2 to relieve tension on the pulley and cable system. Such a support may be integrated into the design of the pole 1 or collar per FIGS. 42, 45, 52 and 62 and in a catch-hook-release mechanism in FIGS. 57 and 58. Custom support brackets and/or pins may also be provided per FIGS. 79 and 80. Such support facilitates repositioning the loose lanyards 12 for adjustment and/or maintenance.

A pulley system 11 guides a plurality of lanyards 12, which extend from the winch to the carriage housing. Extension of the lanyards from the winch allows the planter to slide downwardly. Winding the lanyards around the winch spool retracts the lanyards and draws the planter 2 upwardly. In a preferred embodiment, three or more pulleys (with three or more lanyards) are utilized to provide stable lowering and raising action. The lanyards may be comprised of 1/8" diameter galvanized cable featuring corrosion resistant snap hooks for releasable attachment of the carriage housing 21. The exemplary deck pulley system in various sizes is used throughout the alternative Figures and Designs for poles, containers and with the raising and lowering systems.

The winch may have an axle drive configured to engage either the winch or crank handle 14 or a standard socket wrench. Illustratively, the axle drive may have a standard head for a socket wrench and a recessed winch handle socket. The exemplary winch crank or socket handle is used also throughout the embodiment. Additionally, power drills and motors may be used where appropriate The pole 1 may be imbedded deeply (e.g., 3') in the ground for support. Based upon soil conditions, the mode of use, and the size of the unit shallower or deeper imbedding, a concrete base, or a support stand may be used.

Figure 3:
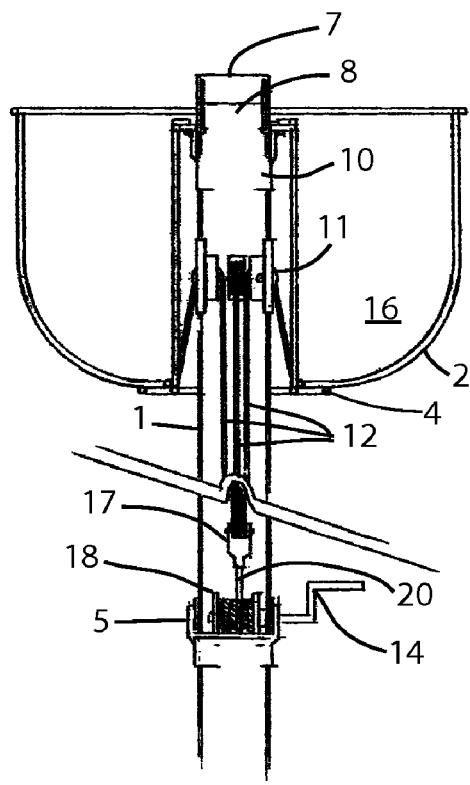
FIG. 3 provides a cutaway view of exemplary basket, carriage, pulleys and winch system of an exemplary pole planter according to principles of the invention.
Figure 4:
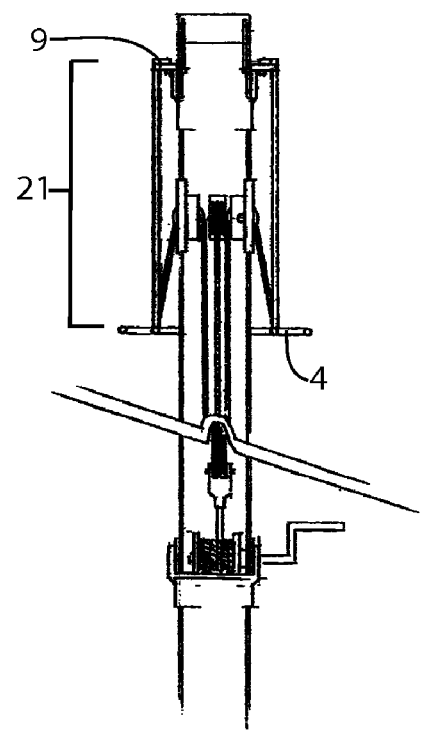
FIG. 4 provides a top view of an exemplary basket and carriage assembly of an exemplary pole planter according to principles of the invention.

Referring now to FIG. 3, a side cutaway of the basket, carriage, pulleys and winch system are conceptually illustrated. The planter basket 2 rests on the bottom ledge 4 of a movable carriage housing assembly, identified herein as 16 and/or 21. The exemplary carriage housing assembly 16 includes an upright section 19 and a bracket 9. The carriage housing may be replaced by incorporating the upright 19 in the container basket as in a wire basket. Other carriage housing assembly configurations, such as configurations that omit the upright 19, may be utilized and come within the scope of the invention. The exemplary upright section 19 connects the bottom ledge 4 to the bracket 9. The carriage housing assembly 16 is arranged concentric with the planter basket 2 and pole 1 and is operably coupled to the lanyards 12. The function of the carriage housing assembly 16 is threefold. First, the carriage housing assembly 16 slides along the pole as the lanyards 12 are extended or retracted using the winch 18. Second, the bottom ledge of the carriage housing assembly 16 provides a stable platform for supporting various planter baskets 2. Third, the carriage housing assembly 16 uses a bracket 9 for controllably locking the planter basket into a raised position. This arrangement is also illustrated in the top view of FIG. 4 and the cutaway view without the basket in FIG. 5. Note that the carriage assembly is generally identified as 21 in FIG. 5 and as 16 elsewhere. Alternative carriage systems accommodate other designs, materials and sizes as demonstrated in FIGS. 57, 58, 61, 72, 75, 78 and other embodiments.

The winch 18 is a mechanical device that is used to wind up the lanyards. In its simplest form, the winch may be comprised of a spool and attached crank. Designs that are more elaborate may have gear assemblies and can be powered by a motor. Some may include a solenoid brake and/or a mechanical brake, or a ratchet that prevents the winch from unwinding. A single cable 20 (e.g., 3/16" or greater diameter galvanized wire cable) extends from spool of the winch 18 to a yoke 17. The spool carries enough cable to raise and lower the basket a determined distance. The cable 20 is sufficiently strong to withstand the tension caused by a full planter and is sufficiently thin to wind around the spool without filling it up. The yoke 17 connects the lanyards 12 with the cable 20. The winch 18 may be actuated by rotating the handle 14 in a clockwise or counterclockwise direction to extend and retract the cable 20 and coupled lanyards 12. The available area for a winch can be expanded in a lower sleeved 6" PVC pipe per FIGS. 52-80. Additionally, power drills and motors including electric, hydraulic or pneumatic with push button controls on the pole or with a mobile remote or detachable cable may be used where appropriate for driving the winch or other spool, sprocket, turning and/or winding actuators or mechanisms throughout the embodiment. Other alternative devices and systems similar in function that can be combined with the embodiments are hoists and ratchet pullers. Removable mobile winches, other drive mechanism and power sources are demonstrated in FIGS. 82-84.

Figure 6:
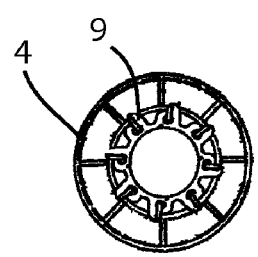
FIG. 6 provides a top view of an exemplary carriage assembly of an exemplary pole planter according to principles of the invention.
Figure 7:
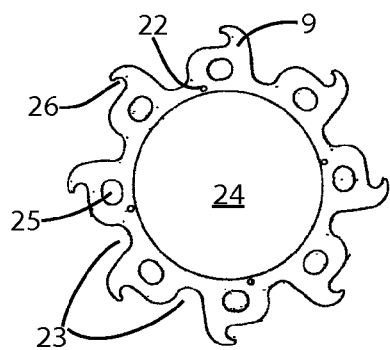
FIG. 7 provides a top plan view of an exemplary carriage bracket for use with of an exemplary carriage assembly of an exemplary pole planter according to principles of the invention.
Figure 8:
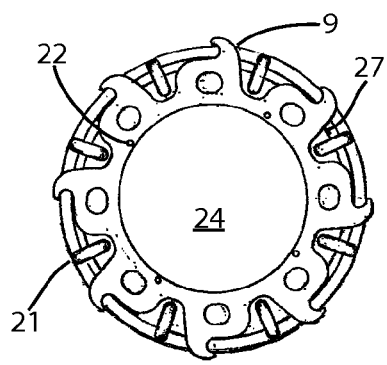
FIG. 8 provides a top plan view of an exemplary carriage bracket and an exemplary carriage assembly in an unlocked (i.e., disengaged) position for use with an exemplary pole planter according to principles of the invention.
Figure 9:
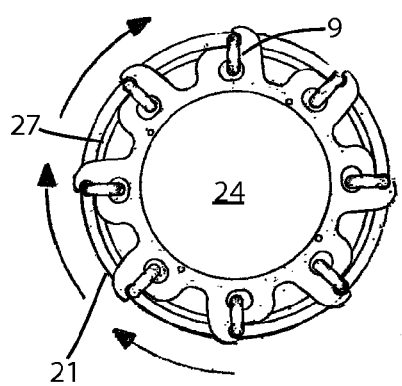
FIG. 9 provides a top plan view of an exemplary carriage bracket and an exemplary carriage assembly in a locked (i.e., engaged) position for use with an exemplary pole planter according to principles of the invention.

Now referring to FIG. 6, a top view of an exemplary carriage assembly is conceptually shown. The bracket 9 features a plurality of locking tabs and apertures for receiving hooked ends of the uprights 19. The bottom ledge 4 provides a stable base for supporting the planter 2.

Referring now to FIGS. 7 through 10, top plan views of the exemplary carriage bracket 9 with the carriage assembly in locked and unlocked positions are shown. A central opening 24 allows the bracket clearance over the top of the pole 1 structure with fittings 7 and 8 into a resting position on adapter hub 10. The adapter hub thus provides a ledge/flange for supporting the bracket 9. The carriage bracket 9 may be made from stainless steel or other suitable material that provides adequate structural integrity. Screw holes 22 may be provided to receive screws 29 for attachment of the bracket 9 to the adapter hub 10, as illustrated at 29 in FIG. 10. Notches in the bracket 9 allow the hook at the top of the carriage housing 21 uprights 19 to pass vertically. When the carriage housing assembly 16 reaches the appropriate height for engaging the hanging bracket 9 a stop ring 27 meets a stop loop ring position point 28 which contacts the underside of the bracket 9, thereby impeding further raising of the carriage housing assembly 16. As the raised carriage housing assembly 16 is rotated clockwise relative to the bracket, the hooked ends of the uprights 19 may be configured to engage openings 25 in the bracket 9 thereby releasably interlocking the carriage housing assembly 16 with the bracket 9. Inset stops 26 define the stopping point for locking engagement. Locking is achieved by lowering the carriage assembly enough for the hooked ends of the uprights 19 to engage aligned openings 25 in the bracket 9. Modification for multiple shaped poles would require the bracket 9 and carriage system 16, 19, 21 to be slightly larger and whole opening 24, in bracket 9, to match the pole shape. Alternative means for securing the planter container and carriage without requiring physically touching or turning them are automatic catch-hook-release systems in FIGS. 57-61 which may be used throughout the embodiments.

Figure 10:
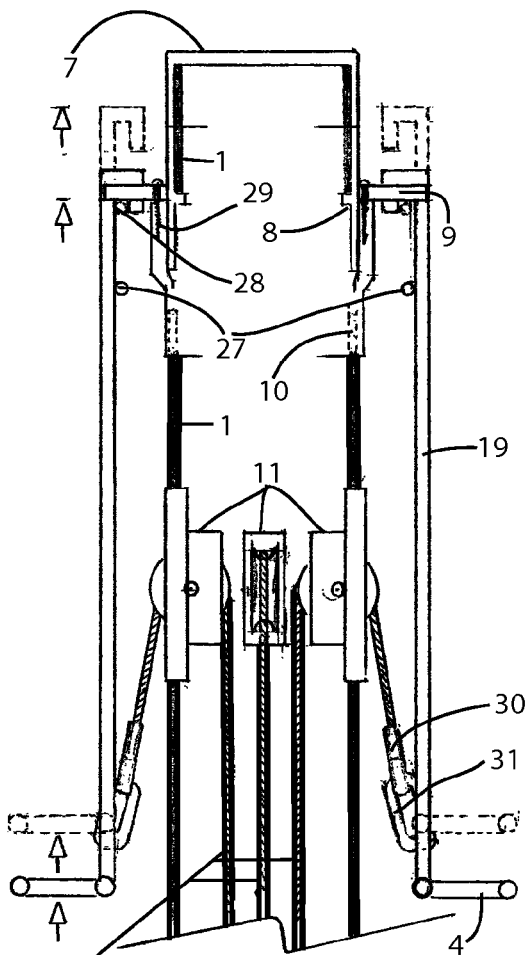
FIG. 10 provides a cutaway view of exemplary carriage and pulleys of an exemplary pole planter according to principles of the invention.
Figure 11:
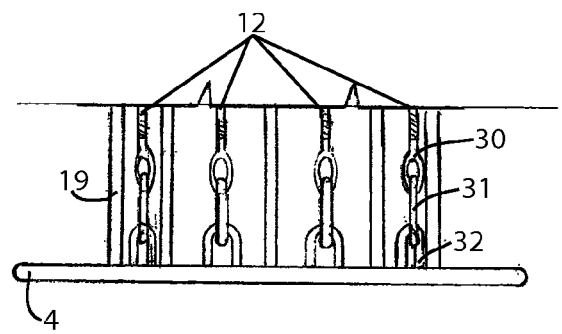
FIG. 11 provides a cutaway view of exemplary lanyards with connection hardware connected to a support ring of an exemplary carriage assembly of an exemplary pole planter according to principles of the invention.

Referring now to FIGS. 10 of the entire assembly and 11 the bottom cutaway views of an exemplary carriage and pulleys and lanyards connected to a support ring of an exemplary pole planter according to principles of the invention is provided. Releasable attachment means such as lanyard eyelets 30 coupled by spring clips 31 (e.g., carabiners) to support ring loops 32. The loops 32, which are attached to the ledge 4 of the carriage housing assembly 16, are uniformly spaced to facilitate even weight distribution (i.e., balance) which may be important when raising and lowering the carriage assembly 16 and supported planter 2.

Figure 12:
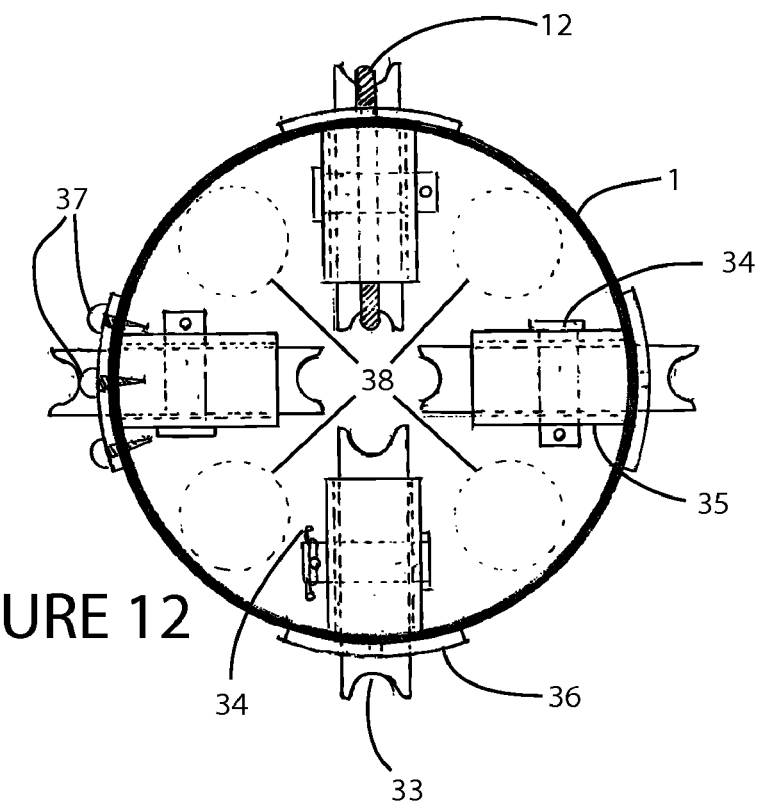
FIG. 12 provides a top view of an exemplary pulley system of an exemplary pole planter according to principles of the invention.
Figure 13:
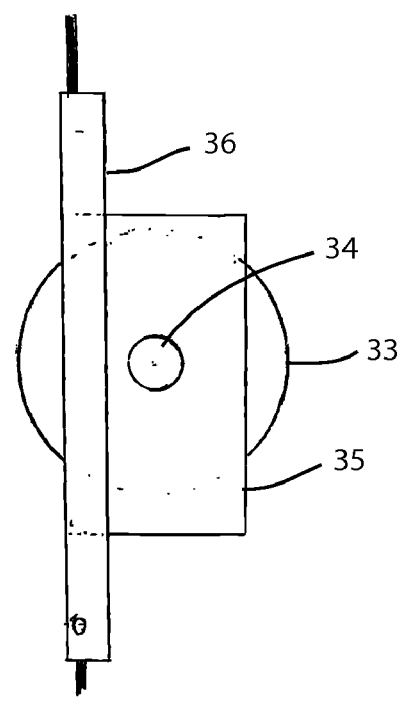
FIG. 13 provides a side view of an exemplary pulley system of an exemplary pole planter according to principles of the invention.
Figure 14:
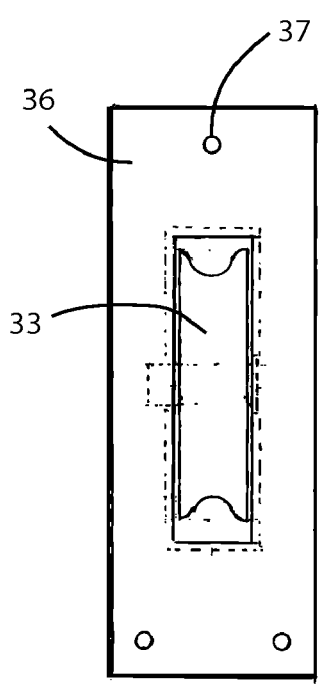
FIG. 14 provides a front view of an exemplary pulley system of an exemplary pole planter according to principles of the invention.

With reference to FIGS. 12, 13 and 14, top, side and front views of an exemplary pulley system are conceptually shown. Each pulley includes a rotatable wheel or spool 33 with a groove along its periphery for guiding a lanyard 12. Each pulley wheel 33 rotates about an axle 34, such as a clevis pin that engages the pulley housing 35. A curved pulley faceplate 36 with screw holes 37 allows flush mounting against a compatibly curved surface, such as the pole 1 surface. The sizes, number and configuration of pulleys as well as the fastening pins or devices may be varied depending upon the planter size, height and pole shape as well as other physical and dynamic characteristics. Also shown are spaces (i.e., apertures) 38 for passage of PVC or other plumbing pipe used for irrigation and drainage 42.

Figure 15:
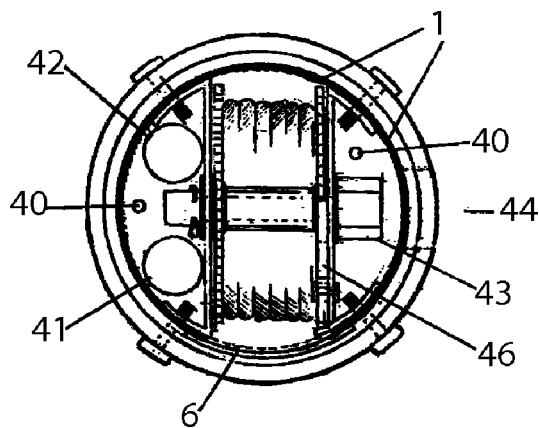
FIG. 15 provides a top view of an exemplary winch system of an exemplary pole planter according to principles of the invention.
Figures 16, 17:
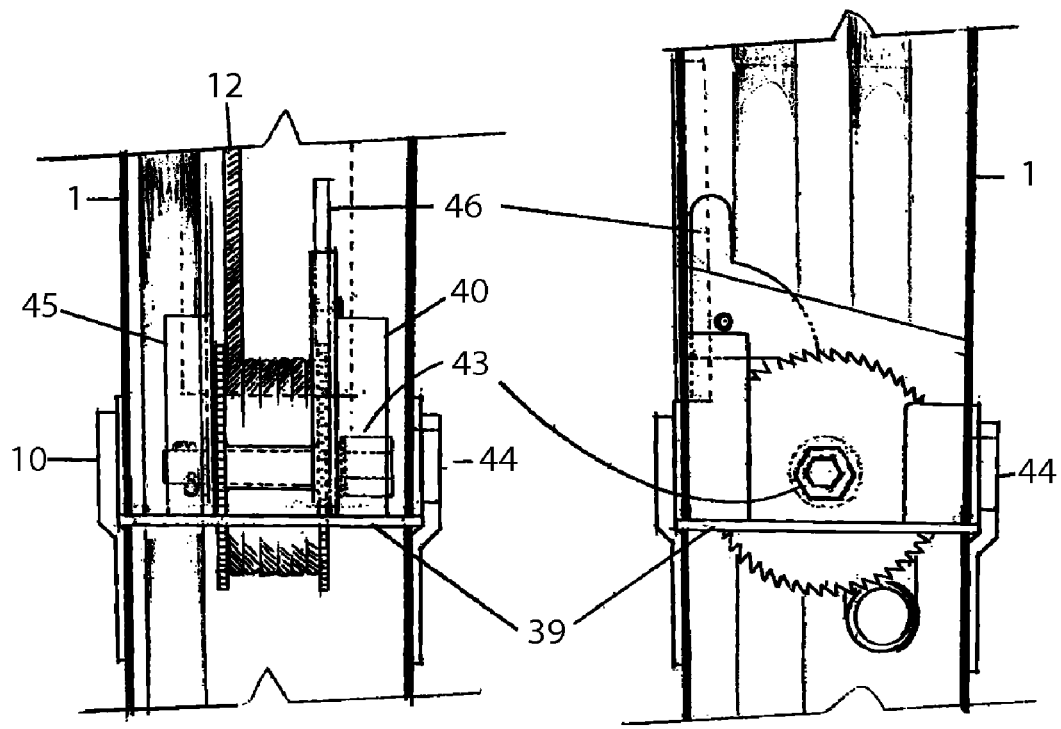
FIG. 16 provides a side view of an exemplary winch system of an exemplary pole planter according to principles of the invention.
FIG. 17 provides a front view of an exemplary winch system of an exemplary pole planter according to principles of the invention.
Figure 18:
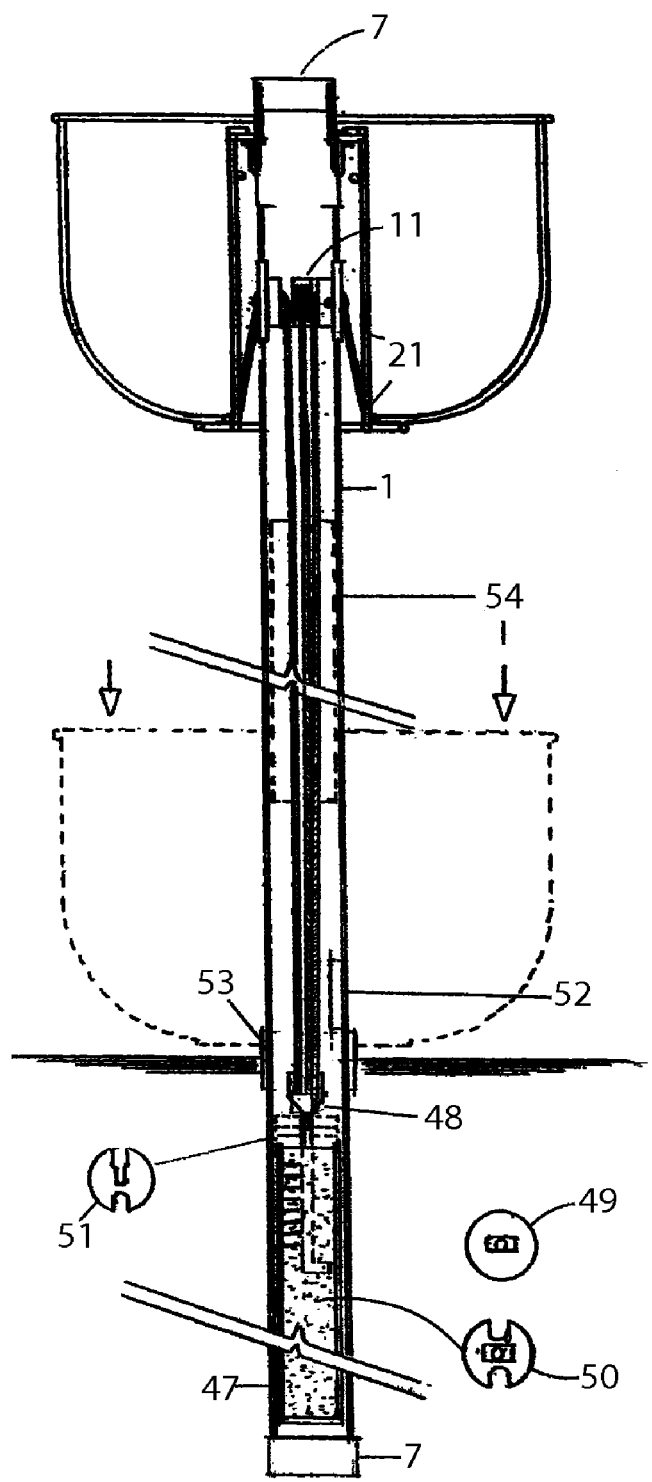
FIG. 18 provides a side cutaway view of an exemplary pole planter with a counterweight balance according to principles of the invention.

With reference to FIGS. 15, 16 and 17, top, side and front views of an exemplary winch system are conceptually shown. The winch is mounted within the pipe 1. The winch 18 is a mechanical device that is used to controllably wind and unwind the lanyards. In its simplest form, the winch may be comprised of a spool and attached crank. Designs that are more elaborate may have gear assemblies and can be powered by a motor. Some may include a solenoid brake and/or a mechanical brake, or a ratchet that prevents the winch from unwinding. A mounting plate 39 matching the pole shape includes holes for passage of plumbing 41 and drainage pipes 42. Drainage holes 40 may also be provided. A crank nut 43 for the winch axle features a double inside and outside nut for an inexpensive hand crank bar fitting inside or a standard socket wrench fitting outside around the nut. Both enter through a small access hole 44 in the pole 1 and the fittings 10 and 8. Winch mounts 45 provide stability for mounting the winch to the plate 39. A stop or hold lever is configured to controllably engage and release a rotatable gear of the winch. Upon engagement, unwinding rotation is prevented. Many standard or customized internal halyard flag pole winches could be utilized as well. If the winch were moved to the top and a pulley located towards the bottom the cable would run as if from a hoist down around the pulley back to the yoke and lanyards.

Referring now to FIGS. 18, 19, 20, 21, and 22, various alternative embodiments are conceptually shown. By way of example and not limitation, the alternative embodiment in FIG. 18 replaces a winch with an internal ballast 47 adapted to act as a counterweight against the planter and slide up and down the interior of the pole 1. To save shipping weight, the ballast may comprise a container to be filled with a dense substance (e.g., water, sand, cement, gravel or concrete) during installation. Scale lines may be provided on the container to indicate the level to which the container must be filled with a specified substance to attain a determined weight. The pulley and carriage systems as described above may be utilized. Nothing changes from just above the winch except the lanyards are longer to reach the ballast. The same means for hooking and unhooking the carriage system 21 from the bracket 9 apply as indicated in FIGS. 7 through 11. Larger pipe and different configurations as used in FIGS. 52, 62, 65, 72 and other embodiments as well as irrigation pipe being extruded into the pole or alternative catch-hook-release systems per figures may be adopted for various alternative exemplary adaptations of the ballast, winch or other raising and lowering embodiments, or combination of means for raising and lowering the carriage or planter container.

The yoke 48 is coupled to an anchor 49 of the ballast 47. Optionally, the ballast 50 may feature a configuration with indentations to allow passage of plumbing pipe. Supplemental weights 51 comprised of dense material may be provided for final ballast adjustment, as necessary. The yoke 48 may be attached and the additional weights 51 may be added through an access panel 52. Optionally, a coupling 53 may be to shorten the pole 1 shipping length and facilitate access to insert the ballast 47 and connect the lanyards 12 to the yoke 48 and the yoke 48 to the ballast. As the planter basket 2 is lowered, such as by pulling it downwardly, the ballast rises to a raised position 54 in the pipe 1.

FIGS. 19, 20, 21, and 22 provide a side cutaway, top and component views of an exemplary pole planter with a sprocket and chain actuator according to principles of the invention. In this alternative embodiment a continuous drive chain with sprockets and hand crank are provided to raise and lower the carriage housing 16 with the planter container 2, in lieu of using a winch system. The continuous drive chain operates like a bicycle chain drive. The sprocket/gear and chain can be of various materials from a variety of technologies as rubber, webbing or plastic as Delrin® belts. The winch is replaced with drive sprocket assembly 55 that may be hand cranked. An electric power motor or drill could also be used to drive the sprocket. A top pulley system consisting of a sprocket 60 and spool 61 assembly replaces the four-pulley system and lanyard system 12 described above. Top sprocket and spool assembly features a driven sprocket 60 operably coupled to a rotating shaft 57 attached to outer spools 61. A hand crank is used to turn the drive sprocket 55, which drives the chain 56 and causes the driven sprocket 60 to rotate. Rotation of the driven sprocket 60 causes the driven axle 57 and spools 61 to rotate either clockwise or counterclockwise, thereby extending or retracting the lanyards 58. A modified exemplary carriage housing 21 features four hanging arms, an abbreviated stop loop 27 so as not to be a complete loop which would hit the spools when lowering, and guide wheels 59 may be added to the inside bottom ledge 4 on the carriage 21 to facilitate even lowering and raising without banging and scratching the pole. Another modification is the lanyards 12 are split with a Y joint 58 to better balance a two-point pulley/spool lowering system. 55. A curved support plate 62 for the drive axle, spool and bearings, with mounting screw holes 63 is also provided. One or more bearings 64 are mounted to the support plate 62 for engaging and facilitating smooth rotation of the axle drive shaft 57.

Figure 23:
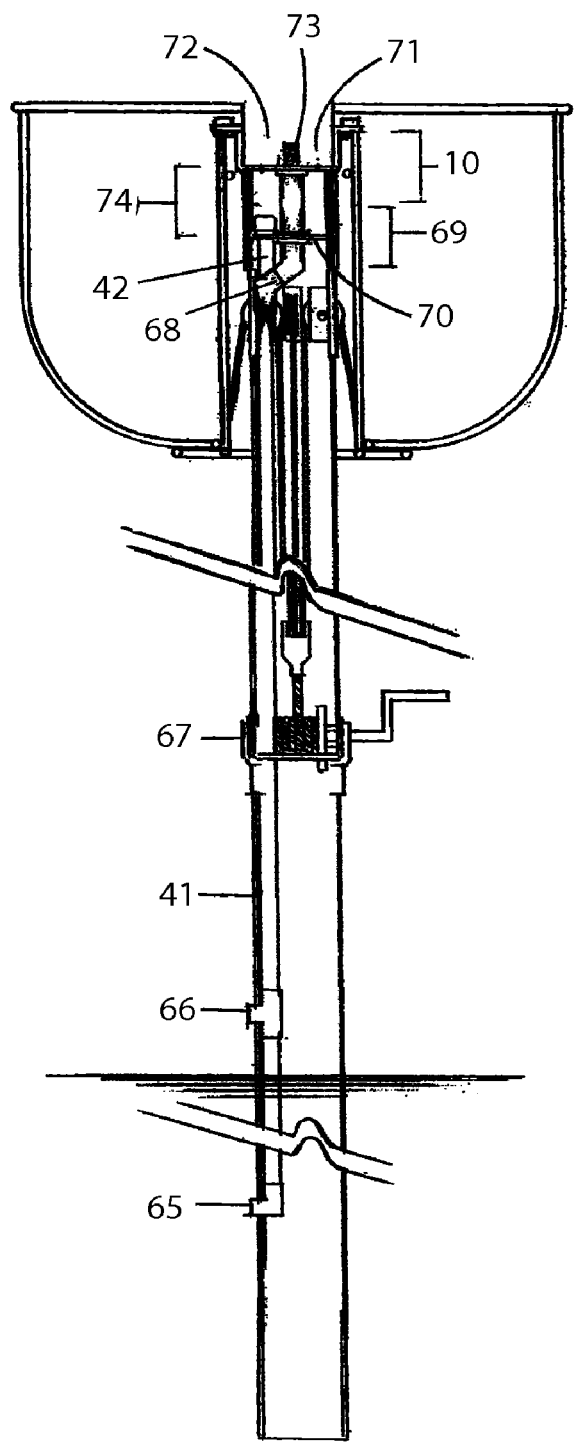
FIG. 23 provides a profile view of an exemplary pole planter with exemplary irrigation plumbing components according to principles of the invention with the planter in a fully elevated configuration.
Figure 24:
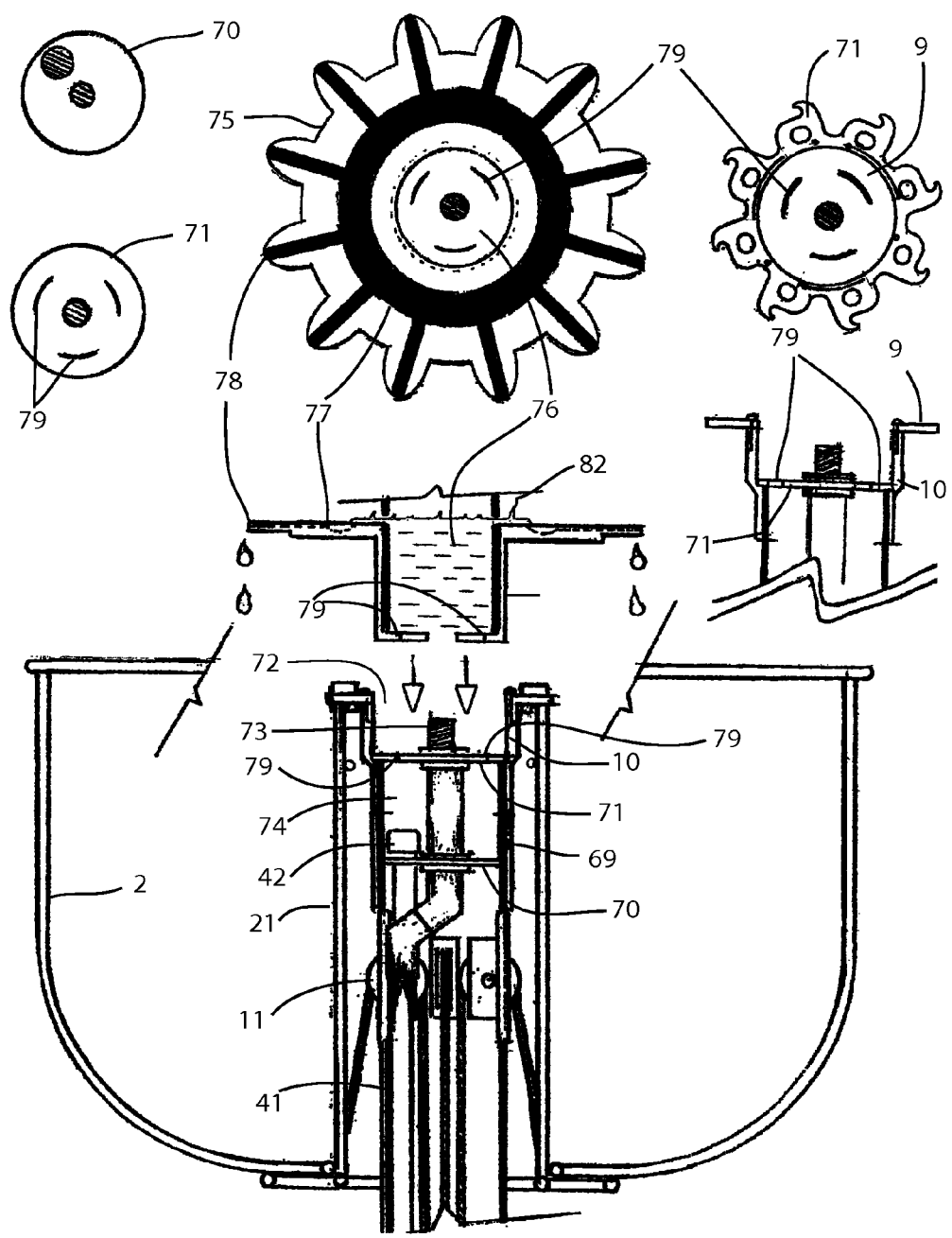
FIG. 24 provides an exploded view of an irrigation assembly for an exemplary pole planter for irrigating the planter container and surrounding area according to principles of the invention with the planter in a fully elevated configuration.
Figure 26:
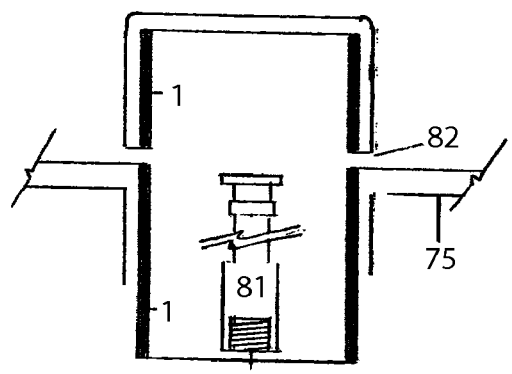
FIG. 26 provides a side view of another sprinkler assembly for an exemplary pole planter according to principles of the invention with the planter in a fully elevated configuration.

Referring now to FIG. 23, a profile view of an exemplary pole planter with exemplary irrigation plumbing components according to principles of the invention with the planter in a fully elevated configuration is shown. Water can be supplied from any conventional irrigation plumbing system through an above ground fitting 66 or a below ground fitting 65. If both fittings are supplied, an unused one should be sealed with a cap. A supply pipe 41 directs water to the top of the apparatus. Various standard joints, fittings, couplings, adapters and elbows 65, 66, 68, 73 and 74 may be utilized including sprinkler heads. Cost effective custom parts can be substituted throughout the irrigation systems and other embodiments as desired. A variety of cut off valves, timers and drains can be plumbed into the irrigation line system at or around 65 or 66. The supply pipe 41 extends up the pipe through the winch housing 67 or sprocket chain housing, which includes the fittings, plates, and winch housings as shown in FIGS. 15, 16 and 17. The same would apply to a chain drive housing alternative in FIGS. 19-22. However, the ballast alternative FIG. 18 has no raising and lowering housing. Drainage is also provided as necessary for various systems of the embodiment as shown in FIGS. 14 and 15. A drainpipe 42 enters an over flow chamber 74 created by a stop joint fitting 69 (which is fitting designated as 8 earlier) and a disk 70 bonded into place. This chamber 74 is watertight guarded by various PVC fittings, washers and threaded connectors. The 4" PVC pipe 1 wall connects with the PVC adapter sewer hub 10 above it. Another approximately 3/16"×4" PVC disc 72 glued in the middle of 10 separates the over flow chamber from the irrigation units that can be inserted at 71. The disk 72 provides a bottom seal for the water over-flow chamber 74. Two holes are provided in the disk for water supply line 41 and for 42 the drainage flow. Another disc 71 is inserted into PVC adapter hub fitting 10 to close the chamber 74 at the top. Drain slits 79 in the face of the disk 71 allow over-flow water to enter the chamber. An open area 72 above the chamber 74 receives a water-holding cup with an adjustable water distributor 75, as shown in FIG. 24. An irrigation thread connector with a washer 73 is provided for attaching a sprinkler head. Modifications to accommodate different pole sections may be made to part items, sections and placement as necessary above the pulleys 12.

Referring now to FIG. 24, the irrigation assembly 75 includes a reservoir cup 76 for water and a dish or wheel on top of the reservoir. When the cup 76 fills with water it over-flows, through holes 82 in the pole 1 wall, out over the dish/wheel first into a deep reservoir ring grooved into a circle around the cup 77. Then the water flows out into shallower canals 78 equally distributing the water to all areas of the planter container 2. Slits 79 in the bottom of the cup 75 match those in plastic disk 71 glued into PVC adapter head 10. Water flow to the planter container is adjusted by turning the dish/wheel with cup 75 so the slits either line up matching each other in an open position allowing the maximum amount water to escape down the drainpipe 42 or in any closing position so less water drains away in 42 and flows to the planter container. An operator adjusts the flow for the specific plants used as well as seasonal needs by adjusting the degree of alignment between the slits. Matching lines 80 may be provided on the carriage-hanging bracket 9 and the outside of the reservoir cup 75 to visually indicate the degree of alignment of the drain slits 79. It is not necessary for the disk 71 to be totally sealed to the cup 75 above it. It is not tight, allowing for the wheel plate on 75 to be turned to adjust water flow and to drain off the remaining water in the cup on 75 after an irrigation cycle is completed. Various parts may be combined into one injection molded plastic unit. Optionally, the cup 77 and chambers 74 may be omitted or removed, providing an alternative embodiment with a water distribution disk 71. Alternatives to this irrigation assembly are provided through out this embodiment.

Figure 27:
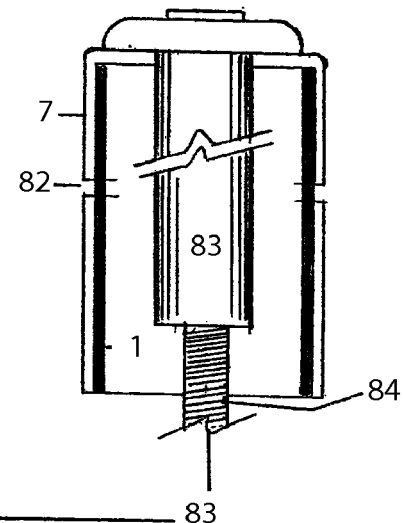
FIG. 27 provides a side view of a water fountain sprinkler assembly for an exemplary pole planter according to principles of the invention with the planter in a fully elevated configuration.

Now referring to FIGS. 25, 26, 27, 28, 29 and 30, various sprinkler heads are shown. Each sprinkler head can be inserted individually into the receiving chamber 76 onto an irrigation threaded connector and washer 73, which is covered by an irrigation housing consisting of a piece of pole pipe 1 connected to an end cap 7. Sprinkler heads have female threaded holes at the bottom for screwing it water tight into 75 or 72. Each alternative provides different irrigation effects. The sprinkler shown in FIGS. 25 and 26 waters the planter container only, using different embodiments; while the sprinkler shown in FIG. 27 provides pattern decorative fountain spray patterns for water ponds and may provide water to the planter container indirectly; while the sprinkler shown in FIGS. 28, 29, and 30 waters the surrounding area only and not the planter container which is watered by hand after lowering; and the sprinkler shown in FIG. 31 is a rotating pop-up impulse sprinkler head assembly that waters both the plant and surrounding area.

Referring again to FIG. 26, the sprinkler head 81 is one of a variety of heads from many manufacturers that can adjustably control water flow to the planter container as high pressure bubblers, sprayers, or drippers. In this example the head can be screwed into place on 73 with a washer after 75 is inserted into 72. Then the constructed cap housing 7 is placed over the top. As in FIG. 15, water fills the cup 76 and flows out the holes 82 through 77 and 78 into the planter container. An optional soaker system can be designed to replace these systems (not shown). Water flow can be controlled at the sprinkler head or with the use of standard irrigation/plumbing controls at the pole base. Alternative systems can be designed from off the shelf standard low pressure micro irrigation systems offered by many manufacturers as embodied in FIGS. 34-37.

Referring now to FIG. 27 a fountain spray head 83 is provided for special visual effects. A variety is available including special effect units from the pond industry. This unit does not require the cup and distribution dish 75, which could be used if a particular head returned water over spray back into the planter container area. Fountain spray head units can be used in "Planter Posts" installed in ponds or elsewhere as desired. Therefore, the holes 82 may be omitted. The thread connector 82 can be longer than others depending on the height of 83. No sealing of the space 72 on the drainage chamber 74 may be needed. A hole in the top of the cap 7 is drilled to allow the body of the head to be inserted until its top cap rests against 7. The thread connector may be cut or selected to make the proper connection and seal. A variable irrigation connector 84 may be provided to make up any height difference in units. The fountainhead concept can be used in the optional waterfall unit in FIGS. 76 and 77.

Figure 30:
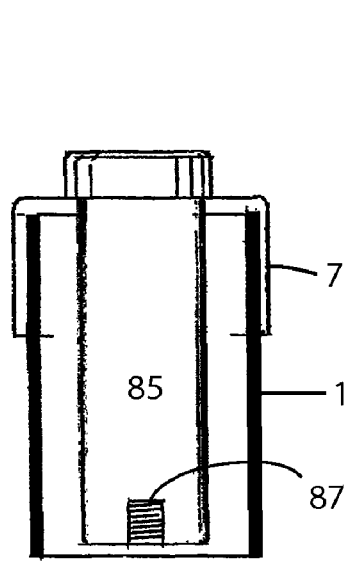
FIG. 30 provides a side view of another sprinkler in the down position for watering the surrounding area by an exemplary pole planter according to the principles of the invention.
Figure 29:
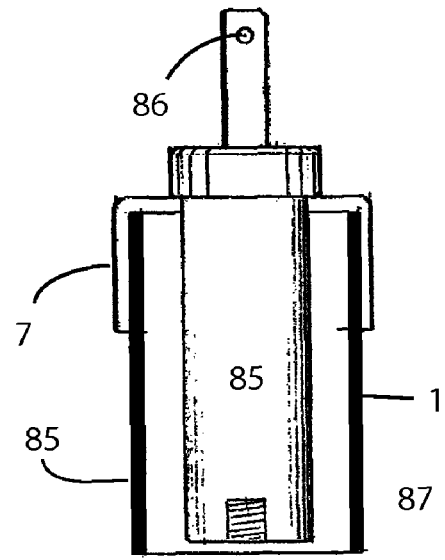
FIG. 29 provides a side view of another sprinkler in the up position for watering the surrounding area by an exemplary pole planter according to the principles of the invention.
Figure 28:
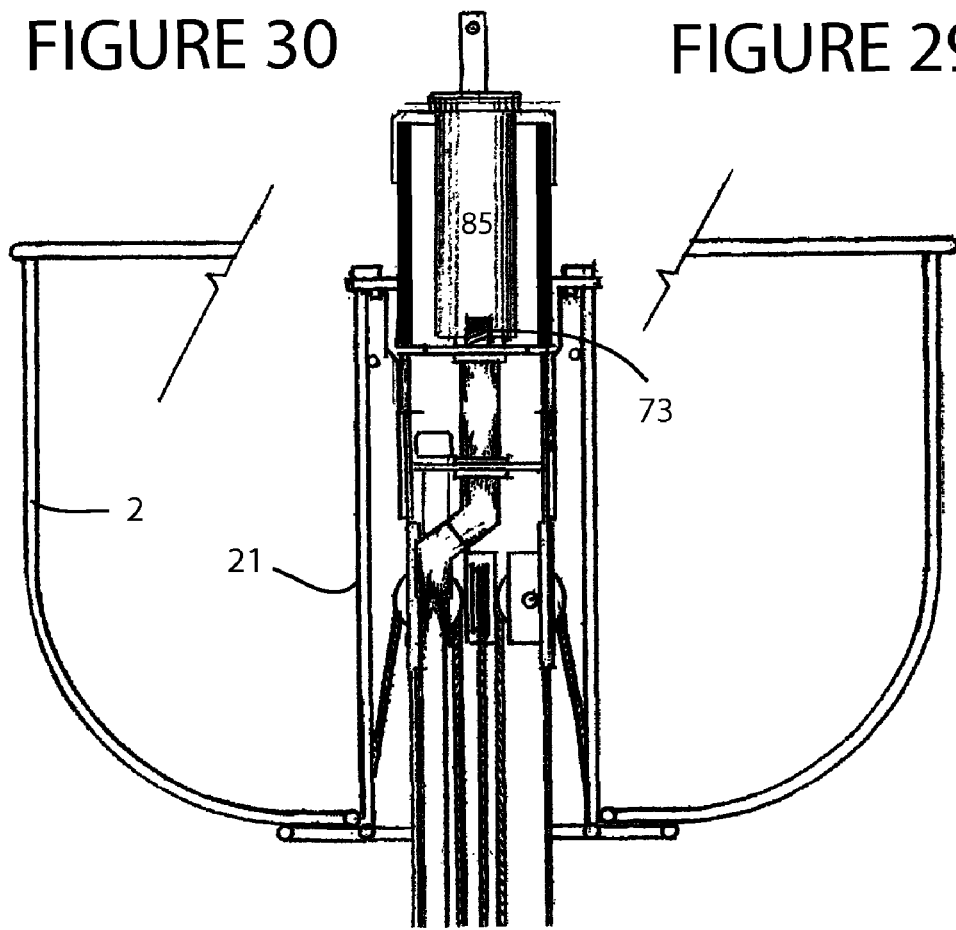
FIG. 28 provides a side view of another sprinkler assembly for watering the surrounding area by an exemplary pole planter according to principles of the invention with the planter in a fully elevated configuration.
Figure 31:
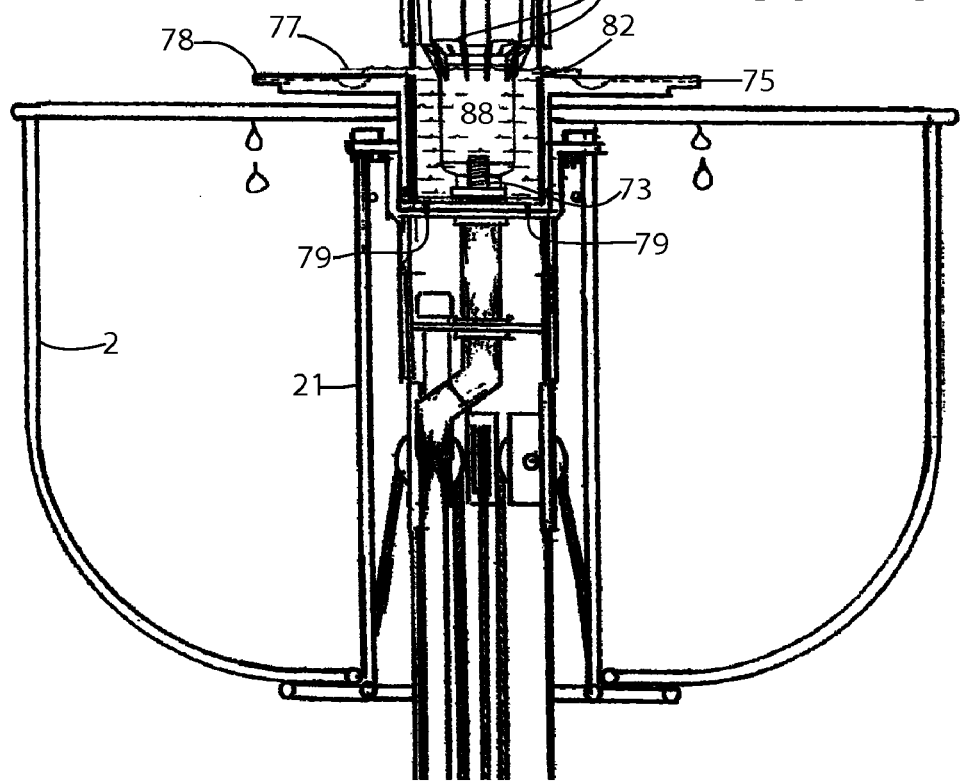
FIG. 31 provides a side view of another sprinkler assembly for irrigating the planter container and surrounding area by an exemplary pole planter according to principles of the invention with the planter in a fully elevated configuration.

Now referring to FIGS. 28, 29 and 30, a variety of standard rotator sprinkler heads and nozzles are available. Most are gear driven some pop-up out of their casings and produce additional water flow, which can be utilized in FIG. 24 for distribution to the planter container while others do not. Those that do not can irrigate the surrounding area. The planter container would be watered by hand when lowered or from the ground up with a hose. Therefore, the cup dish piece 75 is not required or the drain holes 82. The head pops up when water pressure is on and sprays through the small jet opening 86. The cap 7 and the pole piece 1 makes the top outside unit with a hole drilled in the top of 7 for matching the sprinkler head's body as in FIG. 27. The unit then screws into the connector with as optional washer as shown previously in 73. The sprinkler head in the down position 85 in FIG. 30 without water pressure and the sprinkler head in the up position if FIG. 29 with water pressure sprinkling only the surrounding area is shown. Female internal threads 87 are provided for threadedly engaging the sprinkler head. FIG. 30 also represents an example of the operating non pop-up gear driven rotator or a rotary nozzle sprinkler head models. Optionally watering the planter container and surrounding area is achieved with this sprinkler head as in FIG. 53 by the addition of standard micro irrigation parts that irrigate the planter containers using the same sprinkler head. A variety of standard gear driven sprinkler heads can be used with varying volumes of additional water flow that must be drained. Whereas this exemplary drawing uses an additional chamber for major over flow FIG. 53 provides safety drainage 116 without an additional chamber.

Figure 33:
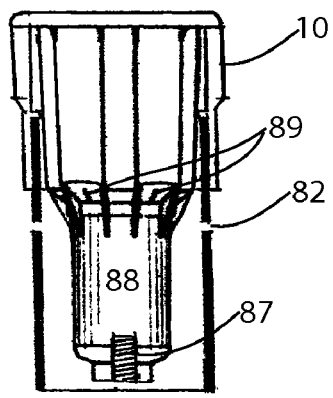
FIG. 33 provides a side view of the sprinkler in the down position for irrigating the surrounding area by an exemplary pole planter according to the principles of the invention.
Figure 32:
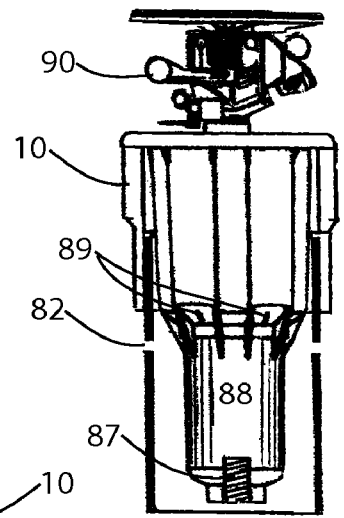
FIG. 32 provides a side view of the sprinkler in the up position for irrigating the surrounding area by an exemplary pole planter according to the principles of the invention.

Referring now to FIGS. 31, 32, and 33, an embodiment with a rotating pop-up impulse sprinkler head for watering the planter container and a surrounding area is shown. A rotary pop-up impulse sprinkler head 88 is shown in the down position without pressure in FIG. 33 and in the up position with water pressure watering both the planter container and surrounding area in FIG. 32. The adjustable distribution cup and dish unit 75 are used and the overflow water drain holes 82 to the dish are used. The water to the reservoir cup 76 is provided by drain holes 89 in the rotary pop-up impulse sprinkler heads. The top sprinkling mechanism 90 in a rotary pop-up impulse sprinkler head during its normal operation splashes large amounts of water into its own casing area that has to be drained off at 89. Water flow to the planter container can be reduced up to full stoppage by opening up the slits 79 (i.e. matching them together) thereby draining all the water over flow through 74 down the drainage pipe 42. Custom sprinkler head systems and plastic injection molded pieces combining various parts can be substituted to accomplish similar results.

Figure 34:
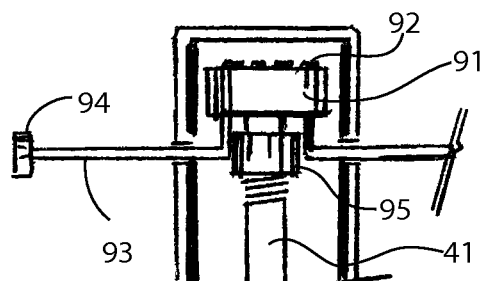
FIG. 34 provides a side view of a micro irrigation assembly with muffler/emitter head and distribution system for watering the planter container according to the principles of the invention.
Figure 35:
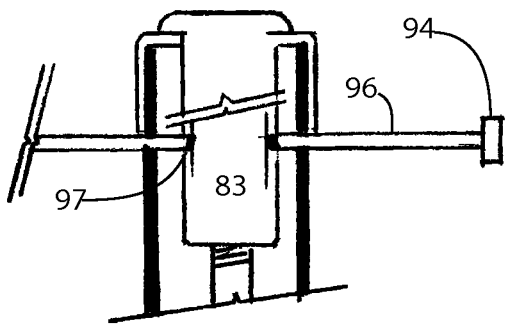
FIG. 35 provides a side view of a micro irrigation assembly added to other sprinkler head embodiments for watering the planter container and surrounding area according to the principles of the invention.
Figure 36:
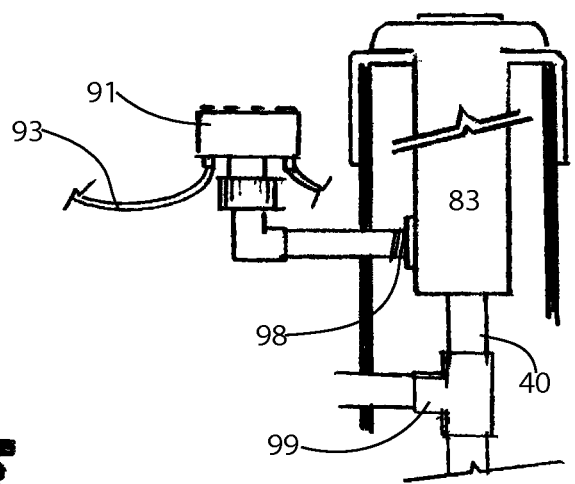
FIG. 36 provides a side view of a micro irrigation muffler/emitter and assembly of parts added to other sprinkler head embodiments for watering the planter container and surrounding area according to the principles of the invention.
Figure 37:
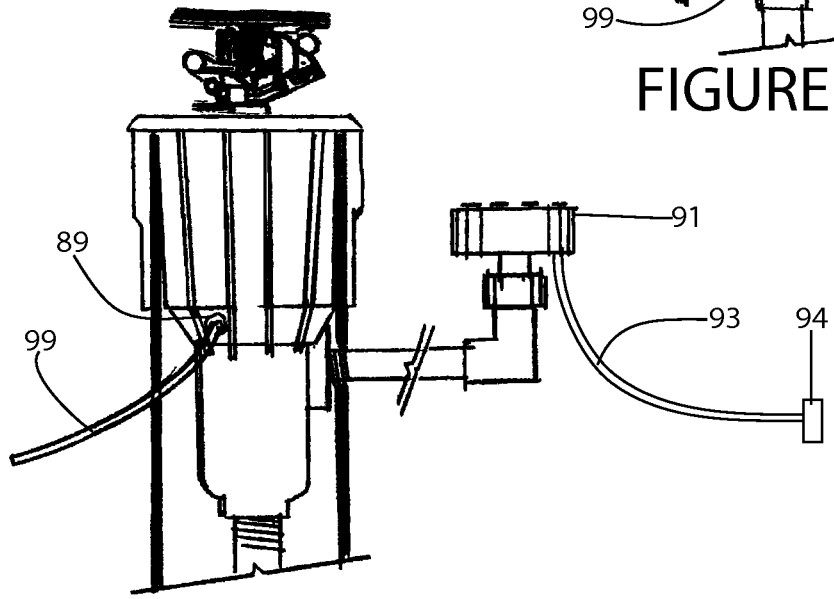
FIG. 37 provides a side view of a micro irrigation muffler/emitter and assembly of parts added to other sprinkler head embodiments for watering the planter container and surrounding area according to the principles of the invention.
Figure 38:
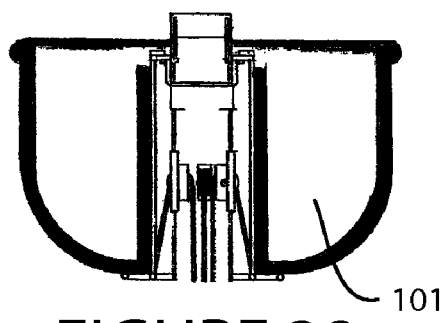
FIG. 38 provides views of Bundt-style solid planter container application for an exemplary pole planter according to principles of the invention with the planter in a fully elevated configuration.
Figure 39:
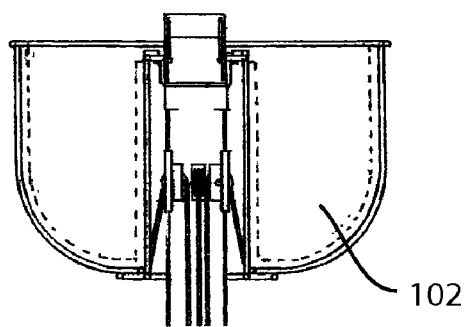
FIG. 39 provides views of a coco liner wire basket planter container accessory application for an exemplary pole planter according to the principles of the invention with the planter in a fully elevated configuration.
Figure 40:
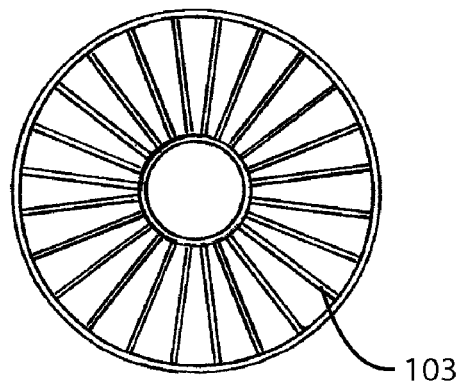
FIG. 40 provides a top view of a wire basket planter container without coco liner according to the principles of the invention.
Figure 41:
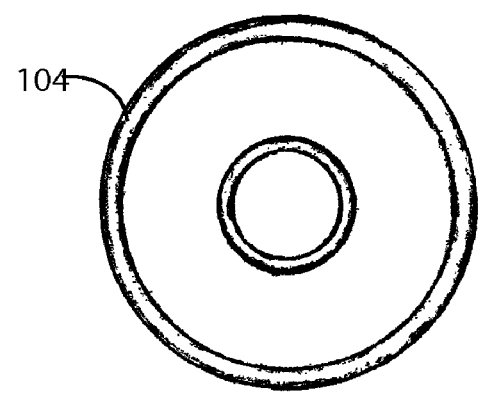
FIG. 41 provides a top view of a solid Bundt style planter container according to the principles of the invention.
Figure 42:
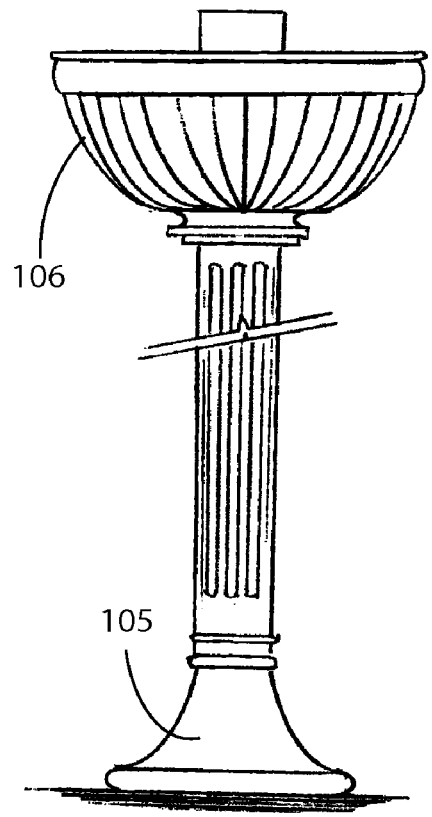
FIG. 42 provides a side view of a planter container unit in a fully elevated configuration accessorized with options according to principles of the invention.
Figure 43:
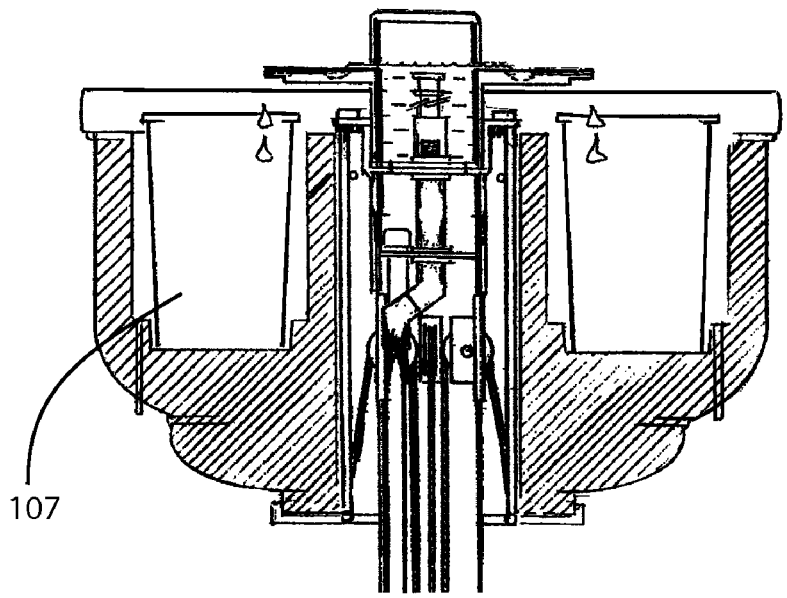
FIG. 43 provides a side view of alternative replaceable pots inside a planter container for an exemplary pole planter container according to principles of the invention with the planter in a fully elevated configuration.
Figure 44:
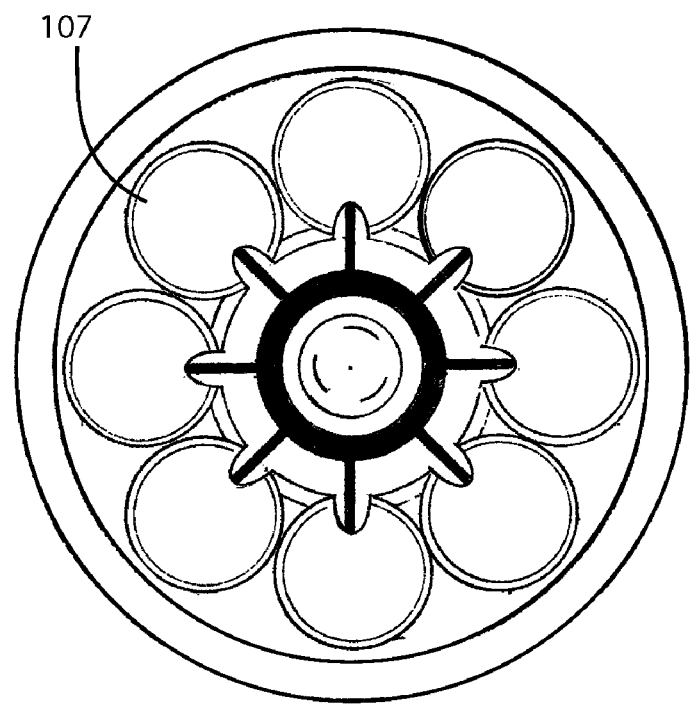
FIG. 44 provides a top view of alternative replaceable pots inside a planter container for an exemplary pole planter according to principles of the invention.

Referring now to FIGS. 34, 35, 36 and 37 an embodiment of micro irrigation embodiments for watering pole planter containers independently or included with embodied sprinklers as in FIGS. 25-32 which irrigate the surrounding area. A variety of standard parts including pressure regulators may be adopted at various points in a system as necessary as-well-as custom parts and assemblies can be developed to enhance the irrigation system. The addition of a micro irrigation assembly slaved to the main water supply with other sprinkler heads can be designed to have little effect on the systems pressure. FIG. 34 uses a variable micro irrigation muffler/emitter 91 threaded into the PVC irrigation line at the pole top above the planter container for watering it only. A variety of fixed flow or variable flow units are available with a plurality of valves which hose lines are attached to. Units with more valves available than used can be closed or implemented to irrigate the surrounding area and be placed at the bottom of the pole as in FIG. 65. The variable valve muffler/emitters 91 with standard parts, joints and fittings allow the planter container to be irrigated with but a single valve and line while the others can be directed out to the surrounding area. This unit 91 uses adjustable threaded screw bolts to open, close or control water flow out of the muffler/emitter through various joints, parts and ¼" flexible hose 93 to the hose end 94 where a variety of micro fixed or adjustable drippers, bubblers or sprayers can be attached as necessary. FIG. 35 adds micro irrigation to the planter container by screwing a plurality of non-flexible micro irrigation pipes 96 into the sprinkler and nozzle head casings 83 and 85 as in FIGS. 27, 28 and other embodiments. End distribution devices as 94 are added as necessary. Greater detail is provided in FIG. 53. FIG. 36 adds the emitter/muffler 91 to an alternative side portal 98 common in many sprinkler head casings or an alternate slave micro irrigation joint 99 can be added to the main PVC irrigation or watering line. FIG. 37 adds micro irrigation to the pop-up rotating impulse sprinkler head 88 in FIGS. 31-33, like in FIG. 36 through a side portal adding a muffler/emitter 91 with a variety of dispenser ends 94. The normal drainage of extra water at 89 can be directed to the planter container without the system in FIGS. 31-33 by attaching a ¼" flexible rubber hose to a standard threaded connector 100 and screwing it into the sprinkler head casing. FIGS. 36 and 37 or other embodiments using a side portal can establish a continuous irrigation line circle back to the portal over the planter container with a variety of bubblers, drippers, or sprayers etc. (not shown). While a variety of standard and micro irrigation components and assemblies represent specific uses, the invention is not limited to specific irrigation components.

Referring now to FIGS. 38-44 various accessories and other applications are shown for the exemplary pole planter units demonstrated to this point. A composite container 101 features a unique shape required by the "pole planter". The thick walls create an upside down or angel food cake pan or Bundt shape. The composite material lends itself to a variety of designs as can be seen in 106. A coco liner 102 may fit into the wire container. Coco liners can be used in the other embodied planter containers as necessary. A wire container top view 103 shows that the container may have no inside structure. The same concept is used for the alternative carriages in the FIGS. 52-61. The carriage housing 16/21 serves as a wall for the coco liner to set against. A typical container or coco liner is shown as 104. An ornamental pole or a pole cover base is shown as 105. Pole covers can be pushed up and hooked into position on the pole 1 behind the carriage housing to use access panel before lowering the container. The basic design can be modified for any pole shape and configuration. Pole collars can aesthetically provide a variety of shapes to the design including square. An ornate container is shown as FIGS. 43 and 44 in A side cutaway view and top view of a planter container features an alternative plurality of exchangeable or replacement plastic pots 107. Rectangular or irregular shapes can be used to custom fill space, however better growth results occur if spaces between pots are filled with sphagnum or Spanish moss to reduce any heat transfer from the composition planter container. Exchangeable pots 107 allow mature plants grown elsewhere in matching pots to be exchanged without waiting weeks for growth and flowering. This is important for commercial use as unhealthy plants can easily be replaced and seasonal or promotional changes can easily be made. Additionally soil conditions can be adjusted per specific plant needs.

Figure 45:
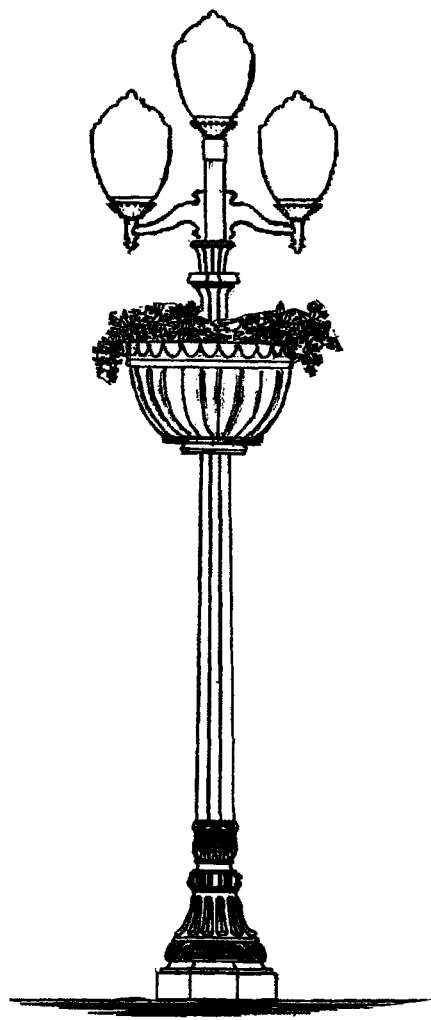
FIG. 45 provides a profile view of an exemplary ornamental street light pole adapted with an exemplary pole planter according to principles of the invention.
Figure 48:
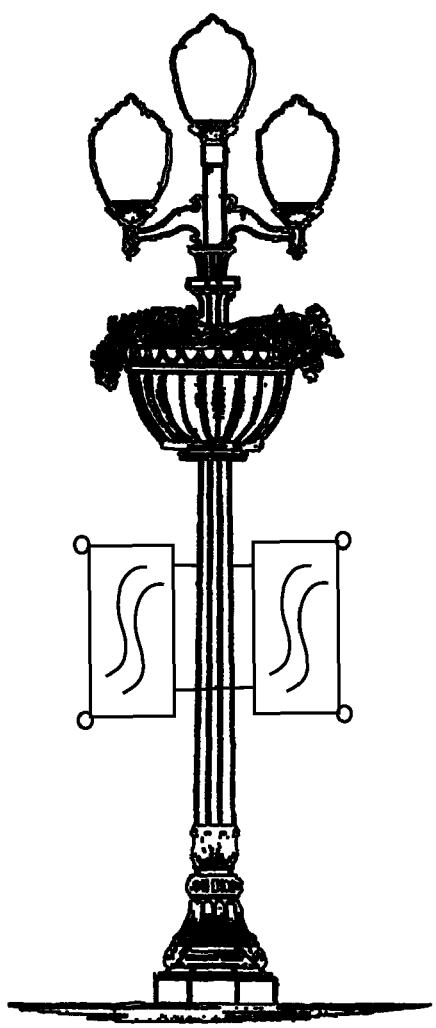
FIG. 48 provides a profile view of an exemplary pole planter for an ornamental street light pole using a banner attachment accessory according to the principles of the invention.
Figure 46:
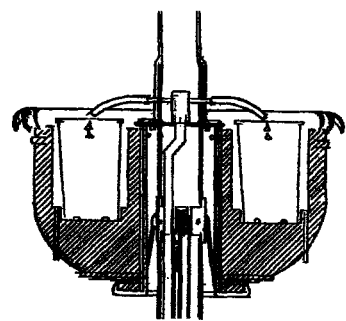
FIG. 46 provides a section view of an exemplary pole planter for an ornamental street light pole according to principles of the invention.
Figure 47:
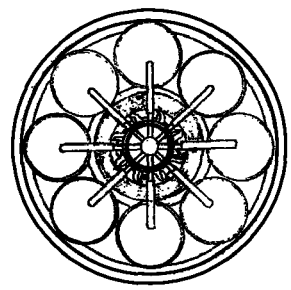
FIG. 47 provides a top view of an exemplary pole planter for an ornamental street light pole according to principles of the invention.

Referring to FIGS. 45, 46, 47, and 48, profile, section and top views of an ornamental street light pole adapted with an exemplary pole planter according to principles of the invention are shown. Specifically, FIG. 45 provides a profile view of an exemplary ornamental street light pole adapted with an exemplary pole planter according to principles of the invention. Since the pole is tapered, the catch-hook-release system as in FIGS. 7-10 and 57-61 would be modified to extend further out from the pole to match the bottom diameter as necessary (not shown). Rollers 120 in the carriages can also use spring aided tension as necessary. FIG. 47 provides a section view of an exemplary pole planter for a street light pole according to principles of the invention using the alternative exchangeable pots 107 as in FIGS. 43 and 44. FIG. 47 provides a top view of an exemplary pole planter for a street light pole according to principles of the invention. An electric winch or other lifting means may be utilized to raise and lower the planter. A solenoid valve and timer may be utilized to control watering. Irrigation parts are standard off the shelf units variably controlling water flow from high pressure or lower pressure micro irrigation systems per the various embodiments. If utility water supply is unavailable, the unit may be equipped with a reservoir. Drainage may flow downward from the planter container. Adaptations (not shown) may be designed for easily removable double or single banner signs used on such ornamental street light poles that do not interfere with the raising and lowering of the planter container as per the exemplary double banner FIG. 48. The exemplary pole planter systems can be even subdivided into two equal halves with a space or gap between to raise and lower around the standard banner arm bars (not shown).

Figure 49:
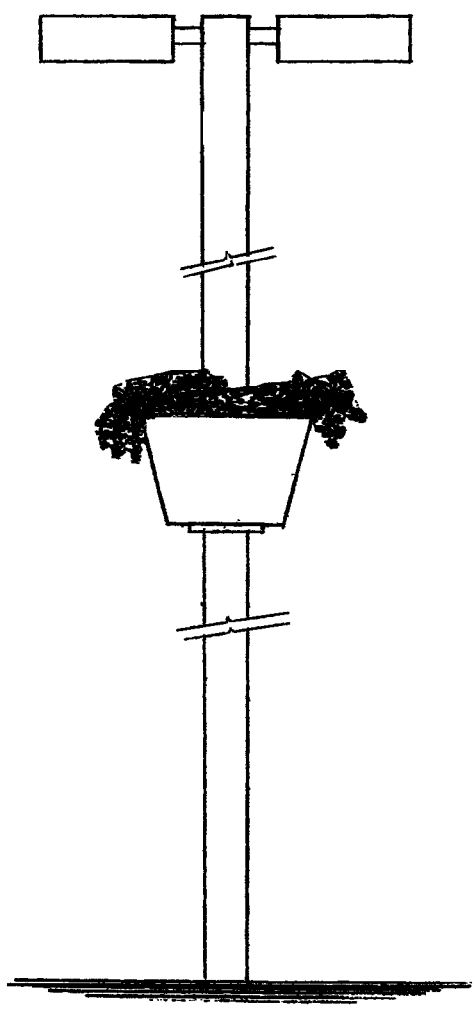
FIG. 49 provides a profile view of an exemplary parking lot or street light pole adapted with an exemplary pole planter according to principles of the invention.
Figure 50:
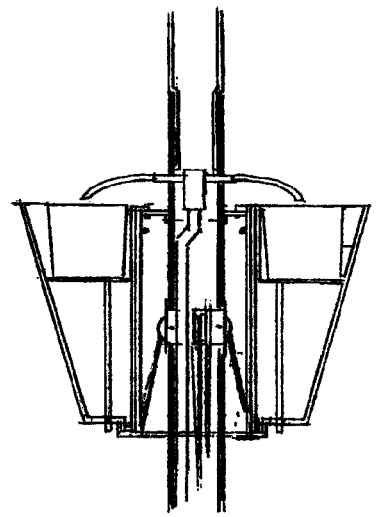
FIG. 50 provides a section view of an exemplary pole planter for a street light or parking lot pole according to principles of the invention.
Figure 51:
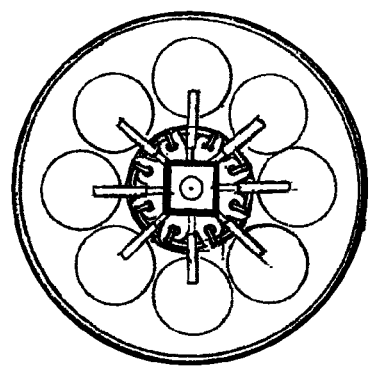
FIG. 51 provides a top view of an exemplary pole planter for a street light or parking lot pole according to principles of the invention.

Referring to FIGS. 49, 50 and 51, profile, section and top views of a street light pole adapted with an exemplary pole planter according to principles of the invention are shown. Specifically, FIG. 49 provides a profile view of an exemplary street or parking light pole adapted with an exemplary pole planter according to principles of the invention. FIG. 50 provides a section view of an exemplary pole planter for a street or parking light pole according to principles of the invention. FIG. 51 provides a top view of an exemplary pole planter for a street or parking light pole according to principles of the invention. An electric, hydraulic or pneumatic winch and/or other lifting means or means may be utilized to raise and lower the planter. A solenoid valve and timer may be utilized to control watering. If utility water supply is unavailable, the unit may be equipped with a reservoir. Drainage may flow downward from the planter container. Adaptations may be designed for easily removable banner signs used on such ornamental street light poles that do not interfere with the raising and lowering of the planter container or halving the planter container system as previously mentioned can be achieved (not shown). New development of white LED's provide for decorative lighting systems to illuminate poles and planter containers from inside and outside the structures (not shown).

Referring to FIGS. 52-61, they are profile and cut away sections of top, side and angular views of an exemplary alternative Block and Tackle embodiment for raising and lowering planter containers using alternative planter containers, carriages, poles, and irrigation for an exemplary pole planter system according to the principles of the invention. The exemplary pole 1 as shown in FIG. 52 is a 2 piece 4" and 6" Schedule 40 PVC (solid or foam core), sleeved together with a standard 4×6 PVC/DWV coupling fitting 108. The fitting offers an alternative bottom stopping point for the carriage and planter container not in previous designs. The Block and Tackle system consists of a moving gang of pulleys seen in FIGS. 52, and 54 shown in the top position 109 and 110 when the planter container is lowered at 13. It is attached at the top by the lanyards through the exemplary deck pulley system per FIGS. 12-14 to the carriage with any variety of similar hardware per FIGS. 10 and 11. The lower fixed position gang of pulleys 115 in FIGS. 52 and 55 is connected to the moving set by a rope 111 which is also pulled through a standard compression attachment at 113 (detailed drawing not shown) on the pole allowing for controlled holding or release and can be wrapped around a tie off bar at 114. A variety of pulley gangs with multiple sheaths can be used to match, weight and distance this one is at an approximate 60-pound load and a 6:1 ratio pulls at about 10 pounds. The distance between the moving gang of pulleys at 109 and 110 matches the distance the planter container must travel from the top to the bottom position. Per the previous embodiments, access panels can be provided as necessary 6. Similarly, for lighter smaller units a standard flag pole internal halyard system can be used with a standard compression cleat attachment 113.

Figure 61:
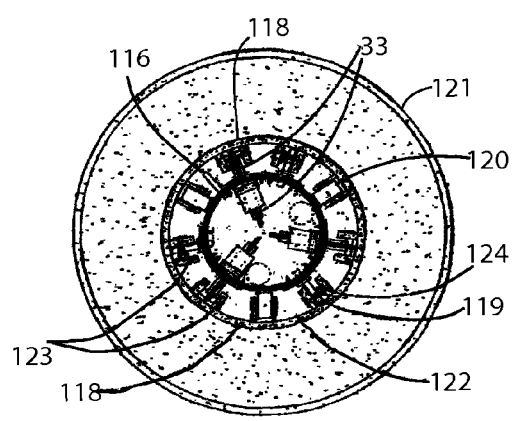
FIG. 61 provides an enlarged top view cutaway of an exemplary alternative carriage system for an exemplary pole planter according to the principles of the invention.

Referring to the irrigation drawing in FIG. 53, the sprinkler head is a gear driven unit for watering the surrounding area as 85 in FIGS. 28-30 without the drainage chamber 74 or the cup and water distribution piece 75. Standard micro irrigation connectors, elbows and ¼" rubber hoses 116 can be attached glued and/or screwed into the PVC connector fitting 8 as shown in FIGS. 2 and 10 to drain any occurring overflow. The hose continues down through the carriage and out the bottom as seen in FIGS. 51 and 61. The planter container is watered with a plurality of standard micro irrigation parts 94 and 96 as seen in FIG. 35. A stiff rubber ¼" tube 96 uses a threaded connector, which is screwed into the casing for 85 at 97. An adjustable flow micro dispenser part 94 can be a dripper, bubbler or sprayer feature attached to 96. An additional adjustable flow controller can be installed at 117 as necessary per unit. Alternatively, to water the planter container, a micro manifold/emitter, with or without timer and/or control valve can be installed at the bottom inside or outside the pole 91, FIG. 65. Some standard manifold/emitters feature up to 12 adjustable valve lines which if placed at the bottom can also be used to water the surrounding area. Custom sprinkler heads can be developed for combining the micro irrigation features shown in FIG. 53 and the other embodiments.

Figure 57:
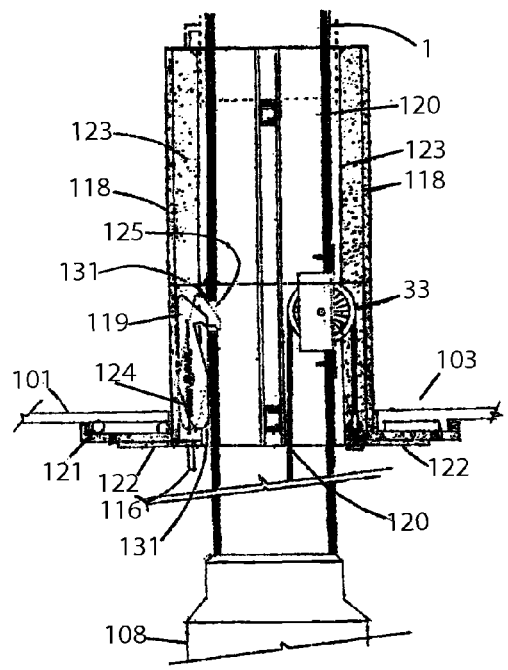
FIG. 57 provides an enlarged side view cutaway of an exemplary alternative carriage, and planter container system for an exemplary pole planter according to the principles of the invention.

Referring now to The other FIGS. 57-61 introduce a new exemplary alternative carriage 118 useable with FIGS. 52-56 and other embodiments, featuring a catch-hold-release mechanism 119, pulley system sheaths 33, rollers 120 and variable carriage design 118 useable for planter containers 101 and 103. The Carriage 118 is made of solid material versus the exemplary wire unit in FIGS. 5, 6 and 10. The carriage as seen in FIG. 57 can be a 1-3 piece unit varying from a one-piece injection molded unit combining the tray 121 and/or the strength plate 122 with 118 or as an extrusion for 118, and individual plates or disks for 121 and 122 as necessary depending on the size and weight of the planter container. The exemplary FIG. 60 top view shows a plurality of nine vertical channels of two sidebars each 123 as a part of the carriage 118. This creates a separate attachment place of three each similar channels equally spaced around the carriage for the necessary mechanical operating devices which move, support and keep the carriage in balance. Those being three each, for the rollers 120, deck pulley sheaths 33 and the catch-hold-release mechanism 119 which are all pinned as with a clevis pin or other to 123 and/or operate in the channel between the side bars. The side bars are of a plurality of sizes, thicknesses and spacing, as necessary.

Figure 58:
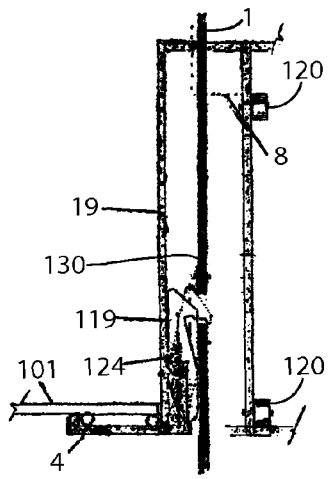
FIG. 58 provides an enlarged side view cutaway of an exemplary alternative carriage catch-hook-release system for a wire basket and carriage for an exemplary pole planter according to the principles of the invention.
Figure 59:
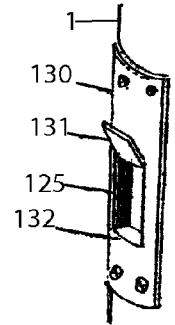
FIG. 59 provides an enlarged angular profile of an exemplary alternative carriage catch-hook-release upper pole mounting plate for an exemplary pole planter according to the principles of the invention.
Figure 60:
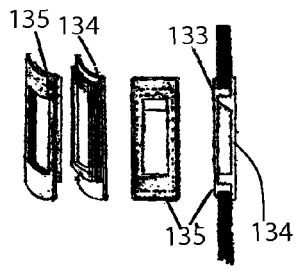
FIG. 60 provides an enlarged profile, side and angular view of an exemplary alternative carriage catch-hook-release lower pole mounting plate for an exemplary pole planter according to the principles of the invention.

Referring to the exemplary catch-hook-release mechanism 119 in FIGS. 57, 58, and 61 it is an alternative embodiment as described in FIGS. 7-10. In the latter, the carriage and planter container has to be touched and turned for hooking and releasing it from its top position and is without an integrated bottom stopping point. The alternative requires no touching or turning while providing an integrated bottom stopping point in addition to the 4×6 PVC fitting 108. The alternative 119 is a hook design to be pinned in a balanced position in the carriage channels utilizing a spring tripping mechanism 124 that is attached to the hook at the top and the carriage at the bottom. The carriage with hook passes up and down the pole between the pole and the carriage catching an opening 125 whereby the spring rebalances the weight snapping the hook into the opening. A slight lowering of the cage hangs the carriage with planter container in the opening. FIGS. 59 for the top and 60 for the bottom show exemplary hole opening hardware attachments to bear the weight and trip the spring catch back when lowering or raising the unit again. Whereas, in FIG. 59 the unit 130 can be made of metal with a bent out top kick point 131 and bottom turned in metal resting plate 132. FIG. 60 is of a two-piece unit 133 with a metal inside 134 and plastic outside piece 135. The unit is designed to appear small on the outside and to attach by snapping together without screws. Both 130 and 133 are better shown for location in FIG. 75. When the unit is raised the beveled head of the hook 119 is tripped back into the carriage by a matching bevel of the hardware attachments at 131 at the top and the top angle of the inside plate 134 at the bottom.

Referring to the alternative rollers 120 in FIGS. 57, 58 and 61, a top and bottom unit in each of the three designated channels keep the carriage balanced in a fixed or moving position which increases registration accuracy for the catch-hook-release system, keeps the moving carriage from scratching the pole, and provides a softer material to reduce wear on the pole. Additionally, the top roller can act as a final registration point in the raising operation when it touches the PVC fitting 8.

Referring to the location of alternative planter containers shown as 101 and 103 in FIGS. 57 and 58 the bottom resting area on the carriage tray 122 shows an alternative to 4 for greater holding ability and the absence of an inside back to the previous Bundt type of planter container which is replaced by the carriage 118 outside wall.

Figure 5:
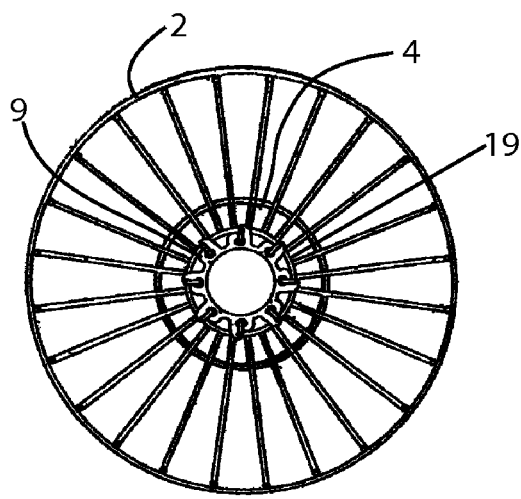
FIG. 5 provides a cutaway view of an exemplary carriage, pulleys and winch system of an exemplary pole planter according to principles of the invention.

FIG. 58 demonstrates how the alternative catch-hold-release mechanism can be adopted to the wire carriage in FIGS. 5, 6 and 10. It eliminates the need for hooked uprights 21/19 and the hanging bracket 9 in FIGS. 7-10. A partial channel 123 is welded to the wire up right bar 19 for attachment of 124.

Referring now to FIGS. 62, 63, and 64 are profile and cut away sections of top, side and angular views of an exemplary alternative Worm Gear embodiment for raising and lowering planter containers using exemplary alternative designed planter containers for an exemplary pole planter system according to the principles of the invention. This embodiment uses the same pole 1, carriage 118 with sub operating parts, and irrigation system as in the FIGS. 52-61. The lanyards, pulleys and yoke are of previous exemplary designs and concepts as 12, 11 and 17. The planter container and 4×6 PVC fitting is altered to show the infinite variety of designs that can be used in pole planter systems. The planter container as shown in FIG. 62 has the absence of an inside back to the previous Bundt type of planter container 103 in FIG. 38. The back is replaced by the carriage 118 outside wall. The attachment of the yoke 17 to the reel spool 136 can be cable 20 in FIG. 3 or a variety of material and choices but not limited to cable, belts, webbing, etc. The worm gear system is installed into the pipe on a mounting plate 137, which includes which includes support uprights for the arbor. The yoke 17 is shown at its bottom position when the planter container is at the top and outlined at the top position when the planter container is at the bottom. FIG. 63 is a side view of the Worm Gear 138, the engagement wheel 139 and the reel spool 136 as attached to a mounting plate. FIG. 64 is a top view of the worm gear system as previously described. Per the previous embodiments, access panels are provided 6 and a hand crank bar 14. Alternatively, a socket or motor activated unit as a hand held drill 14 can be used to operate the system.

Now Referring to FIGS. 65-71, they are profile and cut away sections of top, side and angular views of an exemplary alternative Lead or Ball Screw embodiments for raising and lowering planter containers with an alternative planter design using the previous embodiments of, carriages, poles, and irrigation for an exemplary pole planter system according to the principles of the invention. The Lead Screw embodiment shown is similar to the Ball Screw embodiment (not shown) but referred to herein. The Lead or Ball Screw embodiment is whereby a Lead or Ball screw nut 140 is attached to a plate 141 which is attached to the deck pulley system 11 with lanyards 12 attached at 142 which is driven up and down a rotating threaded rod 143 inside the pole by a variety of systems of gears not limited to the beveled per exemplary FIGS. 58-70 or other embodiments as a worm gear system in exemplary FIG. 71. The top plate with bearings as necessary 144 holds the threaded rod in position while allowing it to turn. The two irrigation or drain pipes 41 and/or 42 keep the combination of 140-142 from turning as it moves up the threaded rod 143. The pipes can be formed into the pole 1 as an extruded part as necessary for rigidity as in FIGS. 72-74. The worm screw in FIG. 71 is similar to FIGS. 63 and 64 but side mounted. A plurality of gear systems can be engineered using a variety of gears including spur gears and others. The Lead or Ball Screw embodiment uses a bevel headed gear 145 on a shaft 146 driving another gear head 147 attached to the threaded rod 143 all attached to a mounting plate 148. A load and friction bearing point 149 would use a bearing feature for ease of turning the threaded shaft. The alternative planter container design uses the same bottom and backless configurations as shown in FIG. 57 for the alternate carriage system 118. Per other exemplary embodiments of the invention described herein, components may be used as access panels 6, cranking 14 with motor or drill activation and irrigation options. In an alternative lead or ball screw embodiment, a concentric support pole may be divided into threadedly engaged segments configured to extend when rotated in one direction and descend when rotated in the opposite direction, with the planter affixed to one pole segment.

Referring now to FIGS. 72, 73, and 74, they are profile and cut away sections of top, side and angular views of an exemplary alternative Rack and Pinion embodiment for raising and lowering planter containers using exemplary alternative planter containers, carriages, poles, and irrigation for an exemplary pole planter system according to the principles of the invention. The Rack and Pinion embodiment introduces more alternative parts to the invention. The former embodiments of the exemplary carriage 118 with all its features in FIG. 57 are now included with the planter container as a single piece 153. It can be manufactured using a variety of materials and depending on size or style of container but not limited to being injection molded, cast or custom hand built. The catch-hook-release mechanism 119, spring 124, catch hardware 130 and 133, rollers 120, and deck pulleys 11 are exemplary of the other embodiments with the exception that the variation for balance and spacing between them changes as shown in FIG. 78 to allow for irrigation pipes 150, water pipes 151 and the rack guide 152 which are extruded as necessary into the pole 154, a continuous 6" PVC schedule 40 custom extruded pole diameter pole from top to bottom. Pipe sizes for 150 and 151 can vary as necessary and are made as if they were PVC fittings with inside diameters equal to the outside dimensions of standard PVC irrigation pipe 161. Thereby, standard pipe can be inserted into the extruded irrigation lines of the main pole structure 154 as if fittings and standard fittings or pipe can be used thereafter for various connections as between the major pole 154 sections coupled at fitting 8 or to extend the lines with into other sections or features at the top or bottom as necessary. The water pipe 150 can be extended with standard PVC pipe and fittings for a waterfall feature 155 with a plurality of falls locations as necessary. Irrigation of the planter container and/or surrounding area can also be accomplished by use of the other irrigation embodiments. A drain hole plug 156 is placed slightly above the planter container bottom providing a water reservoir which can be used in other embodiments as well. Note: the lanyard 12 attachment to the carriage is pinned through the channel as the roller, or catch-hold-release mechanism versus on the bottom as in previous carriage designs.

Referring again to The Rack and Pinion embodiment in FIGS. 72, 73, and 74 it consists of a moving rack bar with gear teeth 157 that intermesh with pinion spur gear 158. The pinion spur gear is integrated into a mounting plate 159 installed inside the pole 154 which is driven by the crank system 14 as outlined in the various exemplary embodiments. A custom yoke 160 attaches the rack bar 157 to the lanyards 12 leading to the deck pulleys 11. When driven with the chosen crank system 14 the pinion spur gear 158 turns moving the rack bar 157 up and down the guide track 152, thus lowering and raising the planter container. The distance the rack bar travels equals the raising and lowering distance of the planter container shown by the lower position of the yoke and the outlined upper position. The distance requires the rack bar to travel minimally the necessary distance below grade inside the pipe. Alternatively, a flexible timing belt or similar belt may be used in place of the rack, which also passes through the pole between pinion 158 and a roller (not shown) on the back of the belt at the pinion point for holding the belt in place. The flexible timing belt can fall below into the imbedded hole or be wound up on a spring storage spool below where more space is provided for longer distances between lower and upper positions of the planter container are required (not shown). Another alternative (not shown) is for a timing or flexible belt or chain to move around two pulleys as a sprocket or chain driven embodiment per FIGS. 19-22 except the lanyards are attached to a connecting custom yoke as 160 which in turn is connected to the belt or chain. The bottom pulley can be as the pinion gear 158 in FIGS. 72-74. As the bottom, pulley or gear is turned or cranked by various embodiments the yoke travels up and down the lowering and raising distance with the belt or chain. The belt or chain never travels in a complete circle only the from the top to bottom length matching the distance the planter container must be raised and lowered. The custom yoke is designed to attach while clearing the moving chain or belt system. A plurality of embodiments can be combined with these principles also for other optional raising and lowering embodiments.

Referring to FIG. 75 is a typical pole planter per the embodiments. At the bottom is an optional plate 163 with spikes 164 allowing smaller models with a hose connection 165 (i.e., a hose bib) to be mobile for relocation to irrigate the surrounding terrain versus the normal imbedded embodiment. In smaller mobile units, the planter container can be raised and lowered by hand without the use of the pulley system 11; however, the catch-hold-release and roller systems can be used as necessary. Although shown with this figure the mobile option can be used with any of the multiple designs, features and options embodied herein.

Referring now to FIGS. 76, 77 and 78 introduces a waterfall option to the embodied pole planter units, more particular to FIGS. 72 and 75. The waterfall 155 is created using standard PVC pipe and fittings as irrigation and watering pipe 150 and 151 exiting the pole 1 at the top over the basket to the outside edge. The FIGS. 76 and 77 indicate one of a plurality of ways the planter container can be modified to accommodate the PVC pipe and water fall at 155. Waterfalls can be created at a plurality of locations around the planter containers top perimeter including a modification for continuous flow over the entire perimeter. FIG. 78 is a top view cut a way of a cross section of the pole 1 and carriage used in FIGS. 72-78. The carriage is the main focus indicating an alternative layout per the embodiments with the nine channels being unequal in spacing around the carriage allowing for of use of the integrated pole extrusion 154 in FIG. 74 while keeping the three elements of rollers 120, pulleys 11 and catch-hook-release 119 with spring 124 to be equally spaced and balanced.

Figure 79:
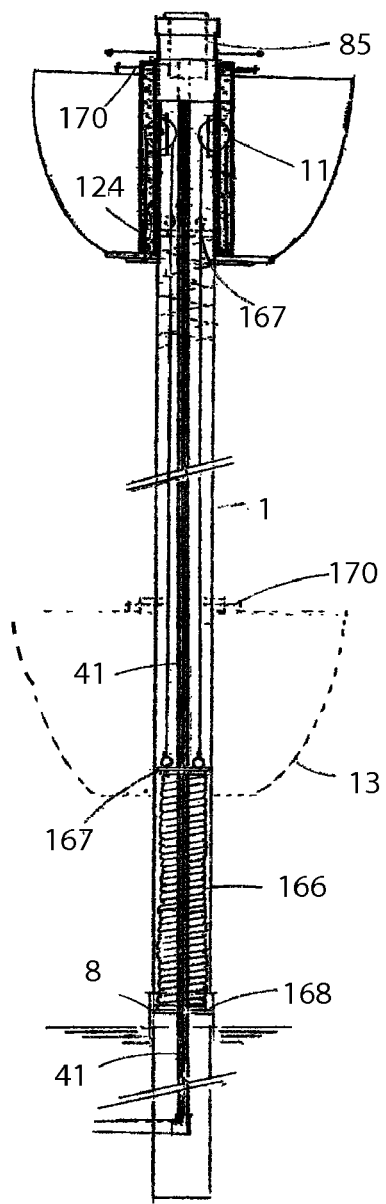
FIG. 79 provides a side view cutaway of an exemplary alternative single extension spring raising and lowering system for an exemplary pole planter according to the principles of the invention.

Referring now to FIG. 79, it represents the use of an extension spring 166 alternative for raising and lowering a typical planter container using the typical exemplary pulley 11 lanyard 12, carriage 118, catch-hook-release 124 and irrigation systems. The lanyards are attached to a round disk 167, which travels up and down the inside of the pipe 1. The PVC irrigation line 41 is centered inside the pole and disk. The single extension spring is attached to the moving disk 167 at the top and a similar disk 168 fixed at the bottom inside fitting 8. The spring is engineered not to exceed the weight of the loaded planter container with carriage so a slight upward push engages or disengages the catch-hook-release 124. When the spring is contracted at the bottom, the planter container with carriage is pulled to the top and when pulled down with normal body weight it is lowered on the pole for service, shown by the disk 167 at the top position 169. A hand tool can be hooked into the carriage for pulling it down and a plurality of pins 170 in the carriage can be pushed into various receiving/holding positions in the pole to assist to hold the unit as desired. Alternatively, optional catch-hold-release systems can be designed at various heights or other pin options can be used as a spring activated bullet pin, which releases into a hole in the pole or carriage and out similar to a telescoping flag pole. Body weight can be used at lower positions to push the unit further down into a final service position. This embodiment may be combined with other embodiments and features of the embodiments.

Figure 80:
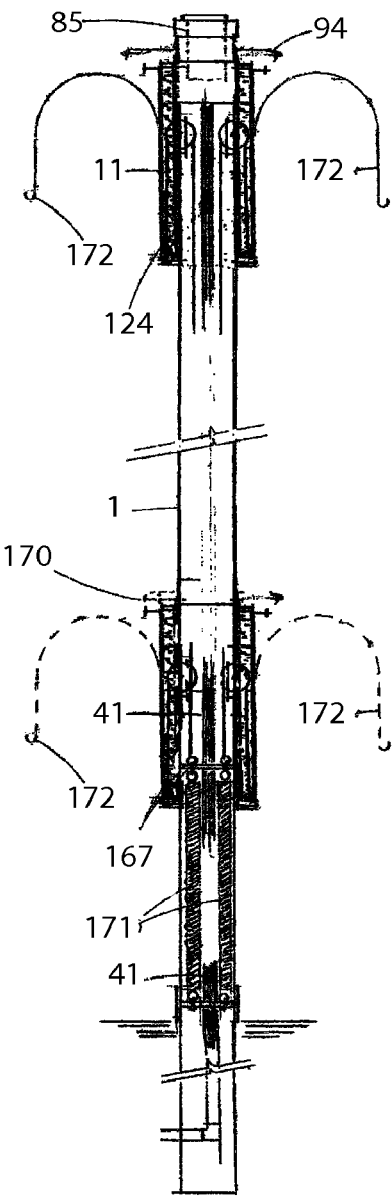
FIG. 80 provides a side view cutaway of an exemplary alternative multiple extension spring raising and lowering system and an alternative hanging carriage for hanging planter containers or other items (as bird feeders) etc. for an exemplary pole planter according to the principles of the invention.

Referring now to FIG. 80, it represents the use of a plurality of smaller extension springs 171 versus a single spring in FIG. 79 as an alternative for raising and lowering a typical planter container. Additionally, the carriage is modified to include a plurality of hook hangers 172 for multiple hanging baskets and/or bird feeders and/or other uses using the typical exemplary features and working parts in FIG. 79. The hanging basket unit would use a modified carriage for aesthetics; with spray, micro irrigation heads at 94 as seen in FIG. 35 directed at each a hanging planter container instead of drippers. This alternative carriage for a plurality of hanging baskets can be combined with other embodied irrigation, or raising and lowering embodiments.

Figure 81:
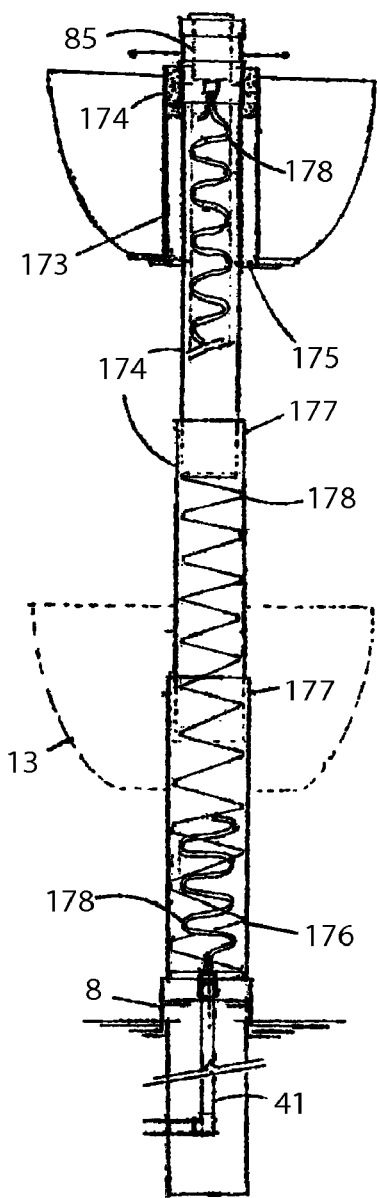
FIG. 81 provides a side view cutaway of an exemplary alternative telescoping, spring and hydraulic pressure aided raising and lowering system for an exemplary pole planter according to the principles of the invention.

Referring now to FIG. 81 is an example of another alternative embodiment for raising and lowering a typical planter container using a modified carriage 173, telescoping pole 174 of variable size and materials, compression spring, and flexible coiled irrigation hose optionally enhanced hydraulically. The modified carriage 173 is attached to the upper pole section at 174 by a variety of means. The carriage has an open space 175 for the ever widening dimension of the pole as the telescoping sections pass from the smallest top diameter into next larger section below when lowering. The spring at its fullest free length 176 supports the top section with planter container and carriage. Spring bullet pins 177 pop from inside a pole through holes in the next pole section for stopping positions and are decompressed when lowering. The spring 176 supporting the top section with planter is compressed by pulling down the top section again with your body weight using a hand tool designed to grab the carriage as referenced in FIG. 80. This is repeated section after section until the planter is at service levels. When raised the process is reversed. A flexible hose 178 passes through the telescoping poles in a reverse coil direction to the spring to avoid pinching thereby attaching to the irrigation head at the top and to the rigid PVC pipe and fitting at the bottom. Optionally the flexible hose can be engineered to include combining it with a spring and/or spring material whereby the hose itself and water pressure can hydraulically assist with weight bearing loads. Although many of the intricate details are excluded, it is assumed that a person of average skill in these matters can apply many optional detailed mechanical alternatives to achieve this embodiment of raising and lowering a planter on a pole. Additionally, such a person can combine these principles with others as for example springs with ballast's and or other optional embodied alternatives as the telescoping hydraulic cylinder embodiment in FIG. 83 adapted to the telescoping pole as-well as totally new concepts with existing or new technology.

Figure 82:
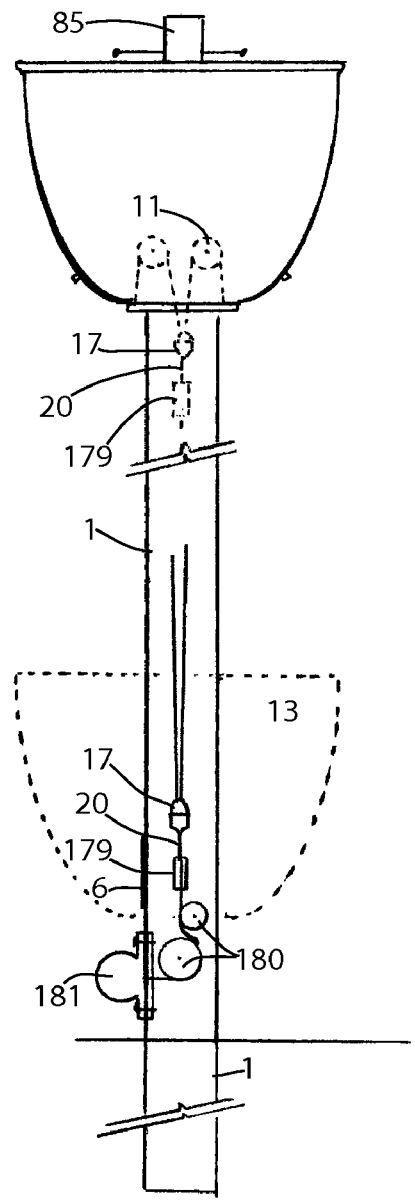
FIG. 82 provides a side view cutaway of an exemplary alternative removable, portable or mobile motor system used on multiple units for multiple raising and lowering embodiments for an exemplary pole planter according to the principles of the invention.

Referring now to FIG. 82 a removable, portable, mobile winch or motorized system outside the pole for multiple units and multiple embodiments as an exemplary raising and lowering embodiment according to the principles of the invention. The pole planter is similar to other embodiments as the planter container, carriage 118, pulley 11, yoke 17 and lanyards 12 in FIG. 62. The lowered position of the planter container 13 corresponds to the yoke 17 at the upper position represented by a dotted outline. A connector of variable designs 179 is attached to the cable 20 below the yoke. The cable continues through two pulleys 180 affixed to the pole and out the pole into a portable winch and/or motorized unit 181 per other embodiments. The unit 181 is attached to the pole by various embodiments such as but not limited to screws, bolts and/or straps to be removed and used at other locations. Other alternatives can be used but not limited to a mobile or motorized generator with unit 118 mounted on it and rolled or driven into place against the pole and be temporarily fixed to it by a variety of embodiments. It is removed when the planter container with carriage 118 is attached in place at the top of the pole with the catch-hook-release mechanism 119. Once into place the connector 179 is decoupled through the access panel 6. Then the remaining cable 20 with part of the connector is removed with the winch and/or motorized unit 118 and moved to another unit or stored as necessary. The yoke, cable and connector are left hanging in the pole until it is necessary to lower the planter container again. This system is ideal for sites with multiple pole planters as a main landscaping feature as parks, streets, and tourist attractions etc. The winch and/or motorized unit 181 can be a variety of embodiments but not limited to hand cranked 14, electric and/or pneumatically or hydraulically powered using power at the site or with a portable generator and/or combined system. Such a motorized mobile generator can be adapted to the other embodied embodiments of raising and lowering the planter container. The irrigation can be implemented per a variety of embodiments such as FIG. 53.

Figures 83, 84:
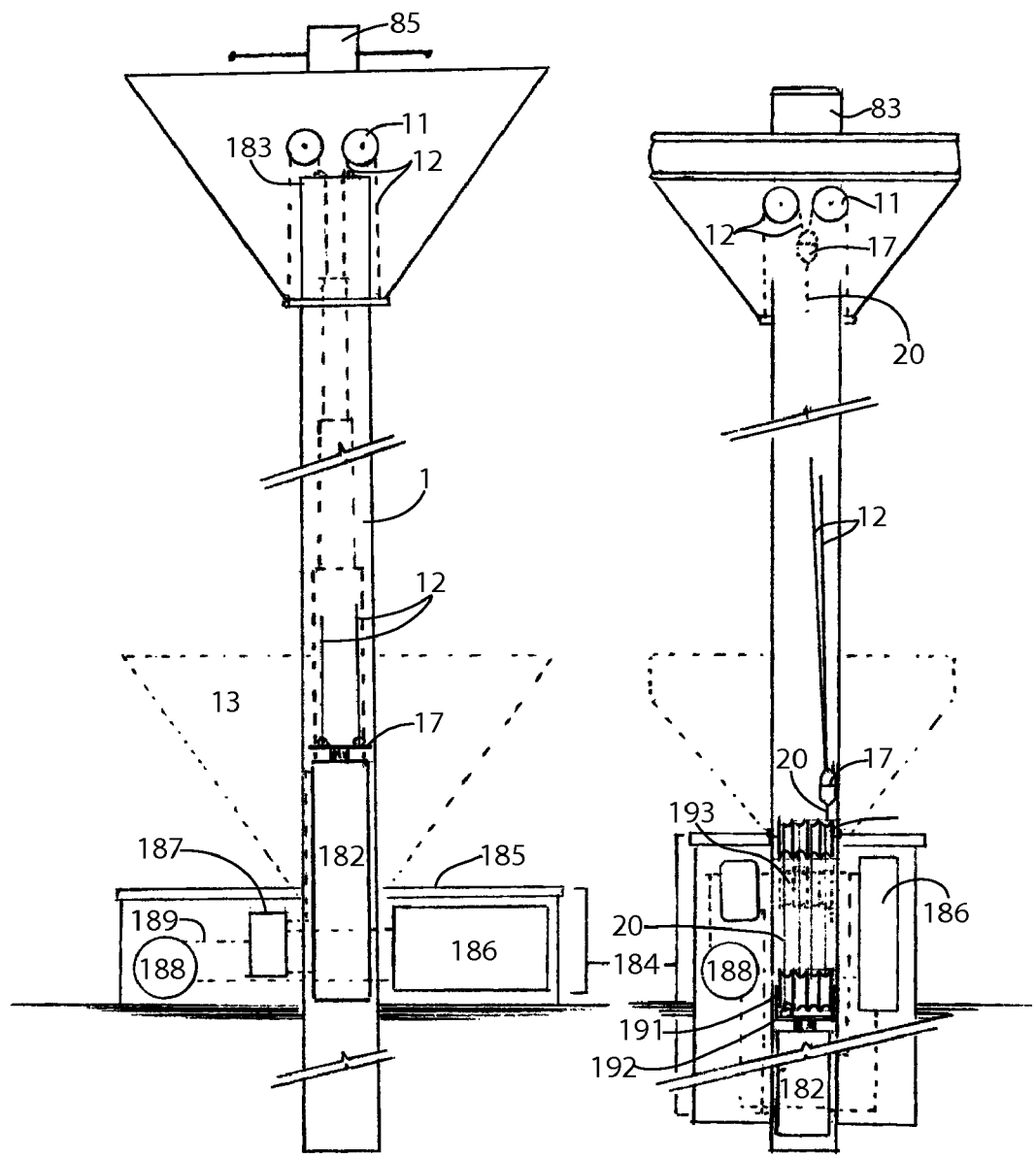
FIG. 83 provides a side view cutaway of an exemplary alternative hydraulic or pneumatic system raising and lowering embodiment using a telescoping cylinder for an exemplary pole planter according to the principles of the invention.
FIG. 84 provides a side view cutaway of an exemplary alternative hydraulic or pneumatic system combined with a block and tackle system as a raising and lowering embodiment for an exemplary pole planter according to the principles of the invention.

Referring now to FIG. 83 it introduces hydraulic or pneumatic exemplary raising and lowering embodiments according to the principles of the invention. An exemplary planter container per the embodiments with pulleys 11, lanyards 12, and custom yoke-plate 17 attached to the end cylinder of a telescoping double acting cylinder system out of a round casing inside the pole at the bottom 182. When the system is activated, the telescoping cylinders extend from the casing to the top 183 releasing the planter container into the down position 13. The planter container is raised by actuating the system back through the second line in the double acting cylinder unit retracting the telescoping cylinders back into the casing 182 which pulls the planter container with carriage back to the top engaging the catch-hook-hold mechanism to a resting position. The base cabinet 184 features a removable top 185 which can act as a rest point for the lowered planter container 13, reservoir 186, valve control 187, motor 188, fluid or air lines 189 as necessary for a complete pneumatic or hydraulic system. Various remote, cord attached or fixed actuators of the valve control can be used as-well-as variable equipment in the base cabinet 184 to accommodate adapting a hydraulic or pneumatic system. The base cabinet can be decorated with brick, stone or marble to match the surrounding architecture. The irrigation system can be per the various embodiments including FIG. 53 and as outlines for FIG. 82. The cylinder casing 182 and custom yoke-plate 17 are designed to be of sizes and shapes allowing irrigation lines to pass up inside the pole per the various embodiments. Alternative systems can reduce or eliminate the cabinet 184 such as large structures with greater space inside the pole and the use of a mobile motorized unit with generator as outlined for FIG. 82 and the necessary parts including fluid or air lines 189, which can be connected directly to the casing 182, or feeder lines from the casing.

Referring now to FIG. 84 introduces another hydraulic or pneumatic exemplary rising and lowering embodiment combined with a Block and Tackle embodiment similar to FIG. 52 according to the principles of the invention. An exemplary planter container per the embodiments with pulleys 11, lanyards 12, yoke 17 and cable 20 using a Block and Tackle system similar to FIG. 52 is used to raise and lower the planter container by combining with a double reacting pneumatic or hydraulic system which replaces the hand embodiment of hand pulling the gang pulleys together with a rope as in FIG. 52. Unlike the hand pulled embodiment a fixed set of gang pulleys 190 mounted to the pole 1 is located above the moving set of gang pulleys 191 which are attached below to the top of the moving cylinder 182 and casing by a custom yoke with arbor 192. The cable 20 is attached to 192 passes through the gang pulleys 191 and 190 and is connected to the yoke 17. The lanyards 12 are attached to the yoke, which continues up to the carriage pulleys and attaches to the carriage per other embodiments. When the cylinder is actuated to extend it raises the lower gang pulleys 191 less than one foot to the position 193 under the fixed pulleys 190 releasing the carriage to drop to position 13. During this movement, the yoke continues to its upper position under the upper carriage pulleys, indicated by a dotted outline. Retraction of the cylinder occurs when the second action of the cylinder is activated pulling the moving pulley gang to its lower position 191 which also moves the carriage with planter container back to the top where it is held in a resting position with the catch-hold-release embodiment. As in FIG. 83 embodiment, the housing contains all the necessary parts for completing the pneumatic or hydraulic system or it also can be eliminated and included in a mobile unit per FIGS. 82 and 83. Additionally, the same irrigation embodiments can be implemented by the embodiments. As these combinations for an exemplary pole planter create the system in FIG. 84, so can these principled embodiments be combined for a variety of additional exemplary pole planters.

Figure 85:
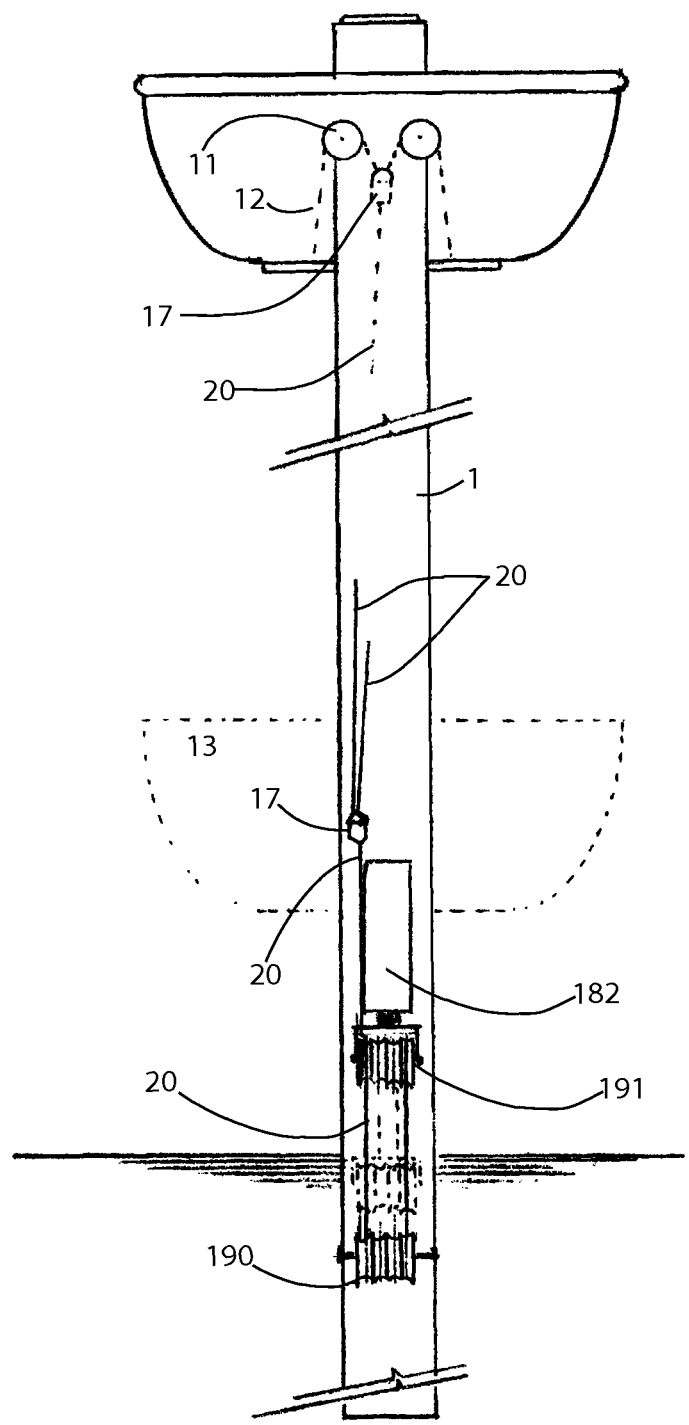
FIG. 85 provides a side view cutaway of an exemplary alternative inverted position hydraulic or pneumatic system combined with a block and tackle system as a raising and lowering embodiment for an exemplary pole planter according to the principles of the invention.

Now referring to FIG. 85, an alternative system for raising and lowering planter containers using a combined block and tackle and a gravity aided cylinder 182 for hydraulics or pneumatics. It is similar to the embodiment shown in FIG. 84 but inverted with the cylinder casing 182 above the block and tackle. While a double action unit would work a single action with the planter container's gravitational pull, pulling the shaft back into the casing can also be used. The bottom access and system alternatives for activation are throughout the various embodiments.

Figure 90:
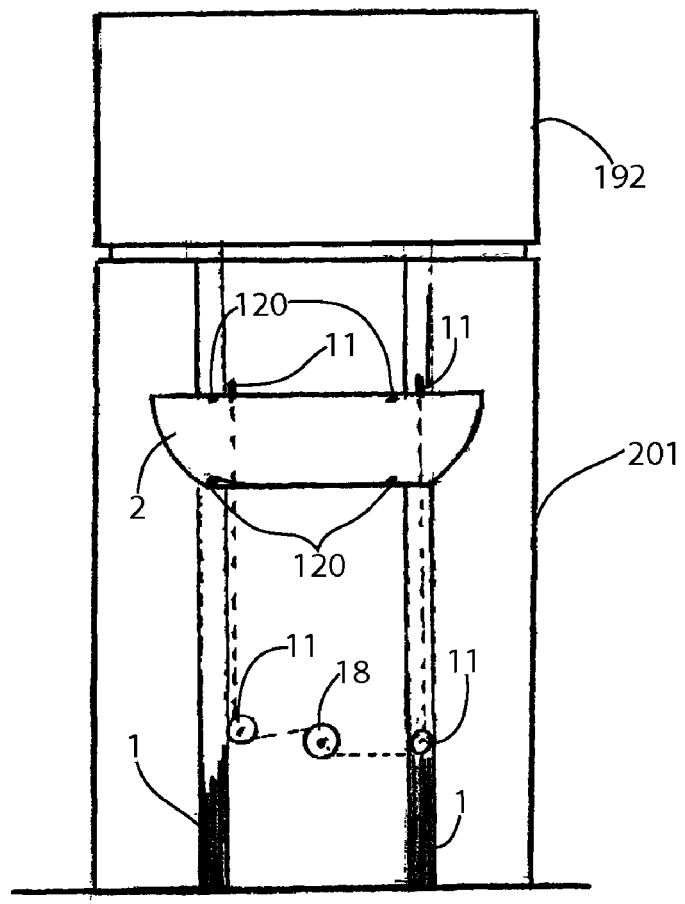
FIG. 90 provides a side view cutaway of an exemplary raising and lowering system for single faced planter containers on flat surfaced sign pole structures according to principles of the invention.
Figure 91:
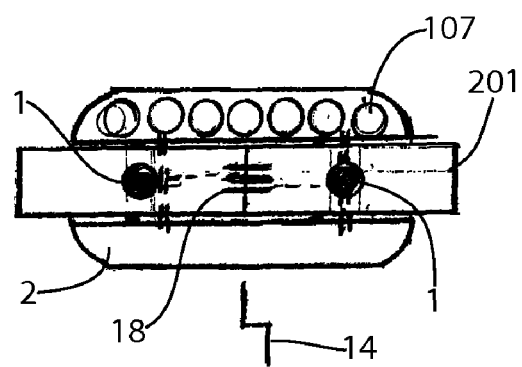
FIG. 91 provides a top view cutaway of an exemplary raising and lowering system for single faced planter containers on flat surfaced sign pole structures according to principles of the invention.
Figure 92:
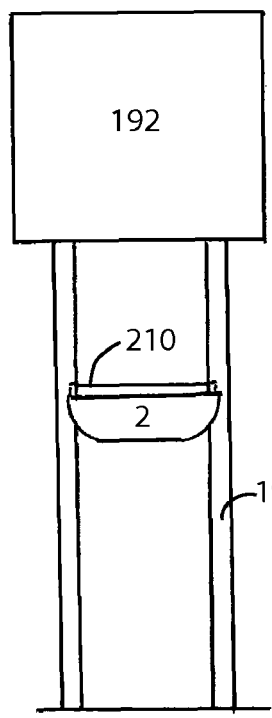
FIG. 92 provides a side view cutaway of the location of an exemplary self contained raceway channel unit used as a raising and lowering system for planter containers on sign pole structures used immediately above the planter container according to principles of the invention.

Now referring to FIGS. 86, 87, 88, and 89 are examples of raising and lowering planter containers on commercial sign pole structures. Where the planter container 2 can be made of any size or material. For examples in FIGS. 86-100 a wire or metal band unit would be used. As seen in FIG. 86 they can be of any length fitting in-between to surrounding the signs 192 poles 1 and surrounding pole/pylon cover 193. Pylon/pole covers building standards in the sign industry require a strong structure reinforced with angle iron sturdy enough to be utilized as shown and easily modified as necessary. The planter containers use an angular shape on the inside ends 194 allowing the units to be tipped up or down on the ends for installation between the support structures and covers. The planter container becomes the carriage in essence utilizing all of the embodied parts of both as previously demonstrated, with the pulleys 11, lanyards 12 and/or cable 20, catch-hook-release 119 and rollers 120 modified for mounting and positions as necessary. FIG. 86 demonstrates an electrical motor 195 activated at the base on the pylon/pole cover 196. The activation point 196 is an electrical box with reverse and forward switches wired to the motor from the electrical power source. Optionally it can use a plug in cord and hand operated activator. FIG. 89 indicates a top view of the reversible direction motor with a pointed bevel drive gear 197 driving two bevel edged gears 198 affixed to the spools 199 for cable control. Alternatively, the electric motor drive unit can be slightly angled as necessary to the pulleys to eliminate any cable friction, also the motor can face the other direction especially in wider areas and eliminate the need for the bevel edge parts allowing the motor to directly turn the spools attached to one or both ends of the motor. Another alternative is to use a worm gear driving package as in FIG. 105. The cable attaches to the planter container at 200 in FIG. 88 a top view cross section of the planter container with yokes 17 and other hardware as necessary. The pylon cover can be modified on the inside face with as indentation channel 202 the length of the cover as necessary to block the visibility of the lanyard or cable from the front view on either FIG. 86 or 87. Activation of the motor drives the spools as a winch or hoist lowering and raising the planter container. FIG. 87 demonstrates accomplishing the same result using a hand crank 14 winch system as 18 with a double spool inside the pylon/pole cover. This configuration of lanyards, pulleys and cable can also be optionally replaced with an electric motor or other raising and lowering embodiments or combinations embodied here in. Both FIGS. 86 and 87 can be reconfigured with the other embodiments to raise and lower a variety of planter containers inside or outside the pole and/or pylon cover. Irrigation of the planter container is achieved through standard embodied irrigation parts and systems with PVC pipe inside the pole or pylon covers as necessary. The examples are not limited to signs or sign structures Now referring to FIGS. 90 and 91 are additional examples of raising and lowering planter containers on commercial sign pole structures. This sign 192 is featured on a monolith design with a wider pole/pylon cover 201 requiring two single faced planter containers which can be raised individually or together using the principles embodied here in. All the components are as stated in the previous paragraph and in this example pulleys 11, rollers are shown in alternate locations mounted on each pole indicating the locations of the components can be changed as desired or necessary as in the previous FIGS. 86 and 87. The winch 18 can be one double spooled actuating both single face units at the same time or two one spooled winches can be used, one to control each side. Alternatively the electric powered unit in FIG. 89 or other embodied principles can be used and/or combined to raise and lower the planter containers. Other embodiments as mini-pots 117 can also be used. FIG. 91 is a top view cut away of the structure. Irrigation is also achieved as in the previous paragraph in FIGS. 86 and 87. The examples are not limited to signs or sign structures. Irrigation is per the embodiments.

Figure 93:
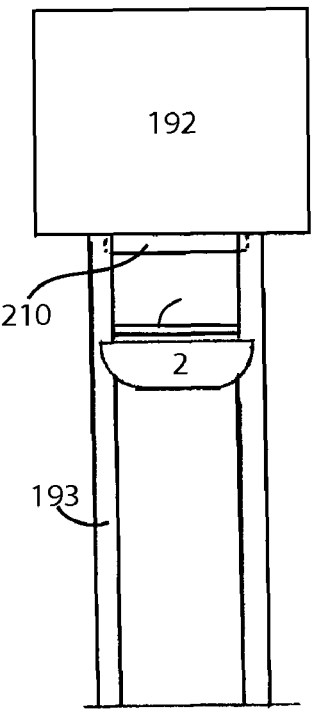
FIG. 93 provides a side view cutaway of the location of an exemplary self contained raceway channel unit used as a raising and lowering system for planter containers on sign pole structures used immediately below the sign according to principles of the invention.
Figure 94:
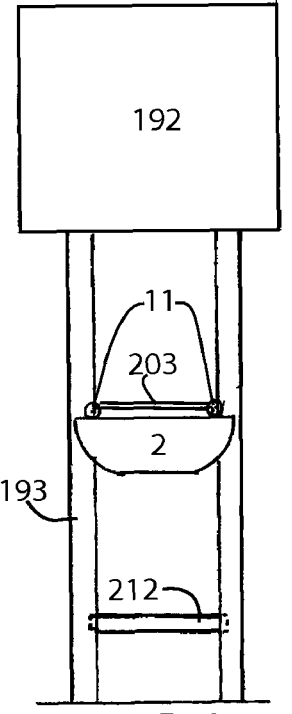
FIG. 94 provides a side view cutaway of the location of an exemplary self contained raceway channel unit used as a raising and lowering system for planter containers on sign pole structures used at the bottom of the sign structure below the planter container according to principles of the invention.
Figure 95:
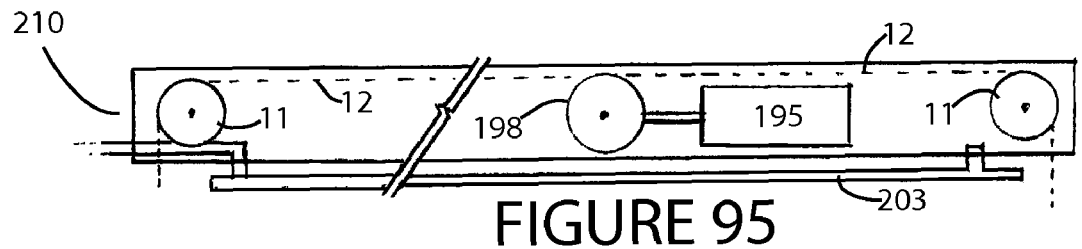
FIG. 95 provides a side view cutaway of an exemplary self contained raceway channel unit used above planter containers as a raising and lowering system for planter containers on sign pole structures according to principles of the invention.

Now referring to FIGS. 92, 93, 94, 95, 96, and 97 another alternative example can be used in raising and lowering planter containers or other objects on commercial sign poles and/or other structures. In these examples a raceway channel can self contain all or most of the necessary elements to achieve the process making installations easier on new and existing sign pole structures. This will allow for a greater retrofit market. FIG. 95 represents the side view of such raceway channel using the same electric motor with bevel drive system and double spools as in FIG. 89. The pulleys 11 are attached at the ends with the cable/lanyards connecting to the planter containers as shown here and throughout the other embodiments. FIG. 95 is shown at two different locations on the sign pole structure in FIGS. 92 and 93. Irrigation can also be included in the raceway channel with a drip line 203 extending out the bottom in FIG. 95 or other embodiments per the embodiments. PVC pipe inside the pole or pylon cover with standard fittings and parts are used per the embodiments. FIGS. 93 and 94 show where an independent irrigation drip line 203 may be installed which is not connected to the raceway channel as an irrigation choice from the embodiments. FIG. 94 shows an extra set of pulleys 11 above the planter container. They can optionally be installed in or on the cover or pole depending on where the lanyards 12 and/or cables 20 are ran. The raceway channels can be designed to mount on or inside the pole or pylon cover or and the pulleys in the raceway channels can be located at various point along its length to accommodate the alternatives including up the pylon cover indentation 202. Raceway channels include plumbing and electrical preparation and access panels as necessary. The operating mechanism FIG. 89 is optional and other embodiments can be used or combined for activating the system. For example a hand operated winch 18 with a double spool and crank handle 14 can be located inside FIG. 97 as shown in FIG. 94. The examples are not limited to signs or sign structures. Irrigation is per the embodiments.

Figure 96:
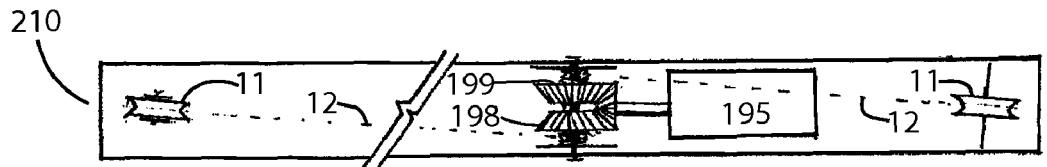
FIG. 96 provides a top view cutaway of an exemplary horizontal self contained raceway channel unit used as a raising and lowering system for planter containers on sign pole structures according to principles of the invention.
Figure 97:
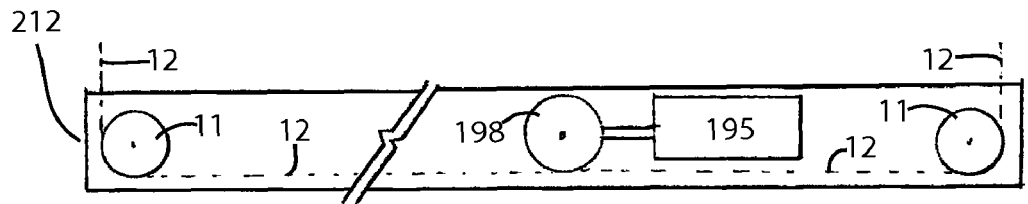
FIG. 97 provides a top view cutaway of an exemplary self contained raceway channel unit used above planter containers as a raising and lowering system for planter containers on sign pole structures according to principles of the invention.
Figure 98:
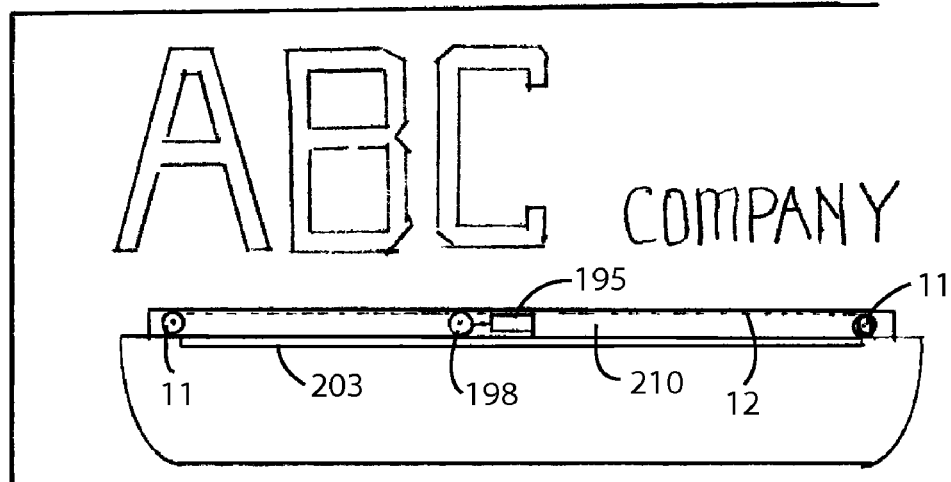
FIG. 98 provides a front view cutaway of an exemplary self contained raceway channel unit used as a raising and lowering system for planter containers on flat or wall structures used immediately above the planter container according to principles of the invention.
Figure 99:
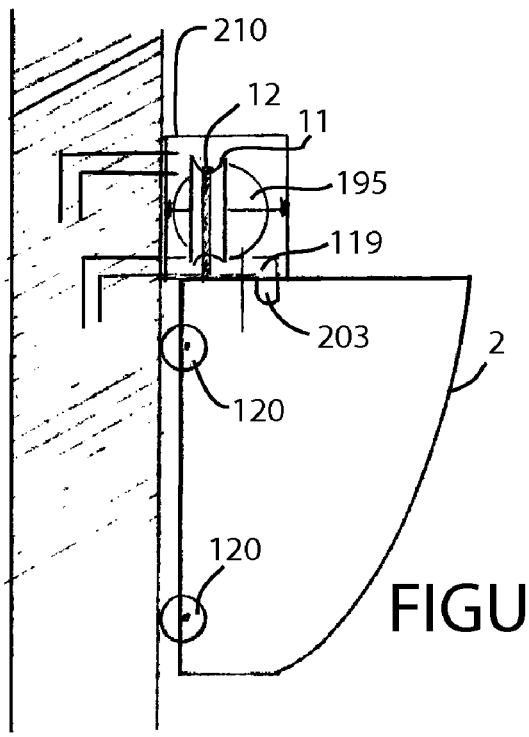
FIG. 99 provides a side view cutaway of an exemplary self contained raceway channel unit used as a raising and lowering system for planter containers on flat and/or wall structures used immediately above the planter container according to principles of the invention.

Referring now to FIGS. 98 and 99 the alternative use of the raceway channel in FIGS. 95 and 96 is modified for a flat wall surface area to raise and lower a planter container on a building according to the previous embodiments including it could be an alternative to the embodiments used in FIG. 91 for a commercial sign pole structure and others. The raceway channel is anchored to the building with the irrigation water source and electrical conduits running through the raceway channel into the building hidden from outside view. The planter container is suspended from the lanyards 12 and/or cables 20 and attached per embodiments. It is lowered from an electrical control box in the wall at the bottom 196 (not shown see FIG. 86) and raised back into position when activated with a typical or modified catch-hook-release 119 system on the planter container and catch plate 130 per other embodiments. The raceway channels can be of any size or material to accommodate the size required for the planter container and located under existing or new signage, windows and/or other architectural features. The FIG. 97 could also be modified for flat surface areas as necessary. Whereas, FIGS. 92-97 depict a planter container fitting around the poles/pylon covers, alternatively two of the single faced units in FIGS. 98 and 99 could be utilized on both sides of the pole/pylon cover. The example is not limited to buildings and/or sign structures. Irrigation is per the embodiments Referring now to FIGS. 100, 101, 102, and 103 they are examples of raising and lowering a variety of planter containers and carriages on commercial sign pole structures utilizing mechanisms both inside or outside poles and or pole/pylon cover structures. The examples demonstrate but are not limited to sign structures winch 18 and hand crank 14 embodiments but are expanded to the other embodiments and/or their combinations or structures. FIG. 100 demonstrates the carriage 124 and hanger arms 172 in FIG. 80 outside of the pole and pole cover 193 as well as an alternative planter container. The carriages or planter containers are located around the structure. The winches in either can be operated together with the one hand crank. The pulleys 11 are shown as an option for the lanyards 12 and/or cable 20 to go above and drop back down to the carriage, or planter container 2 on the outside of the cover down the indentation in the cover, or to be unseen and remain inside the pylon cover like other embodiments as if the pylon cover 193 was the pole 1. The end of the lanyards 12 and/or cable 20 can feature decorative or structural chain connected to the planter containers. FIG. 102 is a top view cut away. FIG. 101 is another alternative with individual planter containers rising and lowering as in FIG. 100 but alternatively they can be raised or lowered together or at the same time optionally from one or both sides. These planter containers are suspended from the structure. The winch, spools, lanyards and pulleys are all inside the pole cover. Irrigation is per the embodiments. Referring now to FIG. 104 is an example of raising and lowering planter containers and carriages on commercial sign pole structures utilizing mechanisms both inside or outside poles and or pole/pylon cover structures. The examples demonstrate but are not limited to sign structures or the winch 18 and hand crank 14 embodiments but are expanded to the other embodiments and/or their combinations or structures. Cable/lanyard lines are directed through structural arms attached to the pylon cover and/or pole to the control mechanism. The larger pulleys 204 are for directing the cable lines down into the pipe which can also be used in FIG. 101 and other embodiments where other embodiments can be used for raising and lowering the planter containers, whereas, the pulleys 11 indicate directing the cable down between the pylon cover 193 and the structural pole 1 to the winch as per FIGS. 100 and 101. The cable 12 on the right side would be a more flexible material than wire cable to allow flow through a curved pipe or over an open curved arm piece. The end of the lanyard/cable/rope can feature decorative or structural chain to the planter containers. Irrigation of the planter containers are per the embodiments.

Referring now to FIGS. 105 and 106 they are examples of self contained raceway channels used most often in the vertical position for raising and lowering planter containers and/or other objects on commercial sign poles or other structures. In FIG. 105 the motor drives a worm gear arbor 205 which in turn drives a receiving worm gear 206 affixed to the pulley winch spools 18 as a motorized winch. The end of 205 is affixed to the raceway with amounted bearing 207. The cable 20 and/or lanyard 12 continues to the end where optional pulleys 11 can direct the lines out of the self contained raceway channel through the sign pole and/or pylon/pole cover to the planter container. Pulleys can be directed up or out the sides as in FIG. 106. Units can have single or a plurality of spools as necessary. The race could mount on the pole 1 with the spools guiding the cable/lanyard up each side between the pole 1 and pylon cover 193 if space or a special access box can be built around it further down on the base which can be controlled as at196 (see 208 on FIGS. 100, 101,and 104). FIG. 106 is a self contained vertical raceway channel using the motor direction switched enabling a direct drive to the winch spools 18 to the optional directed pulleys 11 where space is available and could be used at 208 also. These units are produced in self contained raceway channels with access panels as necessary and do not specifically include irrigation lines or parts which are optional.

Figure 107:
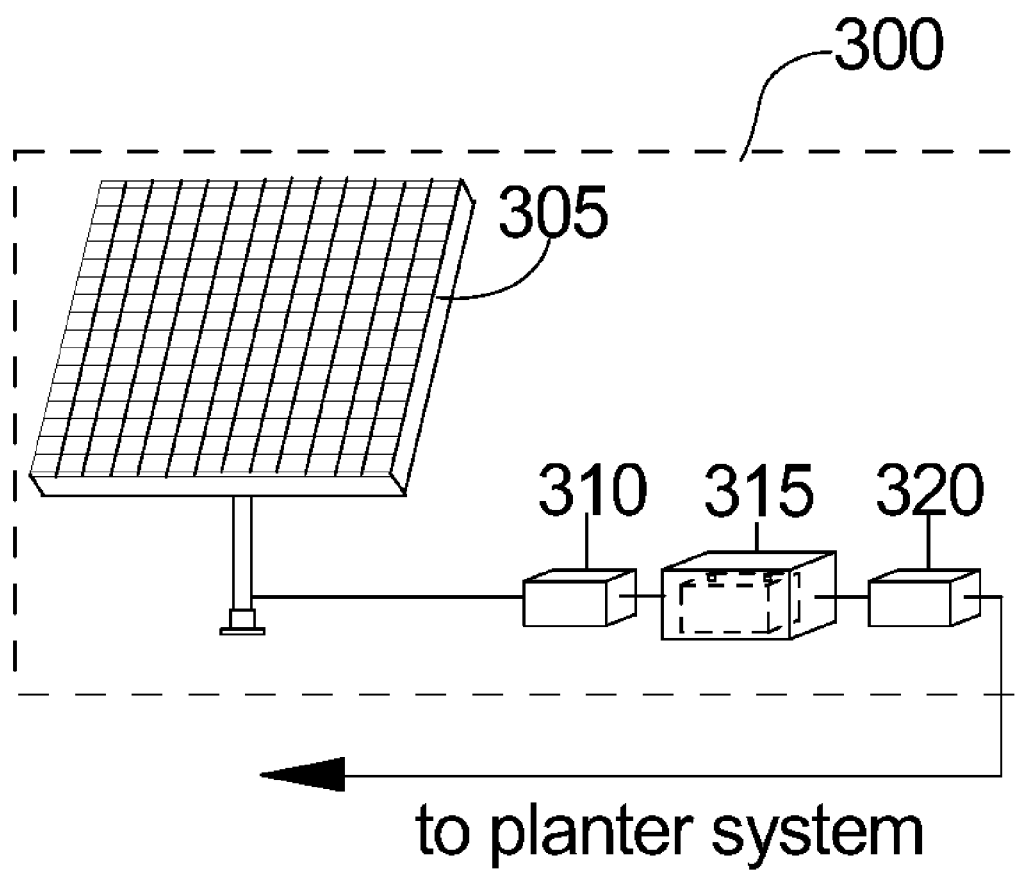
FIG. 107 provides a schematic of an optional photovoltaic power supply subsystem according to principles of the invention.

In embodiments used outdoors and requiring electrical power, an optional solar power supply subsystem 300 may be provided. As shown in FIG. 107, the solar power supply subsystem 300 includes a photovoltaic panel (i.e., solar panel) 305 comprising solar cells or solar photovoltaic arrays to convert light, such as sunlight, into electrical power. The solar cells may be packaged in photovoltaic modules, electrically connected in multiples as solar photovoltaic arrays, to convert sufficient energy from sunlight into electricity to meet operating requirements. As the solar cells require protection from the environment, they are packaged behind a protective transparent (e.g., glass) sheet.

The solar panel 305 preferably has an orientation and angle of inclination to take advantage of the sun's energy. In general, if the solar panel 305 is stationary (i.e., non-tracking), in the Northern Hemisphere it should point toward true south (i.e., the orientation) and should be inclined at an angle equal to the area's latitude to absorb the maximum amount of energy year-round. A different orientation and/or inclination may be used to maximize energy production in the morning or afternoon, and/or the summer or winter. The solar panel 305 should not be shaded by nearby trees, buildings or other objects, no matter the time of day or the time of year. The solar panel 305 may be mounted on, atop or adjacent to the planter system.

The solar panel 305 produces direct current electricity from light, which is used to charge one or more batteries 315. If a plurality of batteries is used, they may be connected in series and/or in parallel. A parallel combination of batteries has the same voltage as a single battery, but can supply a higher current (the sum of the currents from all the batteries). A series combination has the same current rating as a single battery but its voltage is the sum of the voltages of all the batteries.

The solar panel 305 is preferably sized to recharge a battery 315 within a determined amount of time, during prevailing average daytime lighting conditions. For example, one or more solar panels may be provided to deliver enough current (amps) per hour in average daylight conditions to supply enough amp hours to fully recharge the one or more batteries within a few hours or so, while the solar power supply subsystem 300 supplies all necessary power to the planter system. The time required will depend upon the specifications and conditions of the battery or batteries, the solar panel or solar panels, and the lighting conditions. The size and/or number of batteries are preferably more than sufficient to supply power to meet operating requirements of the system throughout dusk and nighttime, and overcast days.

Although various kinds of batteries may be employed, preferably a deep-cycle battery 315 is utilized. By way of example and not limitation, the deep-cycle battery 315 may be a sealed or vented lead-acid battery, a nickel-cadmium battery, or some other type of deep cycle battery now known or hereafter developed. In a particular preferred embodiment the battery is an absorbed glass mat, or AGM battery, with electrolyte (acid) contained in a fine fiber Boron-Silicate glass mat that prevents spillage, even if broken, and withstands shock and vibration. Advantageously, an AGM battery also resists freezing damage, recombines oxygen and hydrogen inside the battery while charging to prevent the loss of water through electrolysis, maintains low internal resistance which avoids heating of the battery even under heavy charge and discharge currents, offer low self-discharge of approximately 1% to 3% per month.

Another component of the solar power supply subsystem 300, a charge controller 310, electrically coupled between the solar panel 305 and the battery 315, manages the electrical current supplied from the solar panel 305 to the battery 315 to assure maximum useful life. The charge controller 310 does so by fully charging the battery 315 without permitting overcharge while preventing reverse current flow at night. Circuitry in the controller 310 reads the voltage of the battery 315 to determine the state of charge. Based upon the detected voltage, the controller 310 regulates the current supplied from the solar panel to the battery 315, preferably using either Pulse Width Modulation (PWM) or Maximum Power Point Tracking (MPPT). Illustratively, a PWM controller 310 maintains the battery 315 at its maximum state of charge and minimizes sulfation build-up by pulsing the voltage at a high frequency. A PWM controller 310 will first hold the voltage to a safe maximum for the battery 315 to reach full charge. Then it will drop the voltage lower to sustain a "finish" or "trickle" charge. An MPPT controller will adjust the voltage and current supplied from the solar panel 305 to the battery 315, to maximize the recharging current supplied to the battery 315. The controller also provides reverse current leakage protection by disconnecting the solar panel or using a blocking diode to prevent current loss into the solar modules at night. The controller also provides low-voltage load disconnect (LVD) to reduce damage to the battery 315 by avoiding deep discharge. When overdischarge is detected (e.g., when a 12 volt battery 315 drops below 11 volts), an LVD circuit will disconnect loads and reconnect the loads only when the battery 315 voltage has substantially recovered due to recharging. A typical LVD reset point is 13 volts. In addition, the controller provides overcurrent protection with fuses, circuit breakers. Because the battery 315 is used outdoors, the controller also provides temperature compensation, adjusting the charging voltage to the temperature. If the battery 315 temperature differs more than a determined threshold, such as 5° C., from a reference temperature, such as 20° C., the end-of-charge voltage may corrected by a correction factor, which has the effect of increasing the end-of-charge voltage as temperature decreases.

The solar panel 305, regardless of its size or sophistication, generates only direct current (DC). If the system requires only DC, an inverter 320 may be unnecessary. However, an inverter is required if the image capturing system requires an alternating current (AC) load. The inverter 320 converts DC output of the battery 315 to standard AC power similar to that supplied by utilities. In a preferred embodiment, the inverter, if required, is a solid state electronic device that uses pulse width modulation and a low pass filter at the inverter output to produce a sine wave, quasi-sine wave or modified sine wave output waveform.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A planter system comprising an adjustable height planter assembly, a hollow support structure having a top end and a bottom end, raising and lowering means for controllably moving the planter assembly relative to the support structure along a continuum of heights, from a lowest position to a highest position, tether assembly operably coupling the adjustable height planter assembly to the raising and lowering means, a pulley at a raised height, said tether assembly extending, within the hollow support, from said raising and lowering means over said pulley to said adjustable height planter assembly, said adjustable height planter assembly being suspended from the tether, and said raising and lowering means being configured to move the planter assembly along a continuum of heights, from a lowest position to a highest position by controllably adjusting the tether assembly from which the planter assembly is suspended, and said planter assembly comprising a planter container configured to hold contents comprising a plant in a growing medium, said planter container having substantially uncovered and remains substantially uncovered throughout the entire range of motion, including at the highest position, allowing the contents to be exposed to light and supplied water throughout the entire range of motion, and said planter assembly further comprising a drainage aperture, said drainage aperture being positioned and sized to automatically release from the planter assembly liquid accumulated in the planter container while contents are held in the planter container, and said planter system further comprising a plurality of rollers disposed between the hollow support structure and the planter assembly, said plurality of rollers maintaining a space between the hollow support structure and the planter assembly, protecting the hollow support structure from marring when the planter assembly moves relative to the hollow support structure, and facilitating movement of the planter assembly relative to the hollow support structure, and said planter system further comprising a locking assembly apart from the raising and lowering means, said locking assembly configured to releasably secure and hold the weight of the planter assembly at a locking height, said locking assembly comprising a fastener associated with the planter assembly and a corresponding aperture, at the locking height, associated with the hollow support structure, whereby, upon locking, the locking assembly prevents the planter assembly from moving below the locking height and, upon unlocking, the locking assembly allows the planter assembly to move relative to the support structure along a continuum of heights, from the highest position to the lowest position.

2. A planter system according to claim 1, means for moving the planter assembly relative to the hollow support structure comprising at least one pulley defining the highest position, said pulley guiding said tether, a winch operably coupled to said tether, said winch being adapted to retract and extend said tether.

3. A planter system according to claim 1, means for controllably moving the planter assembly relative to the hollow support structure comprising a tether having a top end and a bottom end, the top end of said tether being coupled to said planter assembly, at least one pulley defining the highest position, said pulley guiding said tether, a winch operably coupled to said tether, said winch being adapted to retract and extend said tether, and a control means inside said hollow support structure, accessible from outside said hollow support structure, operably coupled to the winch and configured to control operation of said winch.

4. A planter system according to claim 1, means for controllably moving the planter assembly relative to the support structure comprising a tether having a top end and a bottom end, the top end of said tether being coupled to said planter assembly, at least one pulley defining the highest position, said pulley guiding said tether, a rotatable shaft operably coupled to said tether, said rotatable shaft being adapted to retract and extend said tether.

5. A planter system according to claim 1, means for controllably moving the planter asssembly relative to the support structure comprising a tether having a top end and a bottom end, the top end of said tether being coupled to said planter, at least one pulley defining the highest position, said pulley guiding said tether, a rotatable shaft operably coupled to said tether, said rotatable shaft being adapted to retract and extend said tether, and said rotatable shaft including a control means accessible outside the support structure.

6. A planter system according to claim 1, means for controllably moving the planter assembly relative to the support structure comprising a tether having a top end and a bottom end, the top end of said tether being coupled to said planter, at least one pulley defining the highest position, said pulley guiding said tether, a continuous pulley driven belt operably coupled to said tether, said continuous pulley driven belt being adapted to retract and extend said tether.

7. A planter system according to claim 1, means for controllably moving the planter assembly relative to the support structure comprising a tether having a top end and a bottom end, the top end of said tether being coupled to said planter assembly, at least one pulley defining the highest position, said pulley guiding said tether, a continuous pulley driven belt operably coupled to said tether, said continuous pulley driven belt being adapted to retract and extend said tether, and said continuous pulley driven belt including a control means accessible outside the support structure.

8. A planter system according to claim 1, means for controllably moving the planter assembly relative to the support structure comprising a tether having a top end and a bottom end, the top end of said tether being coupled to said planter assembly, at least one pulley defining the highest position, said pulley guiding said tether, a continuous sprocket driven chain operably coupled to said tether, said continuous sprocket driven chain being adapted to retract and extend said tether.

9. A planter system according to claim 1, means for controllably moving the planter assembly relative to the support structure comprising a tether having a top end and a bottom end, the top end of said tether being coupled to said planter assembly, at least one pulley defining the highest position, said pulley guiding said tether, a continuous sprocket driven chain operably coupled to said tether, said continuous sprocket driven chain being adapted to retract and extend said tether, and said continuous sprocket driven chain including a control means accessible outside the support structure.

10. A planter system according to claim 1, means for controllably moving the planter assembly relative to the support structure comprising a block and tackle lifting means adapted to raise said planter.

11. A planter system according to claim 1, means for controllably moving the planter assembly relative to the support structure comprising a tether coupled to a ballast, said ballast being slidably contained in the support structure and configured to facilitate movement of the planter.

12. A planter system according to claim 1, further comprising an irrigation unit attached to the hollow support, said irrigation unit having an outlet at about the highest position, a solenoid valve controlling the supply of water to the irrigation unit, said irrigation unit automatically supplying water to the planter assembly in the highest position.

13. A planter system according to claim 12, said irrigation unit supplying water to surrounding terrain beyond the planter container.

14. A planter system according to claim 13, said irrigation unit comprising a pop-up sprinkler head configured to pop-up at the top end of said hollow support structure, and plumbing means for supplying water to said sprinkler head, said plumbing means being contained within said hollow support structure and including a fluid coupling configured for connection to an external water supply.

15. A planter system according to claim 12, further comprising, a base plate attached to the hollow support structure, a plurality support spikes configured to engage said base plate and be removably forced into underlying terrain for support, and a hose bib for fluidly coupling a water supply to said irrigation unit.

16. A planter system according to claim 1, means for controllably moving the planter assembly relative to the hollow support structure comprising at least one pulley defining the highest position, said pulley guiding said tether, a winch operably coupled to said tether, said winch being adapted to retract and extend said tether, and said pulley, tether and winch being contained within the hollow support structure.

17. A planter system according to claim 16, said irrigation unit comprising a rotary sprinkler head at the top end of said support structure, and plumbing means for supplying water to said rotary sprinkler head, said plumbing means being contained within said support structure and including a fluid coupling configured for connection to an external water supply.

18. A planter system according to claim 16, said irrigation unit comprising a stationary sprinkler head at the top end of said support structure, and plumbing means for supplying water to said stationary sprinkler head, said plumbing means being contained within said support structure and including a fluid coupling configured for connection to an external water supply.

19. A planter system according to claim 1, said adjustable height planter assembly further comprising an adjustable height planter carriage, the planter container being rotatably supported by said planter carriage, said planter support being suspended from the tether.

20. A planter system according to claim 19, means for controllably moving the planter assembly relative to the support structure comprising a tether having a top end and a bottom end, the top end of said tether being coupled to said planter support, at least one pulley defining the highest position, said pulley guiding said tether, a rotatable shaft operably coupled to said tether, said rotatable shaft being adapted to retract and extend said tether.

21. A planter system according to claim 19, means for controllably moving the planter assembly relative to the support structure comprising a tether having a top end and a bottom end, the top end of said tether being coupled to said planter support, at least one pulley defining the highest position, said pulley guiding said tether, a rotatable shaft operably coupled to said tether, said rotatable shaft being adapted to retract and extend said tether, and said rotatable shaft including a control means accessible outside the support structure.

22. A planter system according to claim 19, means for controllably moving the planter assembly relative to the support structure comprising a tether having a top end and a bottom end, the top end of said tether being coupled to said planter support, at least one pulley defining the highest position, said pulley guiding said tether, a continuous pulley driven belt operably coupled to said tether, said continuous pulley driven belt being adapted to retract and extend said tether.

23. A planter system according to claim 19, means for controllably moving the planter assembly relative to the support structure comprising a tether having a top end and a bottom end, the top end of said tether being coupled to said planter support, at least one pulley defining the highest position, said pulley guiding said tether, a continuous pulley driven belt operably coupled to said tether, said continuous pulley driven belt being adapted to retract and extend said tether, and said continuous pulley driven belt including a control means accessible outside the support structure.

24. A planter system according to claim 19, means for controllably moving the planter assembly relative to the support structure comprising a tether having a top end and a bottom end, the top end of said tether being coupled to said planter support, at least one pulley defining the highest position, said pulley guiding said tether, a continuous sprocket driven chain operably coupled to said tether, said continuous sprocket driven chain being adapted to retract and extend said tether.

25. A planter system according to claim 19, means for controllably moving the planter assembly relative to the support structure comprising a tether having a top end and a bottom end, the top end of said tether being coupled to said planter support, at least one pulley defining the highest position, said pulley guiding said tether, a continuous sprocket driven chain operably coupled to said tether, said continuous sprocket driven chain being adapted to retract and extend said tether, and said continuous sprocket driven chain including a control means accessible outside the support structure.

26. A planter system according to claim 19, means for controllably moving the planter assembly relative to the support structure comprising a block and tackle lifting means.

27. A planter system according to claim 19, means for controllably moving the planter assembly relative to the support structure comprising a tether coupled to a ballast, said ballast being slidably contained in the support structure and configured to facilitate movement of the planter support.

28. A planter system according to claim 19,
said planter container being removable from said planter carriage.

29. A planter system according to claim 28, said means for controllably moving the planter assembly relative to the support structure comprising a subsystem from the group consisting of a tether and pulley, a winch, a windlass, a block and tackle, a compression spring, an extension spring, a rack and pinion, a hydraulic cylinder, a pneumatic cylinder, a lead screw assembly, a ball screw assembly and a ballast.

30. A planter system according to claim 29, further comprising an irrigation unit configured to supply water to the planter.

31. A planter system according to claim 29, means for controllably moving the planter assembly relative to the support structure comprising a plurality of components, and said planter system further comprising a raceway containing said plurality of components of said means for controllably adjusting the height of the planter relative to the vertical support, and said raceway being adapted for attachment to a signage support structure.

32. A planter system according to claim 29, means for controllably moving the planter assembly relative to the support structure comprising a plurality of components, and said planter system further comprising a raceway containing said plurality of components of said means for controllably adjusting the height of the planter relative to the vertical support, and said raceway being adapted for attachment to a wall.

33. A planter system according to claim 29, said planter further comprising a planting receptacle and a plurality of and planting pots in said planting receptacle.

34. A planter system according to claim 29, further comprising an irrigation unit configured to supply water to the surrounding terrain.

35. A planter system according to claim 29, further comprising an irrigation unit configured to supply water to the planter assembly and to surrounding terrain.

36. A planter system according to claim 35, said irrigation unit comprising a pop-up sprinkler head at the top end of said support structure, and plumbing means for supplying water to said pop-up sprinkler head, said plumbing means being contained within said vertical support and including a fluid coupling configured for connection to an external water supply.

37. A planter system according to claim 36, said planter carriage including a plurality of hangers configured to support a plurality of objects.

38. A planter system according to claim 1, said
planter container containing a plurality of removable, replaceable and rotatable planter vessels, said planter vessels enabling segregation, independent removal and replacement and growth limitation, said planter container supporting said planter vessels in spaced apart relation, and insulation material provide in spaces between said planter vessels.

39. A planter system according to claim 1, further comprising a waterfall assembly including a reservoir at the bottom end of said hollow support structure, said planter container having a peripheral edge, said planter container being above the reservoir, and an irrigation unit configured to supply water through a pipe extending beyond the peripheral edge of the planter container, said reservoir being configured to catch water supplied through a pipe extending beyond the peripheral edge.

40. A planter system according to claim 1, said irrigation unit comprising an emitter from the group consisting of bubblers, sprayers and drippers.

41. A planter system according to claim 40, said irrigation unit comprising a rotary sprinkler head at the top end of said support structure, and plumbing means for supplying water to said rotary sprinkler head, said plumbing means being contained within said support structure and including a fluid coupling configured for connection to an external water supply.

42. A planter system according to claim 40, said irrigation unit comprising a stationary sprinkler head at the top end of said support structure, and plumbing means for supplying water to said stationary sprinkler head, said plumbing means being contained within said support structure and including a fluid coupling configured for connection to an external water supply.

43. A planter system according to claim 1, means for controllably moving the planter assembly relative to the support structure comprising a subsystem from the group consisting of a tether and pulley, a winch, a windlass, a block and tackle, a compression spring, an extension spring, a rack and pinion, a hydraulic cylinder, a pneumatic cylinder, a lead screw assembly, and a ballast.

44. A planter system according to claim 1, said means for controllably moving the planter assembly relative to the hollow support being electrically operated.

45. A planter system according to claim 44, and said planter system further comprising a photovoltaic subsystem operably coupled to said means for controllably moving the planter assembly, said photovoltaic subsystem comprising a photovoltaic panel operably coupled to a charging circuit, operably coupled to a battery.

46. A planter system comprising an adjustable height planter assembly, a raceway having a top end and a bottom end, raising and lowering means for controllably moving the planter assembly relative to the support structure along a continuum of heights, from a lowest position to a highest position, a tether assembly operably coupling the adjustable height planter assembly to the raising and lowering means, a pulley in said raceway structure, said tether assembly extending, within the raceway, from said raising and lowering means over said pulley to said adjustable height planter assembly, said adjustable height planter assembly being suspended from the tether, and said raising and lowering means being configured to move the planter assembly along a continuum of heights, from a lowest position to a highest position by controllably adjusting the tether assembly from which the planter assembly is suspended, and said planter assembly comprising a planter container configured to hold contents comprising a plant in a growing medium, said planter container having a top that is substantially uncovered and remains substantially uncovered throughout the entire range of motion, including at the highest position, allowing the contents to be exposed to light and supplied water throughout the entire range of motion, and said planter assembly further comprising a drainage aperture , said drainage aperture being positioned and sized to automatically release from the planter assembly liquid accumulated in the planter container while contents are held in the planter container, and said planter system further comprising a locking assembly apart from the raising and lowering means, said locking assembly configured to releasably secure and hold the weight of the planter assembly at a locking height, said locking assembly comprising a fastener associated with the planter assembly and a corresponding aperture, at the locking height, associated with the raceway structure, whereby, upon locking, the locking assembly prevents the planter assembly from moving below the locking height and, upon unlocking, the locking assembly allows the planter assembly to move relative to the support structure along a continuum of heights, from the highest position to the lowest position.

47. A planter system according to claim 46, said raceway being attached to a pole.

* * * * *